(12) United States Patent
Gurovich et al.

(10) Patent No.: US 11,003,257 B2
(45) Date of Patent: May 11, 2021

(54) MUTUAL INTERACTIVITY BETWEEN MOBILE DEVICES BASED ON POSITION AND ORIENTATION

(71) Applicant: Elbit Systems Ltd., Haifa (IL)

(72) Inventors: Eugene Gurovich, Haifa (IL); Israel Unterman, Haifa (IL); Yoav Ophir, Haifa (IL); Yoav Prager, Haifa (IL)

(73) Assignee: Elbit Systems Ltd.

( * ) Notice: Subject to any disclaimer, the term of this patent is extended or adjusted under 35 U.S.C. 154(b) by 0 days.

(21) Appl. No.: 16/765,120

(22) PCT Filed: Dec. 3, 2018

(86) PCT No.: PCT/IL2018/051324
§ 371 (c)(1),
(2) Date: May 18, 2020

(87) PCT Pub. No.: WO2019/111248
PCT Pub. Date: Jun. 13, 2019

(65) Prior Publication Data
US 2020/0348765 A1 Nov. 5, 2020

(30) Foreign Application Priority Data
Dec. 7, 2017 (IL) .......................................... 256288

(51) Int. Cl.
*G06F 3/0346* (2013.01)
*G06F 1/16* (2006.01)

(52) U.S. Cl.
CPC .......... *G06F 3/0346* (2013.01); *G06F 1/1686* (2013.01)

(58) Field of Classification Search
CPC ............................. G06F 3/0346; G06F 1/1686
See application file for complete search history.

(56) References Cited

U.S. PATENT DOCUMENTS 7,058,204 B2  6/2006  Hildreth et al.
7,379,563 B2  5/2008  Shamaie
(Continued)

FOREIGN PATENT DOCUMENTS

WO  2011041427 A2  4/2011
WO  2015197825 A1  12/2015

OTHER PUBLICATIONS

International Search Report and Written Opinion dated Jan. 23, 2019, for International Application No. PCT/IL2018/051324.

*Primary Examiner* — Afroza Chowdhury
(74) *Attorney, Agent, or Firm* — Conley Rose, P.C.

(57) ABSTRACT

A method for initiating a gesture-based mutual interaction scheme between a first and second mobile device, comprising: associating a gesture-based mutual interaction scheme between the first and second mobile device that associates a position scheme with a respective action, where the position scheme relates to any of: an absolute or relative orientation, and an absolute or relative trajectory; acquiring a first position property of the first mobile device and a second position property of the second mobile device; determining that each of the first and second position properties comply with the position scheme; triggering an execution of an action on the second mobile device, where the action is associated with the position scheme that the first position property complies with; where the second mobile device conditions the execution of the action triggered by the first mobile device on the compliance of the second position property with the position scheme.

23 Claims, 27 Drawing Sheets

(56) References Cited

U.S. PATENT DOCUMENTS

| | | |
|---|---|---|
| 8,433,244 B2 | 4/2013 | Liu |
| 2010/0083189 A1 | 4/2010 | Arlein et al. |
| 2011/0083111 A1 | 4/2011 | Forutanpour et al. |
| 2011/0088002 A1 | 4/2011 | Freer |
| 2013/0084797 A1 | 4/2013 | Avadhanam et al. |
| 2013/0111370 A1 | 5/2013 | Pasquero |
| 2013/0198298 A1* | 8/2013 | Li .................. H04N 21/4307 709/206 |
| 2014/0325053 A1 | 10/2014 | Hewitt et al. |
| 2017/0193686 A1* | 7/2017 | Mullins .................. G06T 17/00 |

\* cited by examiner

| MUTUAL INTERACTION SCHEME ||| 
|---|---|---|
| | POSITION SCHEME | ACTION |
| 1 | ABSOLUTE VERTICAL ORIENTATION OF ONE DEVICE FOR 2 SEC | SEND BUSINESS CARD BY OTHER DEVICE |
| 2 | MOVE ONE DEVICE, AND TERMINATE AT A RELATIVE ORIENTATION OF 45° RELATIVE TO THE OTHER DEVICE | DISPLAY AN ICON ON THE OTHER DEVICE |
| 3 | MOVE ONE DEVICE IN A "C" TRAJECTORY | OPEN INTERACTIVE CHAT SESSION AT OTHER DEVICE |
| 4 | TRACE A CLOSED-SHAPED TRAJECTORY | DISPLAY AN ICON MOVING IN THE CLOSED-SHAPED TRAJECTORY |
| 5 | TRACE AN 'AB' TRAJECTORY WITH BOTH DEVICES HELD TOGETHER | ENABLE A MONEY TRANSFER BETWEEN ACCOUNTS ASSOCIATED WITH BOTH DEVICES |
| 6 | ROTATE ABOUT LONGITUDINAL AXIS | REGISTER / UNREGISTER MOBILE DEVICE |
| 7 | DISTANCE IS WITHIN RANGE | INDICATE DISTANCE |
| 8 | AUDIO RANGE WITH RESPECT TO POINT P | PLAY AUDIO IN STEREO, ACCORDING TO DELAY |
| 9 | OPTICAL RANGE REQUIREMENT WITH RESPECT TO AN OBJECT | TRIGGER INVOCATION OF MULTI-PERSPECTIVE IMAGING APPLICATION ON OBJECT |
| 10 | ACQUIRED TRAJECTORY MATCHES VISIBLE TRACE | DISPLAY A BITMAP OF THE TRAJECTORY IN REAL TIME |

360

3B

MUTUAL INTERACTIVITY BETWEEN MOBILE DEVICES BASED ON POSITION AND ORIENTATION

CROSS-REFERENCE TO RELATED APPLICATIONS

This application is a 35 U.S.C. § 371 national stage application of PCT/IL2018/051324 filed Dec. 3, 2018, entitled "Mutual Interactivity Between Mobile Devices Based on Position and Orientation", which claims priority to Application No. IL 256288 filed Dec. 7, 2017, both of which are incorporated herein in their entirety.

FIELD OF THE DISCLOSED TECHNIQUE

The disclosed technique relates to remote interaction between mobile devices in general, and to orientation and position dependent remote interaction, in particular.

BACKGROUND OF THE DISCLOSED TECHNIQUE

Mobile devices enable individuals to interact using platforms such as Android®, and OS®, each platform having respective different, and often proprietary applications with different interfaces. Typical communication platforms include email, voice/audio communications, and social networking. Creating a link between two or more devices for any of these communications platforms typically requires use of a touch screen, button, or voice command. Additionally, connecting with a prospective contact requires identifying the prospective contact in an address book, or other contact list.

U.S. Pat. No. 8,433,244 B2 to Liu et al, entitled "Orientation based Control of Mobile Device", directs to controlling a feature of a non-navigation related application, such as the arrangement of menu items, function controlled by a quick launch key, based on the orientation of the device. The controls may be context-specific such that the orientation is applied to control the feature only in certain contexts. Context may be implied from various factors such as time and date information, the location of the device, and the proximity of the device to other devices.

U.S. Pat. No. 7,379,563 B2 to Shamaie et al, entitled "Tracking Bimanual Movements", directs to recognizing and tracking bimanual movements in the presence of occlusion. The tracking of two separate hands is acquired before the occlusion, and reacquired after the occlusion. Occlusion may be attributed to hand gestures, i.e. changing a hand shape may occlude one or more fingers. Alternatively, occlusion may be caused by one hand blocking the other.

U.S. Pat. No. 7,058,204 B2 to Hildreth et al, entitled 'Multiple Camera Control System', directs to tracking an object using two different viewpoints obtained using two cameras. An absolute position of the object is computed from the difference between each viewpoint and a background.

SUMMARY OF THE PRESENT DISCLOSED TECHNIQUE

It is an object of the disclosed technique to provide a novel method and system for initiating at least one mutual interaction scheme between a first mobile device and at least a second mobile device.

In accordance with the disclosed technique, there is thus provided a method comprising the procedures of: associating at least one mutual interaction scheme between the first mobile device and the at least second mobile device, the mutual interaction scheme associating at least one position scheme with at least one respective action, the at least one position scheme relating to at least one of: an absolute orientation, a relative orientation, an absolute position, a relative position, an absolute trajectory, and a relative trajectory; acquiring a position property of the first mobile device; determining that the acquired position property of the first mobile device complies with at least one of the at least one position scheme of the mutual interaction scheme; and triggering an execution of one of the at least one respective action on the at least second mobile device, the respective action triggered on the second mobile device associated with the at least one position scheme with which the position property of the first mobile device complies, in accordance with the mutual interaction scheme.

In some embodiments, the method further comprises executing on the first mobile device, one of the one or more respective actions in response to the determined compliance of the acquired position property of the first mobile device.

In some embodiments, the acquired position property of the first mobile device relates to at least one of: an absolute orientation, a relative orientation, an absolute position, a relative position, an absolute trajectory, and a relative trajectory of the first mobile device.

In some embodiments, the acquiring the position property of the first mobile device, and the determining that the acquired position property of the first mobile device complies with one of the at least one position scheme of the mutual interaction scheme is performed by the first mobile device.

In some embodiments, the method further comprises executing, by the at least second mobile device, the one of the one or more respective actions triggered by the first mobile device.

In some embodiments, the method further comprises the procedures of: acquiring at least a position property of the at least second mobile device; determining that the acquired position property of the at least second mobile device complies with at least one of the at least one position schemes of the mutual interaction scheme.

In some embodiments, the acquired position property of the at least second mobile device relates to at least one of: an absolute orientation, a relative orientation, an absolute position, a relative position, an absolute trajectory, and a relative trajectory of the at least second mobile device.

In some embodiments, the acquisition of the position property of the at least second mobile device, and the determining of the compliance of the position property of the at least second mobile device is performed by the at least second mobile device.

In some embodiments, the method further comprises notifying the first mobile device of the compliance of the position property of the at least second mobile device.

In some embodiments, the acquisition of the position property of the at least second mobile device, and the determining of the compliance of the position property of the at least second mobile device is performed by the first mobile device.

In some embodiments, the method further comprises conditioning the executing, by the at least second mobile device, the one of the one or more respective actions triggered by the first mobile device, on the determined compliance of the position property of the at least second mobile device.

In some embodiments, the method further comprises: triggering an execution of one of the one or more respective actions on the first mobile device, the respective action triggered on the first mobile device associated with the at least one position scheme with which the position property of the at least second mobile device complies, in accordance with the mutual interaction scheme.

In some embodiments, the method further comprises: executing, by the first mobile device, the one of the one or more respective actions triggered by the at least second mobile device.

In some embodiments, one of the one or more respective actions comprises indicating the determined compliance of the acquired position property of the first mobile device.

In some embodiments, the one of the one or more respective actions comprises indicating the determined compliance of the position property of the at least second mobile device.

In some embodiments, the one or more respective actions comprises any of: registering and unregistering any of the first mobile device and the at least second mobile device to the mutual interaction scheme, in response to the determined compliance of the acquired position property of the first mobile device.

In some embodiments, the one or more respective actions comprises any of: registering and unregistering any of the first mobile device and the at least second mobile device to the mutual interaction scheme, in response to the determined compliance of the position property of the at least second mobile device.

In some embodiments, the acquired position property of the first mobile device corresponds to a distance between the first mobile device and the at least second mobile device, wherein the at least one position scheme of the mutual interaction scheme correspond to the acquired distance, wherein determining further comprises determining that the acquired distance complies with the position scheme of the mutual interaction scheme corresponding to the acquired distance.

In some embodiments, the at least one respective action associated with the position scheme of the mutual interaction scheme corresponding to the acquired distance comprises indicating the acquired distance at any of the first mobile device and the at least second mobile device.

In some embodiments, the position property of the first mobile device corresponds to a distance and orientation of the first mobile device with respect to an audio receiver, and wherein the position property of the at least second mobile device corresponds to a distance and orientation of the at least second mobile device with respect to the audio receiver, wherein the at least one position scheme of the mutual interaction scheme corresponds to an audio range with respect to the audio receiver, wherein determining further comprises determining that the position property of the first mobile device and the position property of the at least second mobile device all comply with the audio range, the method further comprising: synchronizing an internal clock of the at least second mobile device with an internal clock of the first mobile device, computing a phase shift for each of the at least second mobile device such that an audio file simultaneously transmitted by the first mobile device and each of the at least second mobile device constructively interferes at the audio receiver, and rendering the audio file by the first device, and rendering the audio file by each of the at least second mobile device according to each respective phase shift.

In some embodiments, the method further comprises performing the synchronizing, computing and rendering steps with respect to a plurality of mobile devices, grouping a first portion of the plurality of mobile device as a left speaker cluster, grouping a second portion of the plurality of mobile devices as a right speaker cluster, and rendering the audio file by the mobiles devices grouped as the left speaker cluster to emulate a left speaker, rendering the audio file by the mobiles devices grouped as the right speaker cluster to emulate a right speaker, thereby emulating a stereo loudspeaker at the audio receiver.

In some embodiments, the method further comprises mutually notifying each of the first mobile device and the at least second mobile device of the respective compliances of the acquired position properties of the first mobile device and the at least second mobile device with the at least one position scheme of the mutual interaction scheme, wherein executing the respective action comprises invoking a multi-perspective imaging application at each of the first mobile device and the at least second mobile device, wherein acquiring the respective position properties of the first mobile device and the at least second mobile device comprises capturing an image of an object with any of: a camera configured with the first mobile device and a camera configured with the at least second mobile device, wherein the acquired position properties of the first mobile device and the at least second acquired position property are with respect to the object, wherein the at least one position scheme of the mutual interaction scheme with which the position property of the first mobile device complies, corresponds to an optical range of the camera configured with the first mobile device with respect to the object, and wherein the at least one position scheme of the mutual interaction scheme with which the position property of the at least second mobile device complies, corresponds to an optical range of the camera configured with the at least second mobile device with respect to the object.

In some embodiments, invoking the multi-perspective imaging application comprises: capturing at least one image of the object, simultaneous with capturing the image, acquiring associated metadata, the associated metadata comprising position and orientation properties associated with the captured image, and a time stamp associated with the captured image, and providing the captured image and the associated metadata to an image processor.

In some embodiments, the method further comprises: receiving from the first mobile device and the at least second mobile device, the multiple captured images with the associated metadata, and processing the multiple captured images using the associated metadata to perform any of: creating a panoramic image of the object, creating a multi-perspective image of the object, and tracking the object.

In some embodiments, the method further comprises: depositing a visible trace, wherein acquiring the first position property comprises acquiring a trajectory corresponding to the visible trace, wherein determining that the acquired first position property complies with at least one of the at least one position scheme of the mutual interaction scheme comprises determining that the acquired trajectory corresponds to the deposited visible trace, and wherein triggering the at least second mobile device to execute the associated action comprises triggering the at least second mobile device to display a bit map corresponding to the visible trace.

In some embodiments, the method further comprises displaying the bit map corresponding to the visible trace at the at least second mobile device, and storing the bit map at a memory of the at least second mobile device.

In some embodiments, the triggered one of the at least one respective action on the at least second mobile device comprises exchanging a security credential between the first mobile device and the at least second mobile device.

In accordance with another aspect of the disclosed technique there is provided a mutually interactive system, comprising: a first mobile device comprising: an inertial measurement unit configured to acquire a position property of the first mobile device, a transceiver; and at least a second mobile device, each comprising: a transceiver configured to communicate with the transceiver of the first mobile device, the first and the at least a second mobile devices associated with at least one mutual interaction scheme associating at least one position scheme with at least one respective action, the at least one position scheme relating to at least one of: an absolute orientation, a relative orientation, an absolute position, a relative position, an absolute trajectory, and a relative trajectory, wherein the first mobile device is configured to: determine that the acquired position property of the first mobile device complies with one of the at least one position schemes of the mutual interaction scheme, trigger, via the respective transceivers of first mobile device and the at least second mobile device, the processor of the at least second mobile device to execute one of the at least one respective action, the triggered action associated with the one of the at least one position schemes with which the first acquired position property complies, and wherein the at least second mobile device is configured to execute the triggered action.

In some embodiments, the first device is configured to execute one of the one or more respective actions.

In some embodiments, the at least a second mobile device each further comprises an inertial measurement configured to acquire a position property of the at least mobile device.

In some embodiments, the at least second mobile device is further configured to determine that the acquired position property of the at least second mobile device complies with at least one of the at least one position schemes of the mutual interaction scheme.

In some embodiments, the at least second mobile device is configured to notify the first mobile device of the compliance of the acquired position property of the at least second mobile device, and provide the acquired position property of the at least second mobile device via the respective transceivers of the first device and the at least second mobile device.

In some embodiments, the respective acquired position property of the first mobile device and the at least second mobile device relates to at least one of: an absolute orientation, a relative orientation, an absolute position, a relative position, an absolute trajectory, and a relative trajectory of the respective first mobile device and the at least second mobile device.

In some embodiments, any of the first mobile device and the second mobile device further comprise a camera configured to acquire any of: the position property of the first mobile device, and a position property of the at least second mobile device, and wherein the first mobile device is further configured to determine that the acquired position property of the at least second mobile device complies with at least one of the at least one position schemes of the mutual interaction scheme, and wherein the at least second mobile device is further configured to determine that the acquired position property of the first mobile device complies with at least one of the at least one position schemes of the mutual interaction scheme.

In some embodiments, the at least second mobile device is further configured to condition the execution by the at least second mobile device of the one of the one or more respective actions triggered by the first mobile device, on the determined compliance of the acquired position property of the at least second mobile device.

In some embodiments, the at least second mobile device is further configured to trigger an execution of one of the one or more respective actions on the first mobile device, the respective action triggered on the first mobile device associated with the at least one position scheme with which the position property of the least second mobile device complies, in accordance with the mutual interaction scheme.

In some embodiments, one of the one or more respective actions comprises indicating the determined compliance of the acquired position property of the first mobile device.

In some embodiments, one of the one or more respective actions comprises indicating the determined compliance of the acquired position property of the at least second mobile device.

In some embodiments, one of the one or more respective actions comprises any of: registering and unregistering any of the first mobile device and the at least second mobile device to the mutual interaction scheme in response to the determined compliance of the acquired orientation of the first mobile device.

In some embodiments, one of the one or more respective actions comprises any of: registering and unregistering any of the first mobile device and the at least second mobile device to the mutual interaction scheme in response to the determined compliance of the acquired orientation of the at least second mobile device.

In some embodiments, the acquired position property of the first mobile device corresponds to a distance between the first mobile device and the at least second mobile device, wherein the at least one position scheme of the mutual interaction scheme corresponds to the acquired distance, wherein determining further comprises determining that the acquired distance complies with the position scheme of the mutual interaction scheme corresponding to the acquired distance.

In some embodiments, the first mobile device and the at least second mobile device are each configured to indicate the acquired distance in response to the determined compliance of acquired distance with the position scheme corresponding to the distance.

In some embodiments, the first mobile device is operative as an audio transmitter and further comprises a speaker, and wherein the at least second mobile device is operative as an audio receiver and further comprises a speaker, wherein the at least one position scheme of the mutual interaction scheme corresponds to an audio range with respect to an audio receiver, wherein the first acquired position property of the first mobile device corresponds to a distance and orientation of the first mobile device with respect to the audio receiver, and wherein the first mobile device is further configured to: receive at least a second position property corresponding to a distance and orientation of the at least second mobile device with respect to the first mobile device, determine that the acquired first position property and the at least second position property both comply with the audio range respective of the audio receiver, synchronizing an internal clock of the at least second mobile device with an internal clock of the first mobile device, computing a phase shift for each of the at least second mobile device such that an audio file simultaneously transmitted by the first mobile device and each of the at least second mobile device constructively interferes at the audio receiver, and rendering the audio file by the first device, and rendering the audio file by each of the at least second mobile device according to each respective phase shift.

In some embodiments, the acquired position properties of the first mobile device and the at least second mobile device are with respect to an object, wherein the at least one position scheme of the mutual interaction scheme with which the position property of the first mobile device complies, corresponds to an optical range of the camera configured with the first mobile device with respect to the object, and wherein the at least one position scheme of the mutual interaction scheme with which the position property of the at least second mobile device complies, corresponds to an optical range of the camera configured with the at least second mobile device with respect to the object, wherein the at least one respective action configured to be executed by the at least second mobile device is a multi-perspective imaging application, and wherein the first mobile device is configured to execute the multi-perspective imaging application.

In some embodiments, the system further comprises: an image processor, wherein executing the multi-perspective imaging application comprises: capturing at least one image of the object, simultaneous with capturing the image, acquiring associated metadata, the associated metadata comprising position and orientation properties associated with the captured image, and a time stamp associated with the captured image, and providing the captured image and the associated metadata to the image processor, wherein the image processor is configured to: receive from the first mobile device and the at least second mobile device, the multiple captured images with the associated metadata, and process the multiple captured images using the associated metadata to perform any of: creating a panoramic image of the object, creating a multi-perspective image of the object, and tracking the object, and provide the result of the processing step to any of the first and the at least second mobile device.

In some embodiments, the first mobile device is configured deposit a visible trace, and wherein the at least second mobile device is configured to: display a bit map corresponding to the visible trace at a user interface of the at least second mobile device, and store the bit map at a memory of the at least second mobile device, wherein determining that the acquired position property of the first mobile device complies with at least one of the at least one position scheme of the mutual interaction scheme comprises determining that the acquired position property of the first mobile device corresponds to the deposited visible trace, and wherein triggering the at least second mobile device to execute the associated action comprises triggering the at least second mobile device to display the bit map corresponding to the visible trace.

In some embodiments, the triggered one of the at least one respective action on the at least second mobile device comprises exchanging a security credential between the first mobile device and the at least second mobile device.

In accordance with another aspect of the disclosed technique there is provided a method for initiating at least one mutual interaction scheme between a mobile device and a computer, the method comprising the procedures of: associating at least one mutual interaction scheme between the mobile device and the computer, the mutual interaction scheme associating at least one position scheme with at least one respective action, the at least one position scheme relating to at least one of: an absolute orientation, a relative orientation, an absolute position, a relative position, an absolute trajectory, and a relative trajectory of the mobile device; acquiring a position property of the mobile device; determining that the acquired position property of the mobile device complies with at least one of the at least one position scheme of the mutual interaction scheme; and triggering an execution of one of the at least one respective action on a display of the computer, the respective action triggered on the display associated with the at least one position scheme with which the position property of the mobile device complies, in accordance with the mutual interaction scheme, wherein the at least one respective action comprises virtually coupling the mobile device with a three dimensional object displayed on the display, and manipulating a rendition of the three dimensional object on the display to correspond to the acquired position property of the mobile device.

In accordance with another aspect of the disclosed technique there is provided a mutually interactive system, comprising: a mobile device comprising: an inertial measurement unit configured to acquire a position property of the first mobile device, a transceiver; and a computer comprising: a display, a processor, and a transceiver configured to communicate with the transceiver of the mobile device, the mobile device and the computer associated with at least one mutual interaction scheme associating at least one position scheme with at least one respective action, the at least one position scheme relating to at least one of: an absolute orientation, a relative orientation, an absolute position, a relative position, an absolute trajectory, and a relative trajectory of the mobile device, wherein the mobile device is configured to: determine that the acquired position property of the mobile device complies with one of the at least one position schemes of the mutual interaction scheme, trigger, via the respective transceivers of mobile device and the computer, the processor of the computer to execute one of the at least one respective action, the triggered action associated with the one of the at least one position schemes with which the acquired position property complies, wherein the at least one respective action comprises virtually coupling the mobile device with a three dimensional object displayed on the display, and manipulating a rendition of the three dimensional object on the display to correspond to the acquired position property of the mobile device.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method for implementing a position-and-orientation-dependent mutual interaction scheme between two or more mobile devices. The mutual interaction scheme defines at least one position scheme in association with at least one respective action. A first mobile device acquires a position property of the first mobile device, and compares the acquired position property to the position schemes of the mutual interaction scheme. If the acquired position property complies with one of the position schemes, the first mobile device triggers the execution of the respective action associated with the complied-with position scheme, on a second mobile device. Both the position scheme of the mutual interaction scheme, and the acquired position property of the mobile device are understood herein to relate to at least one of an absolute or relative orientation, position and trajectory of either one of the mobile devices. Similarly, the second device acquires a position property of the second mobile device, and compares the acquired position property of the second mobile device with the position schemes of the mutual interaction scheme. If the acquired position property of the second mobile device complies with one of the position schemes of the mutual interaction scheme, the second mobile device triggers the execution of the action associated with the complied-with position scheme on the first mobile device.

In this manner, the first mobile device can remotely influence the execution of one or more actions by the second mobile device, in response to manipulations of the respective spatial position and orientation of the first mobile device. Similarly, the second mobile device can remotely influence the execution of one or more actions by the first mobile device, in response to manipulations of the respective spatial position and orientation of the second mobile device. As a result, the two mobile device mutual interact in response to manipulating their respective spatial positions and orientations, precluding the need for touch-based interaction, such as typing, touching, swiping, and like. The mutual interaction scheme may be extended to three or more mobile devices, allowing multiple mobile devices to interact based on manipulating the respective positions, orientations and trajectories of the multiple mobile devices. Furthermore, the acquisition of the position properties and triggering of the respective actions is performed throughout in real-time, allowing the users of the respective mobile devices to interact in real-time, in response to manipulating the position and orientation of their respective mobile devices.

Figure 1A:
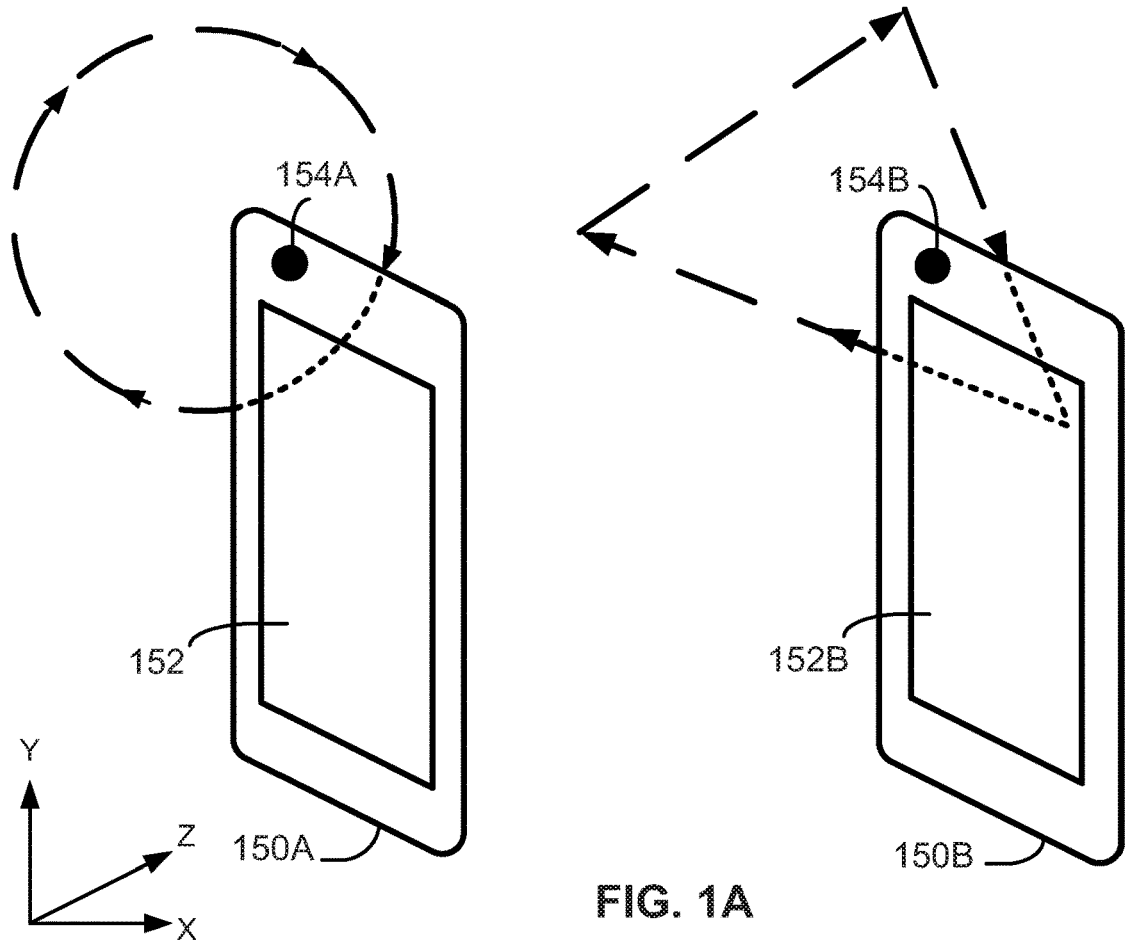
FIGS. 1A-1B illustrate an exemplary implementation of two mobile devices interacting via a mutual interaction scheme, constructed and operative in accordance with an embodiment of the disclosed techniques.
Figure 1B:
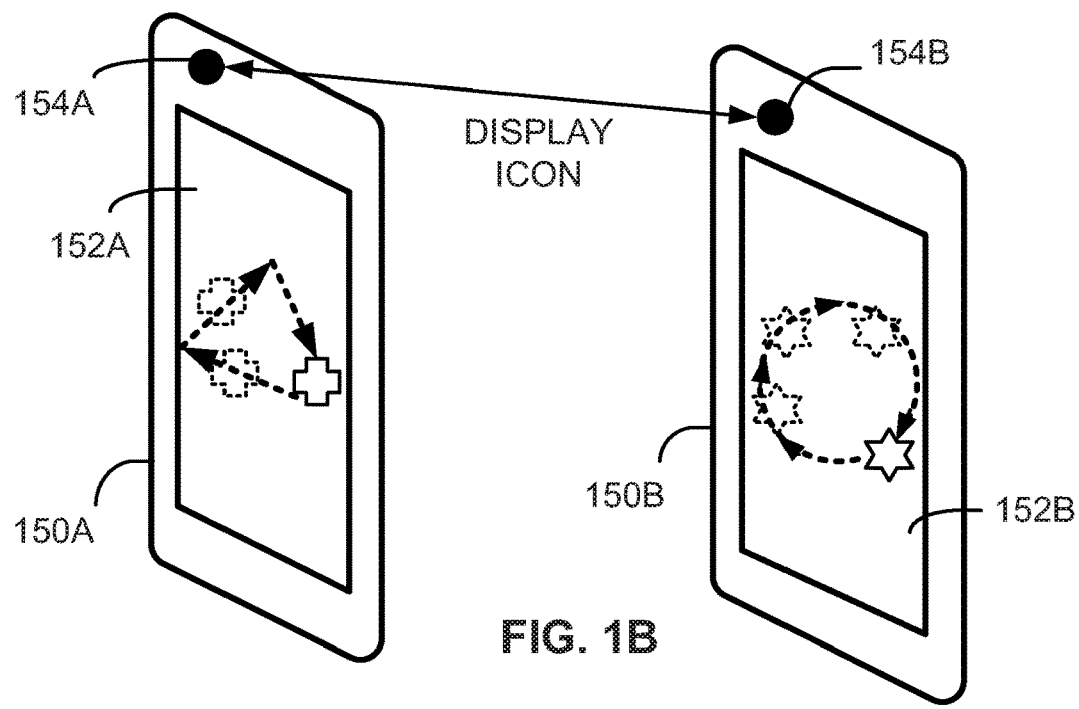

Reference is now made to FIGS. 1A-1B which illustrate an exemplary implementation of two mobile devices 150A and 150B interacting via a mutual interaction scheme in accordance with an embodiment of the disclosed technique. Each of mobile devices 150A and 150B include hardware componentry and software for detecting and acquiring the respective positions, orientations and motion of mobile devices 150A and 150B. Additionally, each of Mobile devices 150A and 150B include a visual display 152A and 152B, and a respective transceiver 154A and 154B. These and other components of mobile devices 150A and 150B will be described in greater detail herein below in conjunction with FIGS. 2A-2G. Additionally, each of mobile devices 150A and 150B is registered to a mutually interactive application that associates mobile devices 150A and 150B with a mutual interaction scheme. In the example brought forth in FIGS. 1A and 1B, the mutual interaction scheme includes a rule associating a trajectory, acquired by one mobile device, with displaying the acquired trajectory at the other mobile device.

With reference to FIG. 1A, Alice, the user of mobile device 150A, manipulates mobile device 150A in a circular trajectory. Mobile device 150A acquires the circular trajectory, and compares the acquired circular trajectory with the position schemes of the mutual interaction scheme. Mobile device 150A determines that the acquired circular trajectory complies with the rule described above (i.e., displaying the acquired circular trajectory on mobile device 150B). Accordingly, mobile device 150A triggers mobile device 150B to display the trajectory acquired by mobile device 150A, on visual display 152B of mobile device 150B. With reference to FIG. 1B, mobile device 150B displays on visual display 152B an icon (star) associated with mobile device 150A, moving in a circular trajectory corresponding to the circular trajectory acquired by mobile device 150A.

Referring back to FIG. 1A, in a similar manner, Bob, the user of mobile device 150B, manipulates mobile device 150B in a triangular trajectory. Mobile device 150B acquires the triangular trajectory, and compares the acquired triangular trajectory with the position scheme of the mutual interaction scheme. Mobile device 150B determines that the acquired triangular trajectory complies with the rule described above. Accordingly, mobile device 150B triggers mobile device 150A to display the trajectory acquired by mobile device 150B on visual display 150A of mobile device 150A. Referring back to FIG. 1B, mobile device 150A displays on display 152A of mobile device 150A, an icon (a '+' sign) associated with mobile device 150B, moving in a triangular trajectory, corresponding to the triangular trajectory acquired by mobile device 150B.

The term 'mobile device' refers herein below to any kind of computing device, which is intended to be operated while carried by an agent, such as a human user, an animal, an android, a vehicle, and the like. The vehicle can be an aircraft, a vessel, a ground vehicle (e.g., a car, a motorcycle, a bicycle, a Segway, a monocycle and the like). The mobile device is operative to compute and communicate with other devices via wireless means, without requiring cables, wires, and the like. Thus, the mobile device can be manipulated in space by the agent, such manipulations including at least one of spatial translations and rotations.

Figure 2A:
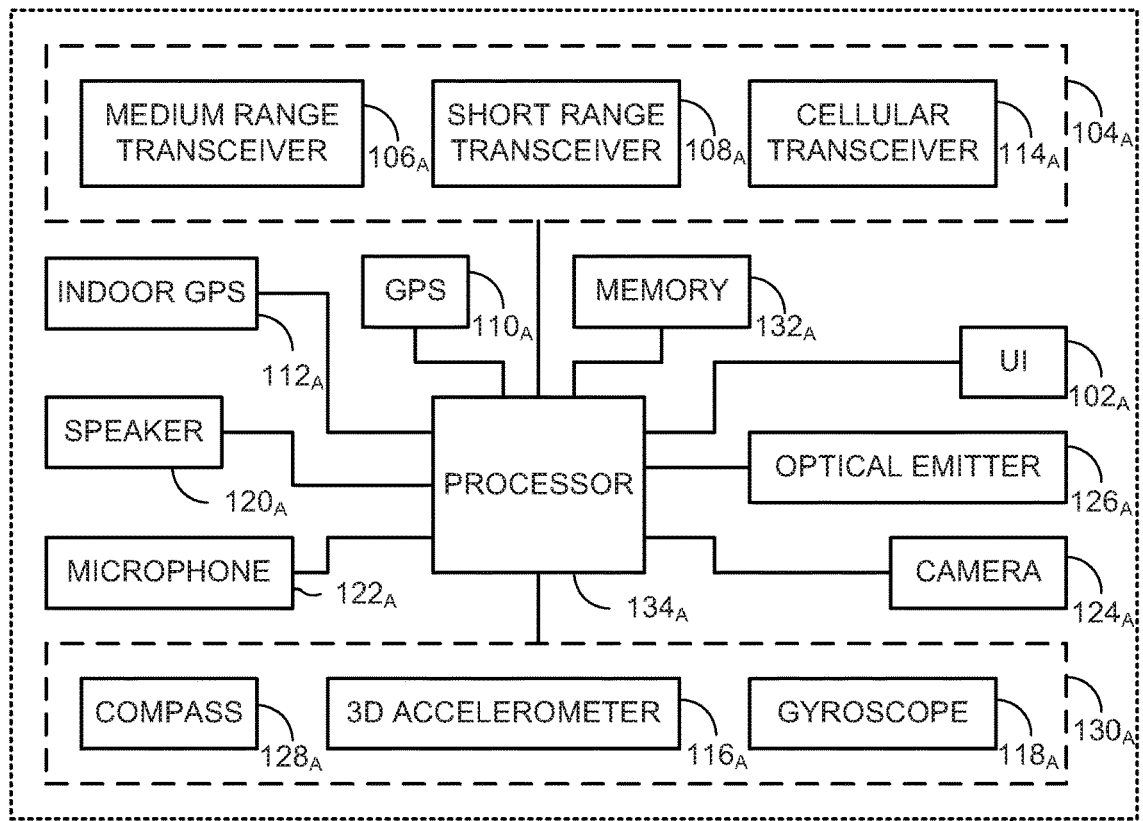
FIGS. 2A-2B are schematic block diagrams of two mobile devices, constructed and operative in accordance with an embodiment of the disclosed techniques.
Figure 2B:
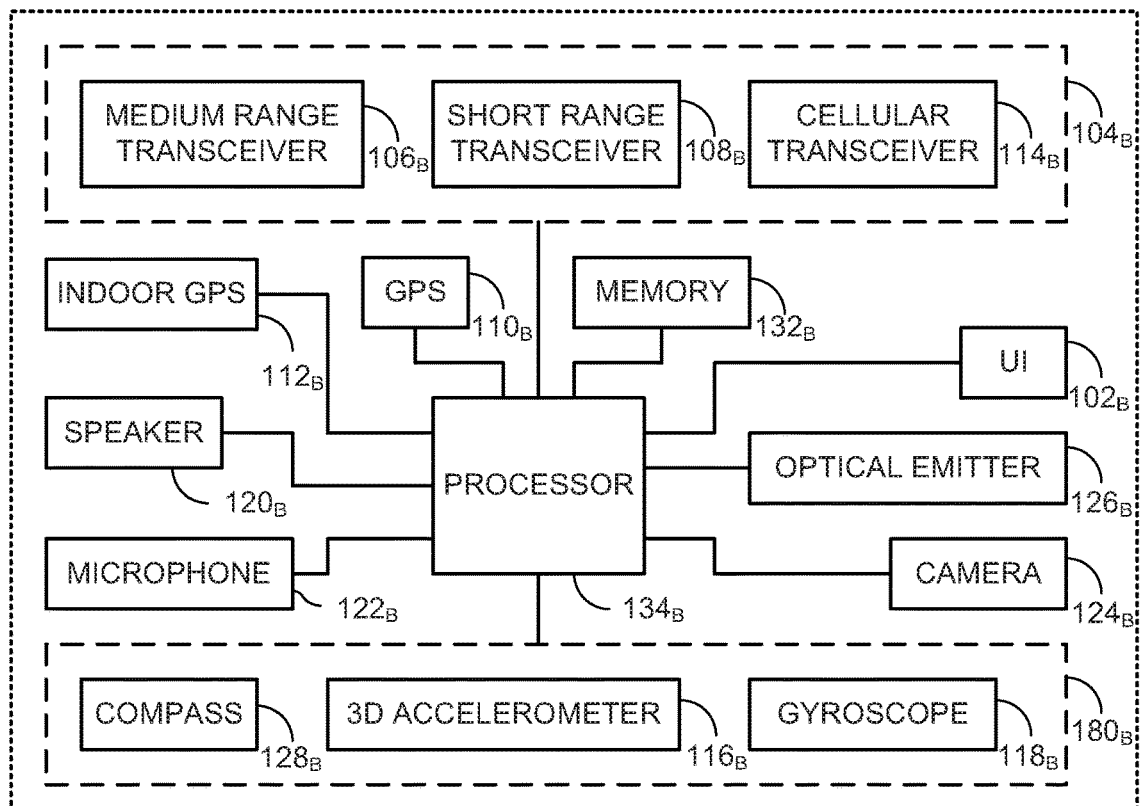

The disclosed technique shall be exemplified herein with reference to two devices. However, the disclosed technique may be implemented three devices as further explained below. Reference is now made to FIGS. 2A and 2B, which are schematic illustrations of mobile devices, generally referenced 100A and 100B respectively, constructed and operative in accordance with another embodiment of the disclosed techniques. Mobile devices 100A and 100B are provided by way of example, as a personal communication device (e.g., a mobile phone), and are representative of each of mobile devices 150A and 150B described above with respect to FIGS. 1A-1B.

Mobile devices 100A and 100B each include at least one respective processor 134A and 134B. Processors 134A and 134B may be any of a CPU, GPU, or APU, digital signal processor (DSP), and the like.

Each of mobile devices 100A and 100B additionally include a respective transceiver 104A and 104B. Each of transceivers 104A and 104B includes one or more of: a respective medium range RF transceiver (receiver and transmitter) 106A and 106B (e.g., WIFI), a respective short range transceiver (receiver and transmitter) 108A and 108B (e.g., Bluetooth), and a respective cellular communication transceiver (receiver and transmitter) 114A and 114B (e.g., GSM, LTE, WIMAX). Transceivers 104A and 104B are each operative to send and receive radio frequency (RF) signals relating to data and executable instructions.

Each of mobile devices 100A and 100B additionally includes a respective 3D accelerometer unit 116A and 116B, a respective gyroscope 118A and 118B, and a respective compass 128A and 128B, collectively referred to herein as MEMs. MEMs 116A, 118A, and 128A are integrated within a single motion tracking component 130A, such as a 9-axis inertial measurement unit (IMU) that provides real-time spatial tracking of at least one of translational and rotational motion of mobile device 100A. Similarly, MEMs 116B, 118B, and 128B are integrated within IMU 130B, providing real-time spatial tracking of at least one of translational and rotational motion of mobile device 100B. Each of mobile devices 100A and 100B additionally includes at least one respective memory store 132A and 132B.

Each of mobile devices 100A and 100B may additionally include any of the following optional components: respective user interfaces 102A and 102B; respective GPS receivers 110A and 110B; respective indoor GPS receivers 112A and 112B; respective speakers 120A and 120B; a respective microphones 122A and 122B; at least one respective camera 124A and 124B; and at least one respective optical emitter 126A and 126B.

Each of respective transceivers 104A and 104B are coupled to respective processors 134A and 134B via a respective converter, i.e. an analog to digital converters ADCs, and a digital to analog converter DACs, (not shown). Each of respective IMUs 130A and 130B, and respective memory stores 132A and 132B are coupled to respective processors 134A and 134B. Each of the respective optional components listed above, i.e. respective user interfaces 102A and 102B; respective GPS receivers 110A and 110B; respective indoor GPS receivers 112A and 112B; respective speakers 120A and 120B; respective microphones 122A and 122B; respective cameras 124A and 124B; and respective optical emitters 126A and 126B, when included within respective devices 100A and 100B, are coupled to respective processors 134A and 134B.

Cameras 124A and 124B may include any of: a visible light camera, an infra-red camera, an ultra-violet camera, a monoculer camera, a stereoscopic camera, a scanning camera, and combinations thereof. Optical emitters 126A and 126B can include one or more light illuminating modules, such as a light emitting diode (LED) visible light illuminator, an infra-red illuminator, an ultraviolet illuminator, a laser emitter, and the like.

Respective user interfaces 102A and 102B may be a touch-sensitive interface operative to display digital content, including one or more soft keys. Mobile devices 100A and 100B are operative to receive input via respective user interfaces 102A and 102B by sensing a touch on one or more of the displayed soft keys.

Processors 134A and 134B determine the absolute and relative position, orientation, and motion detection of respective mobile devices 100A and 100B according to at least one of: measurements acquired via respective IMUs 130A and 130B, images acquired via respective cameras 124A and 124B, measurements communicated via respective transceivers 104A and 104B, and measurements communicated via any of respective GPSs 110A and 110B, and respective GPSs 112A and 112B. For example, measurements received via any of respective transceivers 104A and 104B, respective GPSs 110A and 110B, and respective indoor GPSs 112A and 112B may be applied by respective processors 134A and 134B to determine position, orientation and motion of respective mobile devise 100A and 100B. As such, processors 134A and 134B may perform any of: triangulation calculations conducted with respect to multiple base stations (not shown) in communication with respective mobile devices 100A and 100B, calculations relating to signal flight technology; applications of calculations relating to electro-magnetic (EM) technology, and the like. Processors 134A and 134B may additionally apply one or more measurements received via respective IMUs 130A and 130B, and respective cameras 124A and 124B to further determine the position, orientation and motion estimations of respective mobile devise 100A and 100B determined above. Processors 134A and 134B are further operative to perform one or more calculations for determining the absolute and relative position, orientation, and motion detection of respective mobile devices 100A and 100B in conjunction with an operating system, such as Android, IOS, and the like, configured with respective mobile devices 100A and 100B.

In general, mobile devices 100A and 100B each receive translational motion information from respective 3D accelerometers 116A and 116B, rotational motion information from respective gyroscopes 118A and 118B, and changes in absolute orientation from respective compasses 114A and 114B. Additionally, mobile devices 100A and 100B periodically receive absolute positioning information from any of respective GPSs 110A and 110B, and respective indoor GPSs 112A and 112B. Respective processors 134A and 134B each apply the information received from respective compasses 114A and 114B, respective 3D accelerometers 116A and 116B, respective gyroscopes 118A and 188A, respective GPSs 110A and 110B, and respective indoor GPSs 112A and 112A to determine and update the position properties of respective mobile devices 100A and 100B using conventional techniques. Additionally, respective cameras 124A and 124B of respective mobile devices 100A and 100B may capture one or more images of a reference object, and the captured images may be analyzed to determine the respective position properties of mobile devices 100A and 100B at least relative to that reference object. Additionally or alternatively, an external processor (not shown) may be provided to compute updated position properties of mobile devices 100A and 100B. Additionally or alternatively, an external camera (not shown) may be provided to capture one or more images of mobile devices 100A and 100B, and the capture images may be used to derive one or more position properties of mobile devices 100A and 100B. Additionally or alternatively, respective cameras 124A and 124B of mobile devices 100A and 100B may capture an image of the respective other one of mobile devices 100A and 100B. These images may be analyzed by any of processors 134A and 134B to determine one or more position properties of mobile devices 100A and 100B.

The relative orientation of mobile device 100A with respect to mobile device 100B is defined by three angles of rotation (e.g., yaw, pitch and roll) between the respective mechanical frames of reference of mobile device 100A and mobile device 100B. In general, the mechanical frame of either of mobile devices 100A or 100B may be designated arbitrarily as a frame of reference. The relative position of mobile device 100A with respect to mobile device 100B is defined as a vector from the reference frame origin of mobile device 100A to the reference frame origin of mobile device 100B. The reference frame origin of mobile device 100A may be chosen arbitrarily as well.

The reference frames for the position and orientation of each respective mobile device 100A and 100B are calculated by each of respective processors 134A and 134B. The respective reference frames of mobile device 100A and 100B are calculated based on measurements acquired by respective micro-accelerometers 116A and 116B, respective gyroscopes 118A and 118B, and respective magnetometers (compasses) 128A and 128B. Gyroscopes 118A and 118B measure rotational velocity of each respective reference frame, serving to smooth the dynamic effect on outputs from respective accelerometers 116A and 116B. Accelerometers 116A and 116B measures the respective gravity force and linear acceleration of respective mobile devices 100A and 100B: when in a static position, respective accelerometers 116A and 116B define the elevation and the roll of the mechanical frame of respective mobile devices 100A and 100B with respect to the vertical direction. Respective compasses 128A and 128B measure the local permanent magnetic field vector affecting each respective mobile device 100A and 100B. In an open area, the measured field coincides with the Earth's magnetic field. Inside buildings and urban environments, the magnetic field is distorted by nearby metallic objects. However, the magnetic field is smoothed due to the fact that the magnetic deformations are identical for closed points, and mobile devices 100A and 100B sense the same magnetic field, and hence deformations. Additionally, one or more signals received via respective transceivers 104A and 104B may be used to calculate the respective reference frames, such as to correct for drift, noise and the like.

In a steady, or quasi-steady state, respective compasses 128A and 128B and accelerometers 116A and 116B unambiguously define the orientation of the mechanical frame of respective mobile devices 100A and 100B with respect to the local magnetic and gravity fields. Thus, the relative orientations of mobile devices 100A and 100B located in proximity to each other may be determined from the respective orientations of each mobile device 100A and 100B with respect to the local magnetic and gravity fields.

In a dynamic state, respective accelerometers 116A and 116B measure the gravitational force, as well as any mechanical jitters imposed by the motion of respective mobile devices 100A and 100B. Respective gyroscopes 118A and 118B may filter out errors caused by respective accelerometers 116A and 116B, and provide the correct orientation of respective mobile device 100A and 100B.

If a metal or ferromagnetic object is positioned in proximity to any of mobile devices 100A and 100B, the magnetic field may be distorted, influencing the calculated orientation of the reference frame. In such a case, respective gyroscopes 118A and 118B temporary compensate for the distortion and provides the correct orientation of respective mobile devices 100A and 100B.

Reference is now made to FIGS. 2C-2F which are schematic illustrations of techniques for determining relative or absolute position, orientation, or motion of mobile devices 100A and 100B, in accordance with a further embodiment of the disclosed technique and still referring to FIGS. 2A and 2B. The techniques described in conjunction with FIGS. 2C-2F may be employed separately, in combination, or in combination with additional techniques as are known in the art, to determine any of the relative or absolute positions, orientations, and trajectories of mobile devices 100A and 100B. The relative or absolute positions, orientations, and trajectories of mobile devices 100A and 100B may be determined for a range of distances separating mobile devices 100A and 100B, including local distance ranges, i.e. distances within direct detection via BlueTooth, optical detection, WiFi, and the like, and remote distance ranges, such as may require routing via cable, cellular, radio, or other long-range communication networks for detection. It is to be noted that the techniques described in FIGS. 2C-2F are meant to be illustrative only, and not limiting. It may further be noted that although the description of FIGS. 2C-2F relate to two mobile devices 100A and 100B, the techniques may be extended to acquire any of a relative or absolute position, orientation, or motion of three or more mobile devices.

Figure 2C:
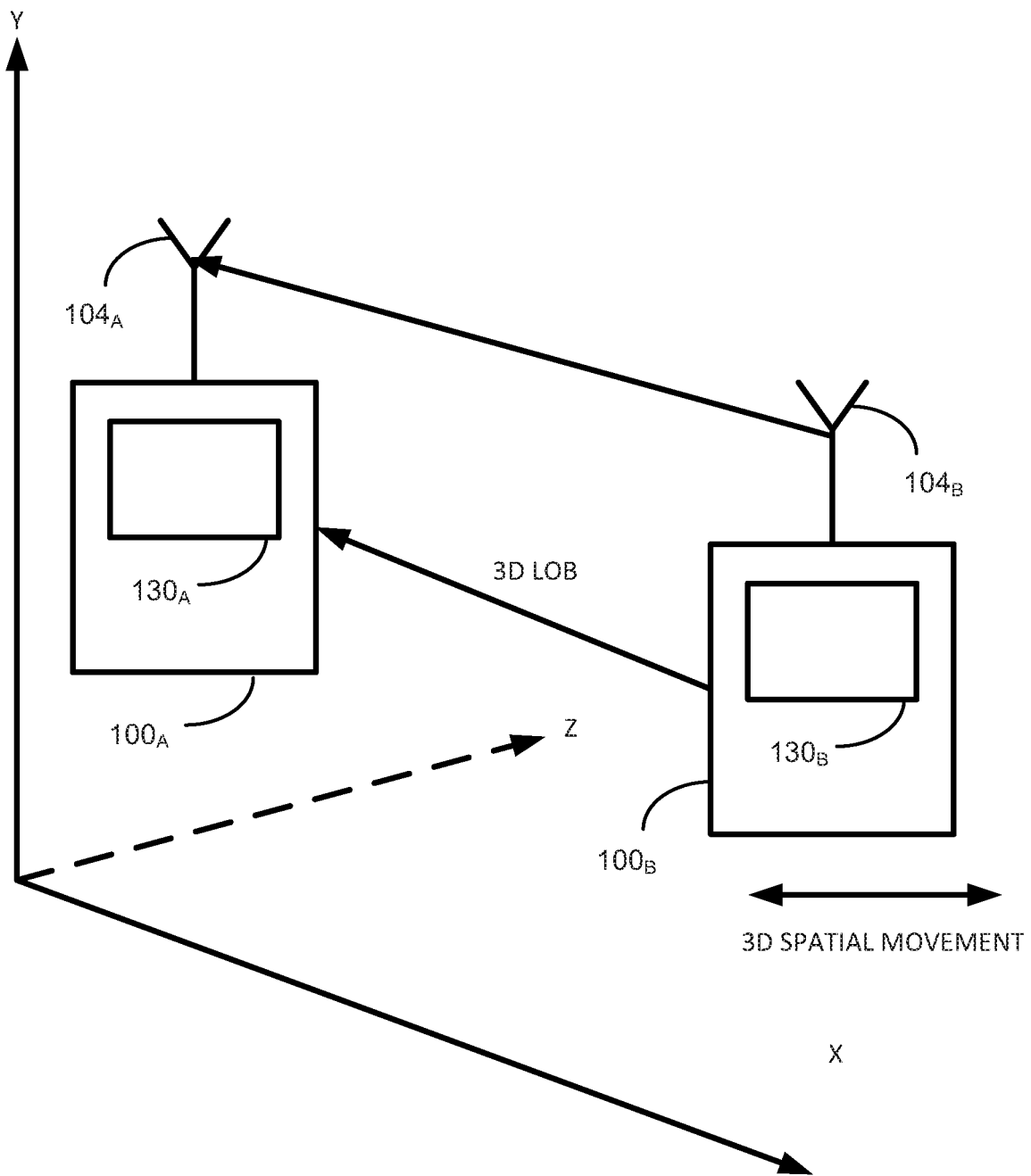
FIGS. 2C-2F illustrate multiple techniques for acquiring any of a relative or absolute position, orientation, or motion of two mobile devices, each corresponding to the mobile devices of FIGS. 2A-2B, constructed and operative in accordance with additional embodiments of the disclosed techniques.

Reference is now made to FIG. 2C, which when taken additionally with reference to FIGS. 2A-2B, together illustrate a block diagram for determining a three-dimensional (3D) line of bearing (LOB) between mobiles devices 100A and 100B, constructed and operative in accordance with another embodiment of the disclosed techniques. By measuring the RES phase in respective receivers 104A and 104B using the techniques described above, and synchronizing the phase measurements with the accelerometer data obtained by respective IMUs 130A and 130B of each of respective mobiles devices 100A and 100B, the 3D line of bearing (LOB) can be estimated relative to the axes (X,Y,Z) of respective receivers 104A and 104B, accelerometers 116A and 116B, and compasses 114A and 116B of respective IMUs 130A and 130B of each of mobiles devices 100A and 100B. The respective axes (X,Y,Z) for each of mobile devices 100A and 100B may be calibrated in advance to correspond to each other.

Figure 2D:
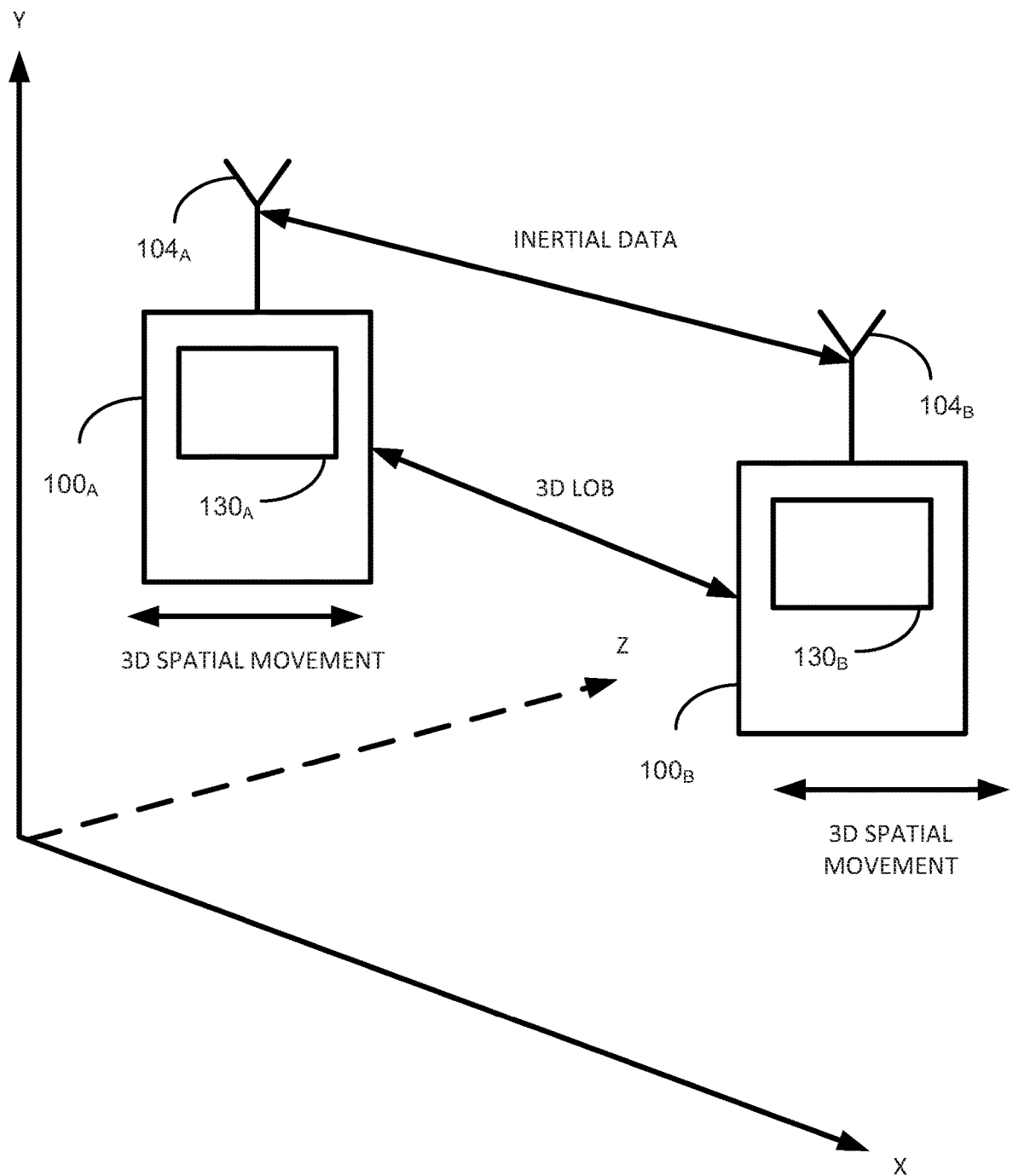

Reference is now made to FIG. 2D, which when taken additionally with reference to FIGS. 2A-2B, illustrates a block diagram for short-term acquisition of parameters for mobiles devices 100A and 100B, constructed and operative in accordance with another embodiment of the disclosed techniques. IMUs 130A and 130B continuously acquire short-term position, orientation, and motion parameters for mobile devices 100A and 100B, respectively. Processors 134A and 134B of respective mobiles devices 100A and 100B use these parameters to calculate the direction of the relative motion between mobile devices 100A and 100B. By continuous gathering of data from respective IMUs 130A and 130B and by determining the residual phase (RES) for each of mobiles devices 100A and 100B detected via respective transceivers 104A and 104B, respective processors 134A and 134B can resolve any ambiguity of the wrapped phase, calculated above, and calculate the 3D LOB between mobiles devices 100A and 100B.

Figure 2E:
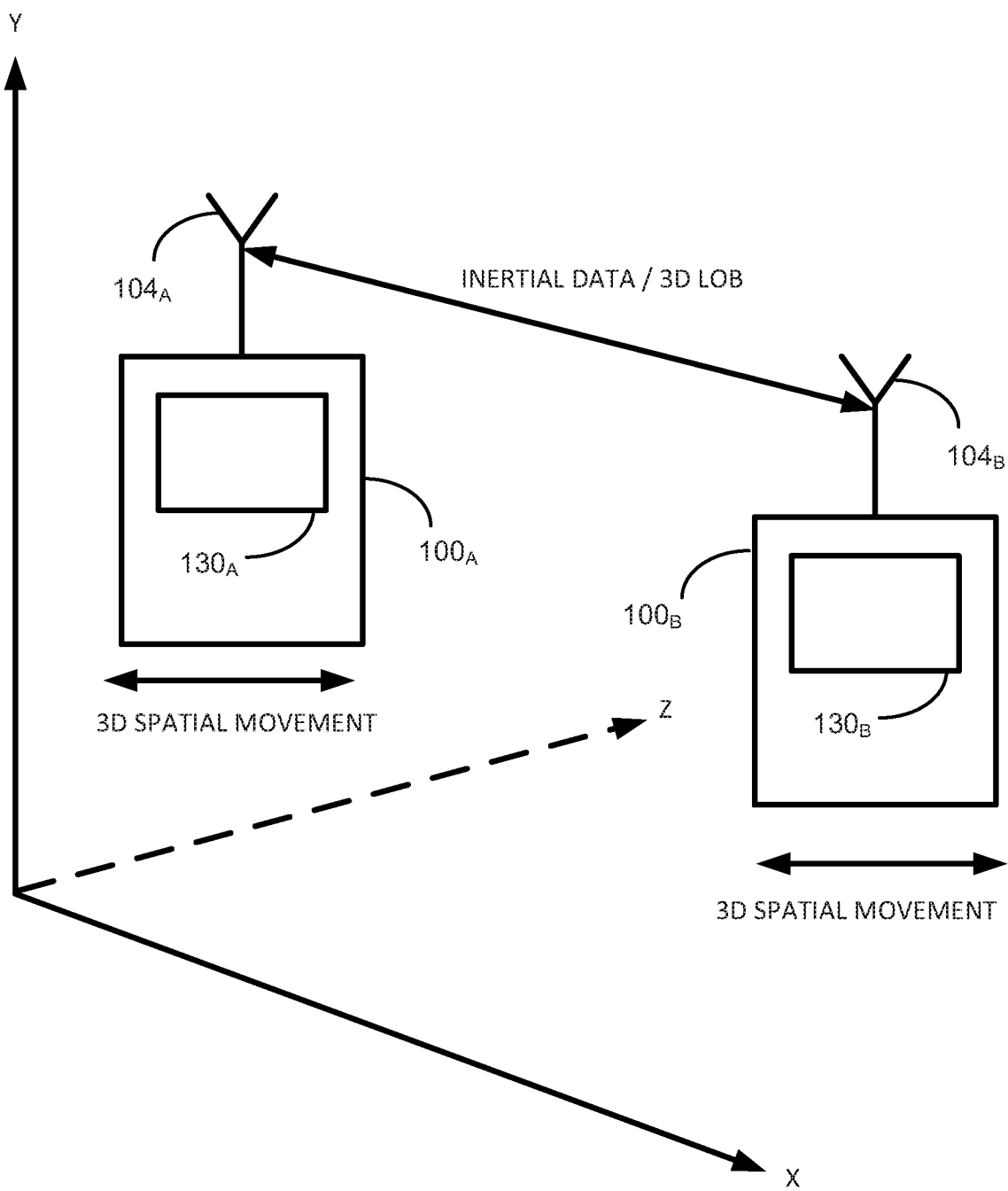

Reference is now made to FIG. 2E, which when taken additionally with reference to FIGS. 2A-2B, illustrates a block diagram for long-term gathering of parameters for mobiles devices 100A and 100B, constructed and operative in accordance with another embodiment of the disclosed techniques. IMUs 130A and 130B continuously acquire long-term position, orientation, and motion parameters for mobile devices 100A and 100B, respectively. Processors 134A and 134B of mobiles devices 100A and 100B use these long-term parameters to determine the respective location in 3D space for each of mobiles devices 100A and 100B. By gathering long term continuous data from respective IMUs 130A and 130B and from the respective RES phase sensors of each of each of mobiles devices 100A and 100B, respective processors 134A and 134B of each of mobiles devices 100A and 100B can apply known triangulation techniques to calculate the respective position of each of mobiles devices 100A and 100B.

Figure 2F:
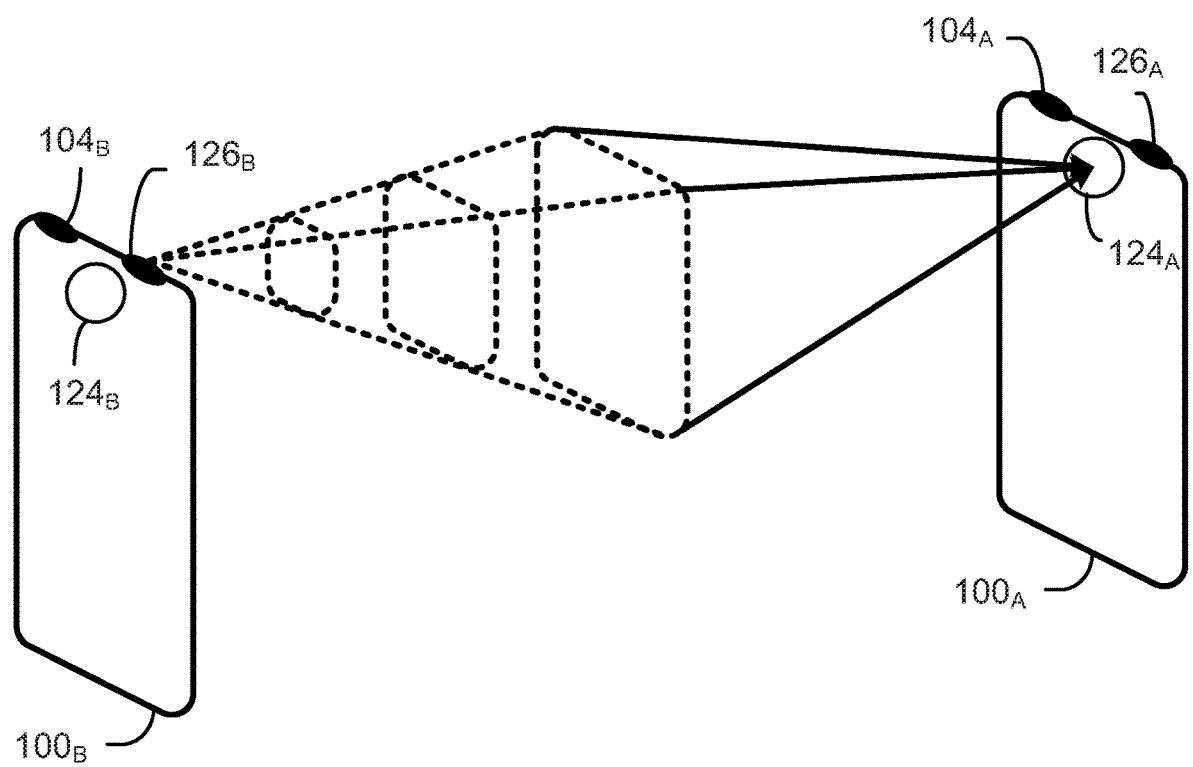

Reference is now made to FIG. 2F, which when taken additionally with reference to FIGS. 2A-2B, illustrates a system for optical detection one of mobiles devices 100A and 100B by the respective other one of mobile devices 100A and 100B, constructed and operative in accordance with another embodiment of the disclosed techniques. Mobile device 100A is operable to discover mobile device 100B via camera 124A. In one implementation, camera 124A captures an image of mobile device 100B, and processor 134A analyzes the captured image, such as by applying object recognition techniques to discover mobile device 100B. In another implementation, optical emitter 126B of mobile device 100B emits an identifying optical signal, such as an identifying pattern (i.e. structured light), color, or a series of pulses (i.e. Morse code) that identify mobile device 100B. Camera 124A of mobile device 100A captures one or more images of the identifying optical signal, and processor 134A analyzes the captured images to discover mobile device 100B. The discovery may be limited detecting the presence of mobile device 100B. Alternatively the discovery may additionally include determining any of a position, orientation, and trajectory of mobile device 100B by mobile device 100A. In a similar mobile device 100B discovers mobile device 100A via camera 124B.

Additionally or alternatively, mobile device 100A is operative to acquire a position property of mobile device 100B via camera 124B of mobile device 100B. Mobile device 100B is operative to capture one or more images indicating one or more position properties of mobile device 100B via camera 124B. For example, such images may include an image of a reference object, an image of a projection of a structured light pattern emitted by emitter 126B of mobile device 100B, and the like. In one implementation, mobile device 100B transmits the image capture by camera 124B to mobile device 100A, via respective transceivers 104A and 104B, and mobile device 100A analyzes the image to determine the position property of mobile device 100B. In another implementation, mobile device 100B analyzes the image to determine the position property of mobile device 100B, and transmits the determined position property to mobile device 100A.

Mobile devices 100A and 100B are additionally operative to acquire the position and orientation of any of the components included mobile devices 100A and 100B, such as the position and orientation of respective cameras 124A and 124B, optical emitters 126A and 126B, respective speakers 120A and 120B, and respective microphones 122A and 122B.

Additionally, or alternatively, each of mobile devices 100A and 100B may similarly use an identifying RF signal to discover and identify each respective other one of mobile devices 100A and 100B via respective transceivers 104A and 104B. Additionally, or alternatively, each of mobile devices 100A and 100B may similarly use an identifying acoustic signal, emitted via respective speakers 120A and 120B and detected by respective microphones 122A and 122B to discover and identify each respective other one of mobile devices 100A and 100B.

Additionally, or alternatively, each of mobile devices 100A and 100B may use an access point mode of discovery to discover and identify each respective other one of mobile devices 100A and 100B. In the access point mode of discovery, mobile device 100A activates a mutual interaction application that scans for nearby devices and networks. Mobile device 100B activates the mutual interaction application as well, allowing mobile device 100B to be discovered by mobile device 100A. The mutual interaction application may change the network name of mobile device 100B to a known contact identifier, such as account ID, or a phone number, associated with mobile device 100B. Mobile device 100B transmits an identifying signal via transceiver 104B of mobile device 100B using an available WiFi or Bluetooth network. On receiving the identifying signal at transceiver 104A of mobile device 100A, mobile device 100A identifies mobile device 100B according to the known contact identifier, thereby discovering mobile device 100B. The mutual interaction application displays the discovered contact at user interface 102A of mobile device 100A. The user of mobile device 100A may select the displayed contact using known techniques, such as by clicking or touching, confirming the connection.

Once the connection is confirmed, inertial data acquired by respective IMUs 130A and 130B of each of mobile devices 100A and 100B are subsequently mutually exchanged via respective transceivers 104A and 104B of mobile devices 100A and 100B. Additionally, location information acquired by respective GPSs 110A and 110B, and indoor GPSs 112A and 112B of each of mobile devices 100A and 100B are subsequently mutually exchanged via respective transceivers 104A and 104B of mobile devices 100A and 100B.

Additionally, or alternative to employing an available WiFi or Bluetooth network, mobile devices 100A and 100B may discover each other via a web service installed on each respective mobile device 100A and 100B. Such web services include interactive applications such as WhatsApp, Messenger, chat services and the like.

Subsequent to the mutual discover of each of mobile devices 100A and 100B, mobile devices 100A and 100B may proceed to track each respective other one of mobile devices 100A and 100B. For example, the tracking may implemented using any of optical, RF, acoustic means, using conventional techniques.

Figure 3A:
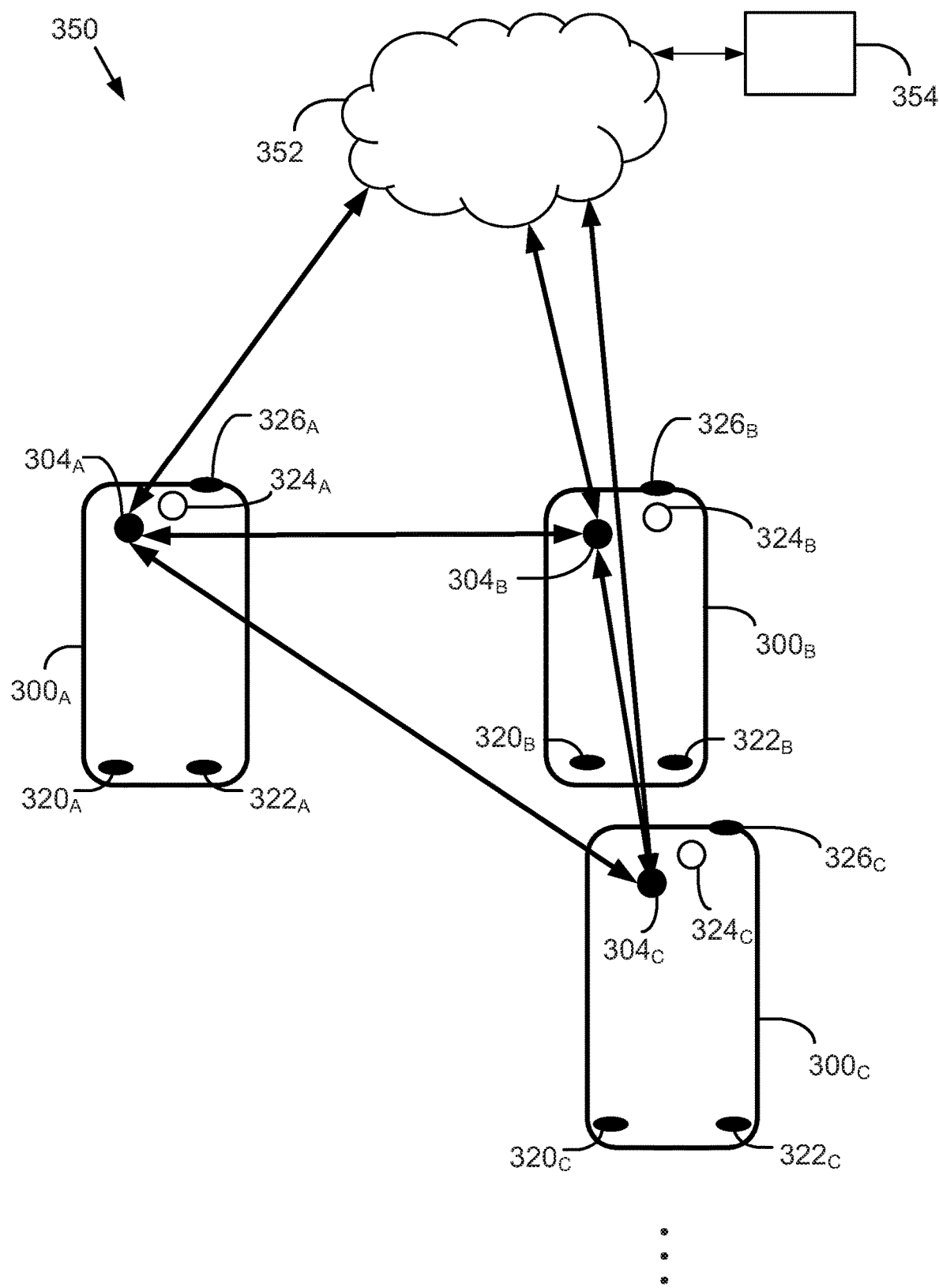
FIGS. 3A-3U are schematic illustrations of a system for implementing a mutual interaction scheme between two mobile devices operative according to the mobile devices of FIGS. 2C-2F, constructed and operative in accordance with additional embodiments of the disclosed techniques.
Figure 3C:
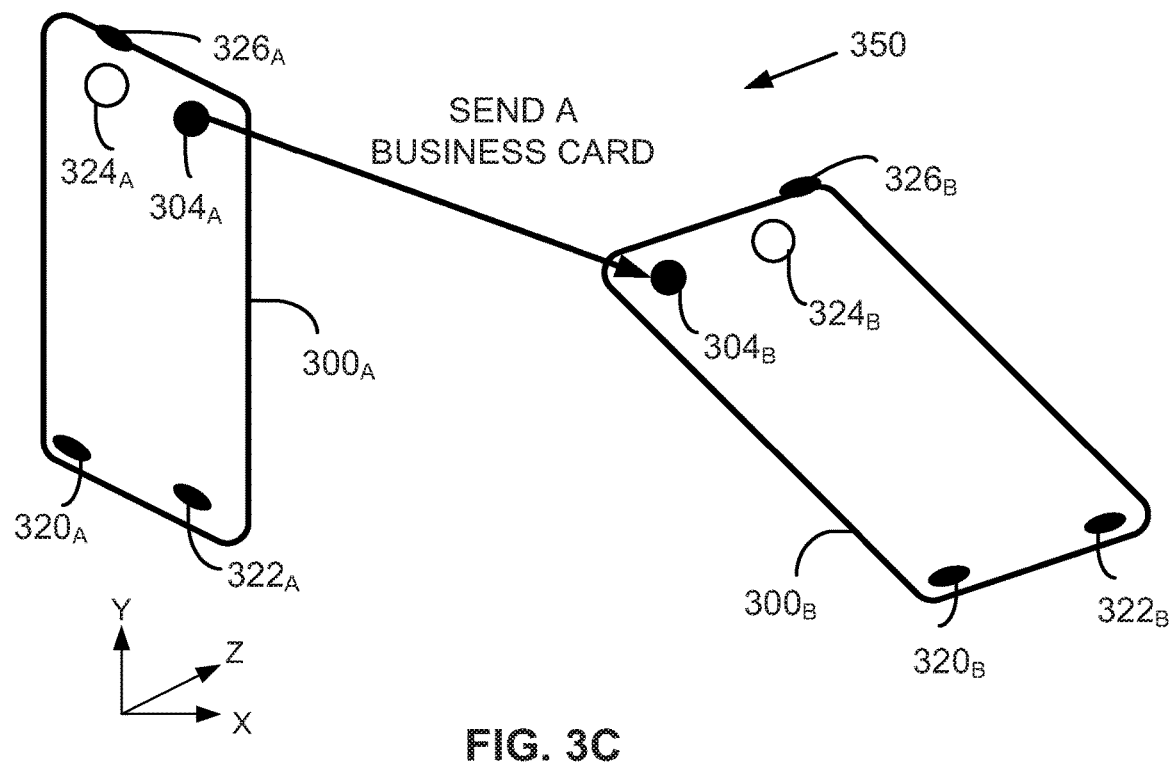
Figure 3D:
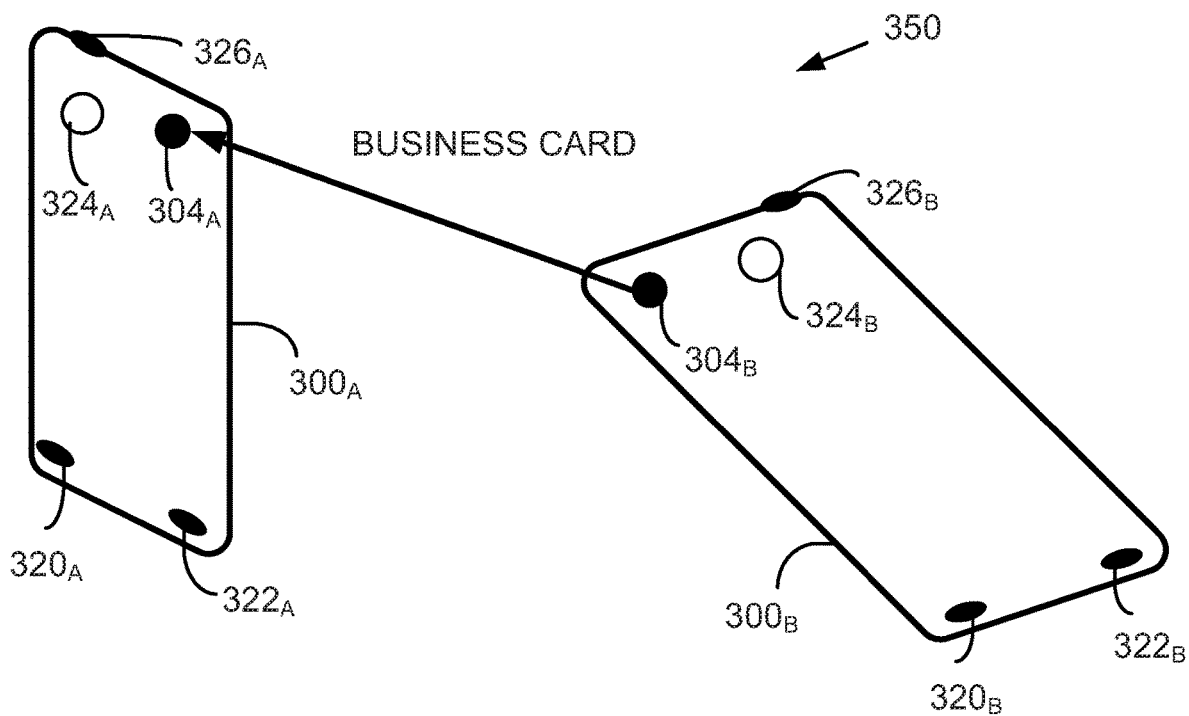
Figure 3E:
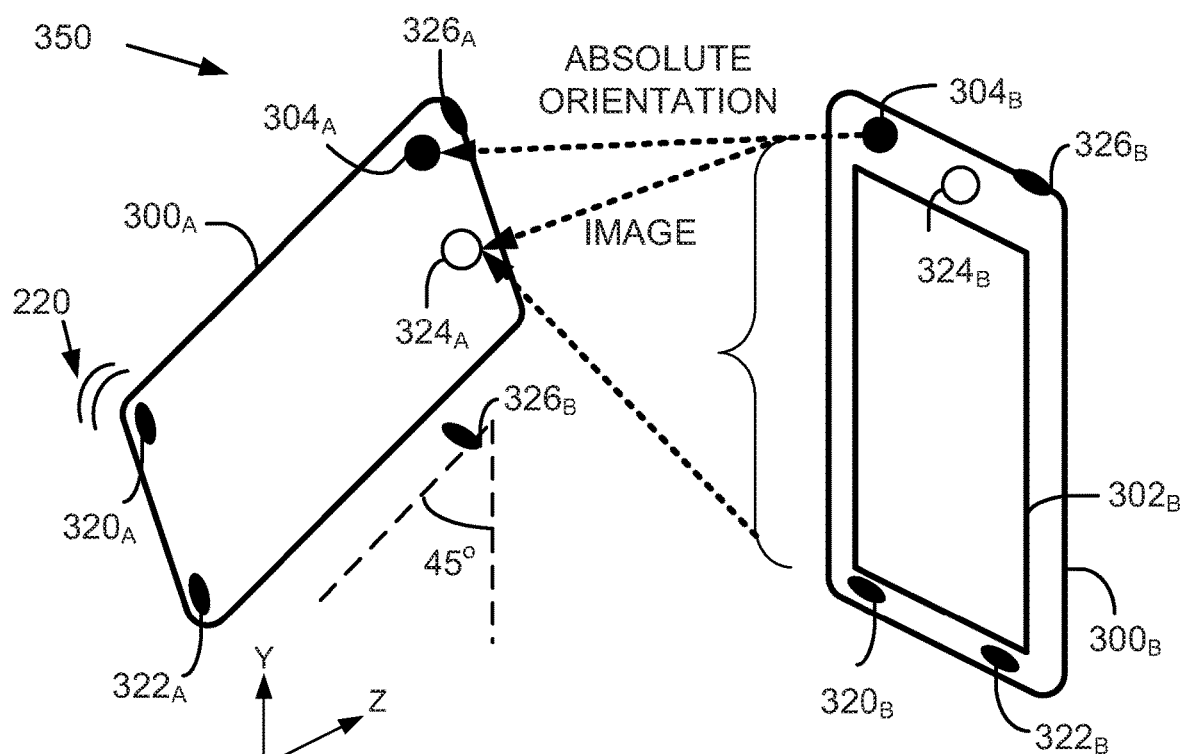
Figure 3F:
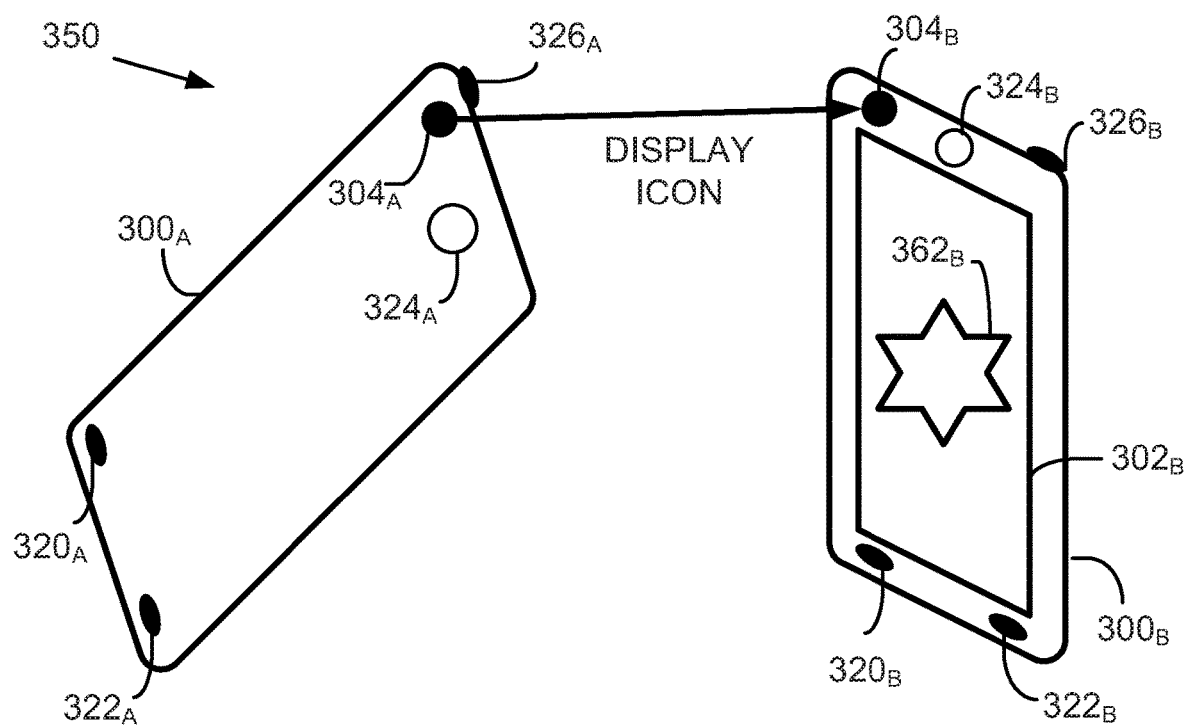
Figure 3G:
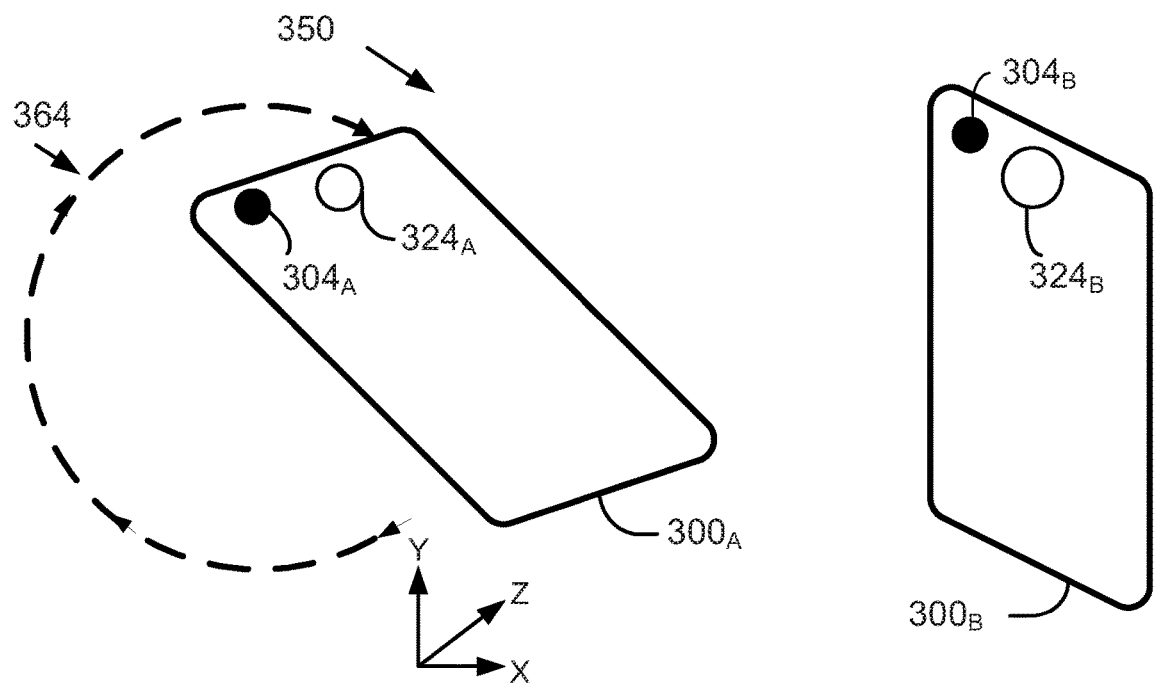
Figure 3H:
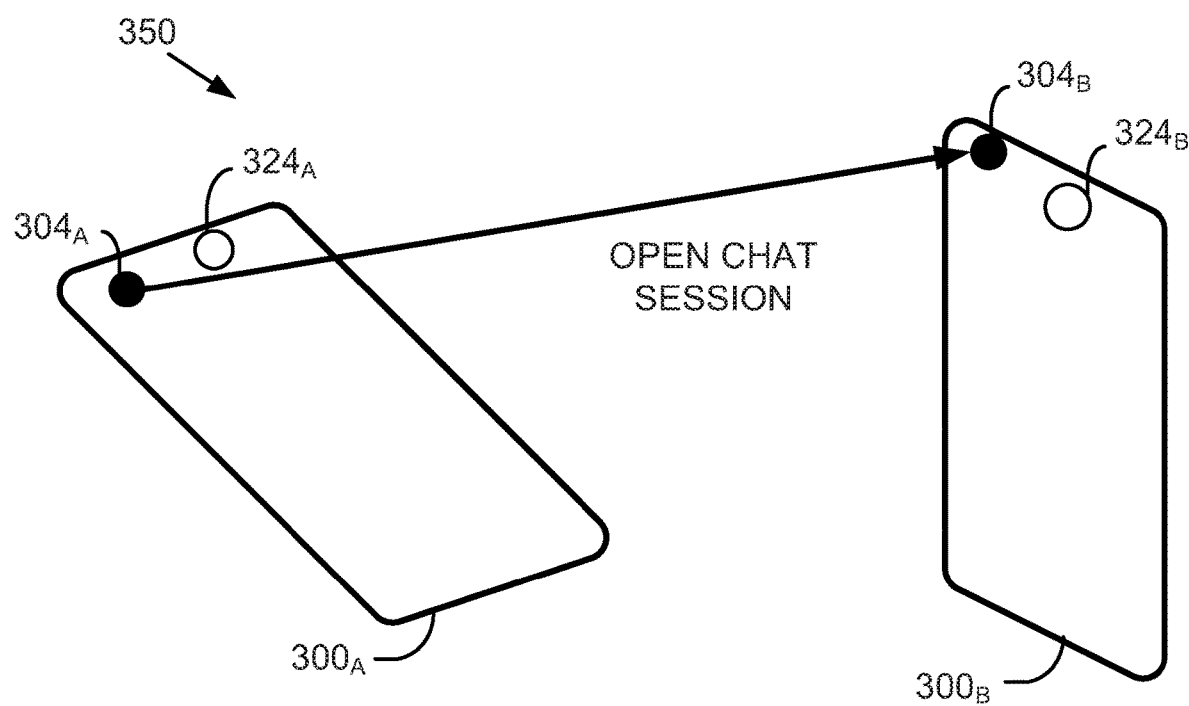
Figure 3I:
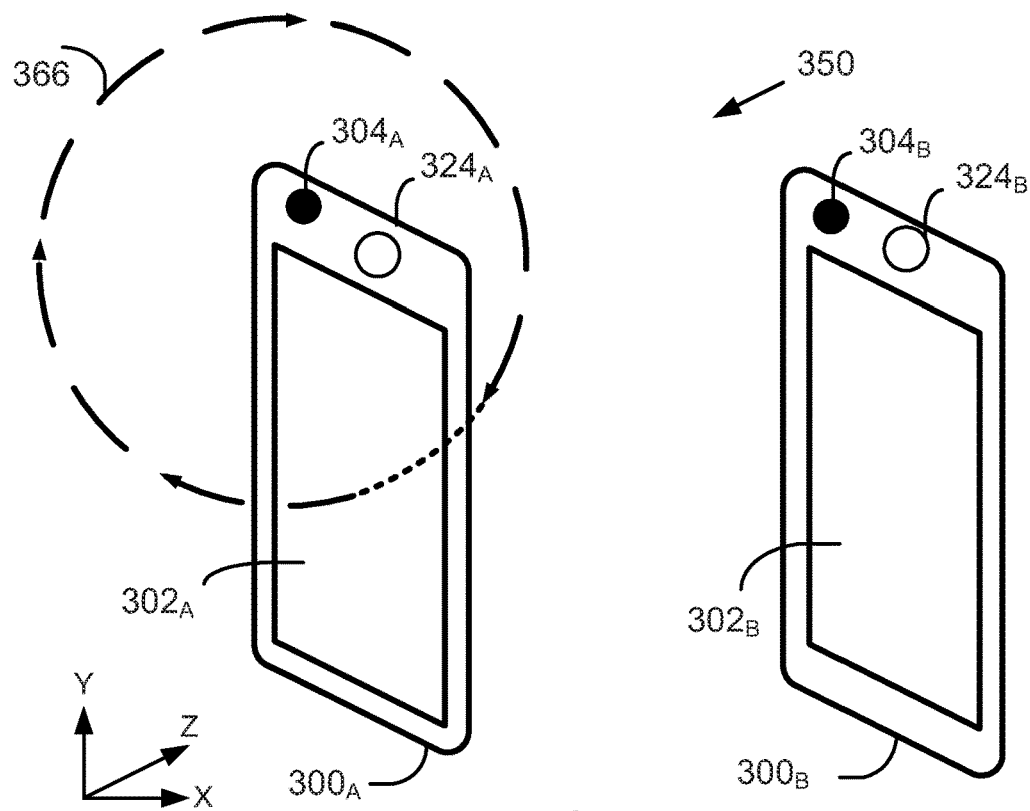
Figure 3J:
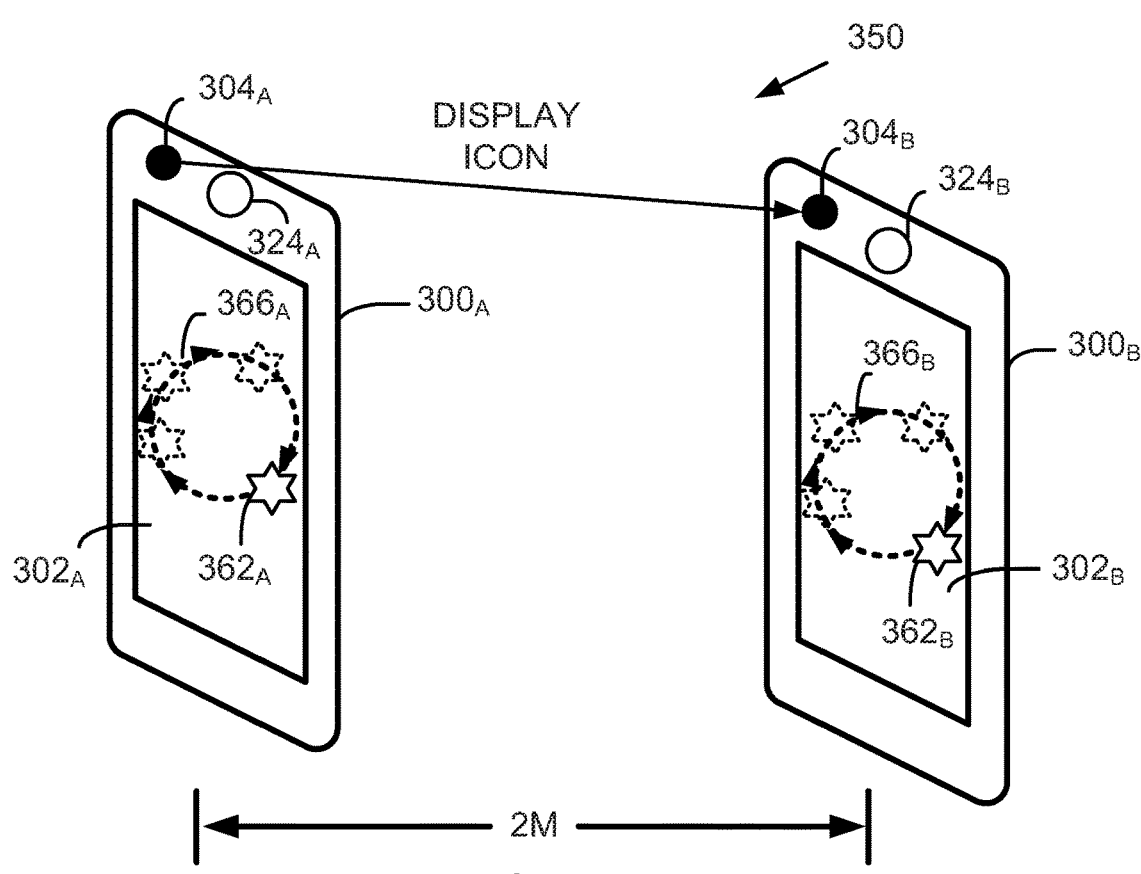
Figure 3K:
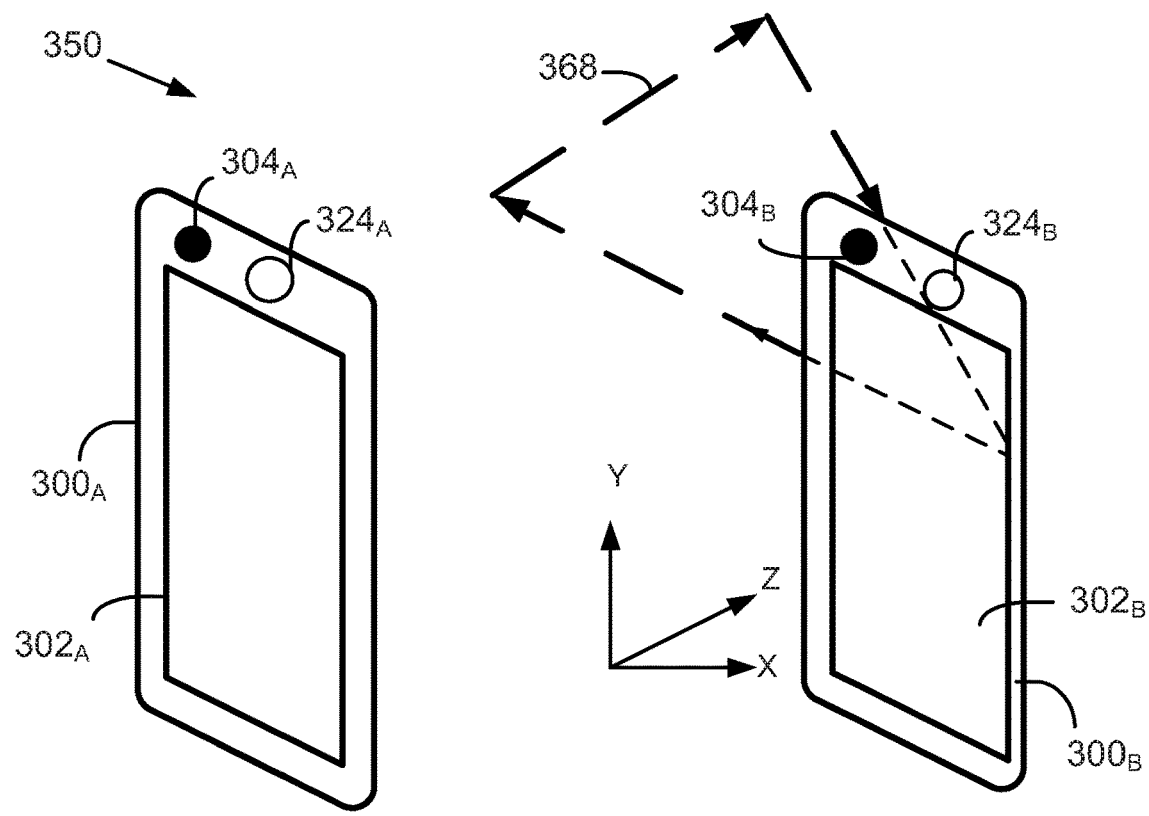
Figure 3L:
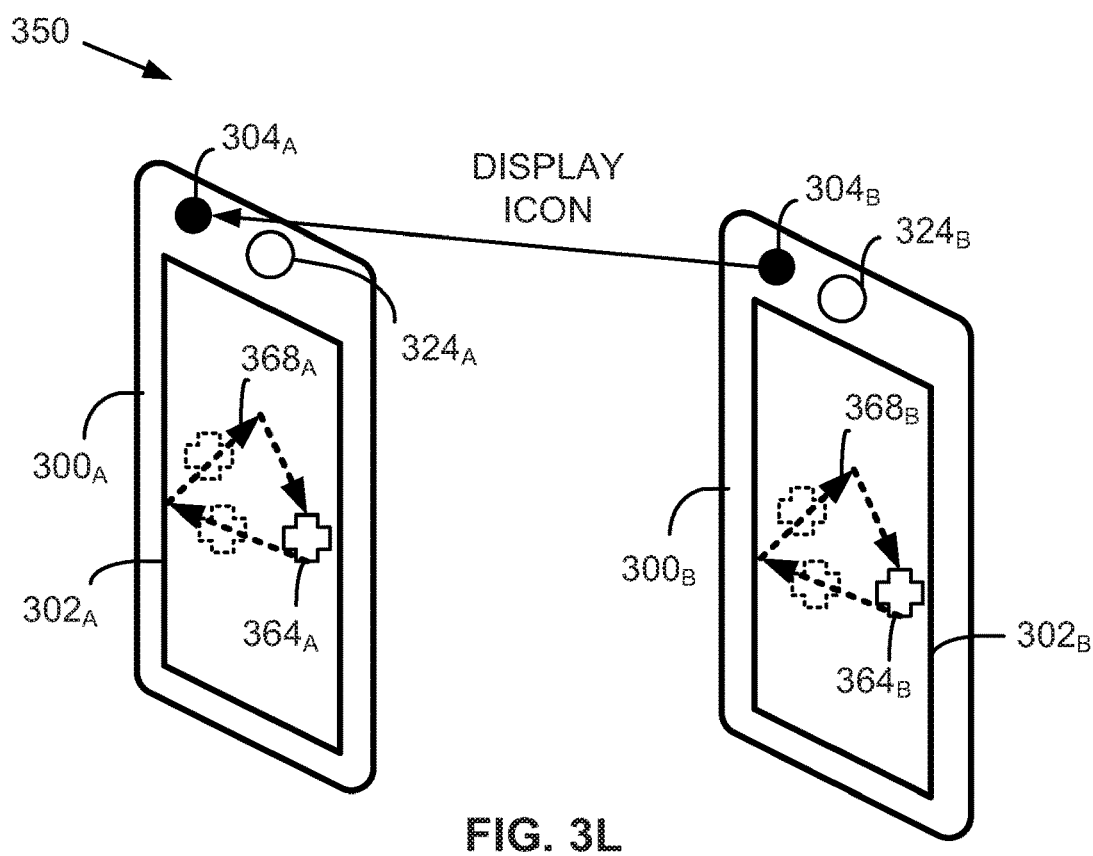
Figure 3M:
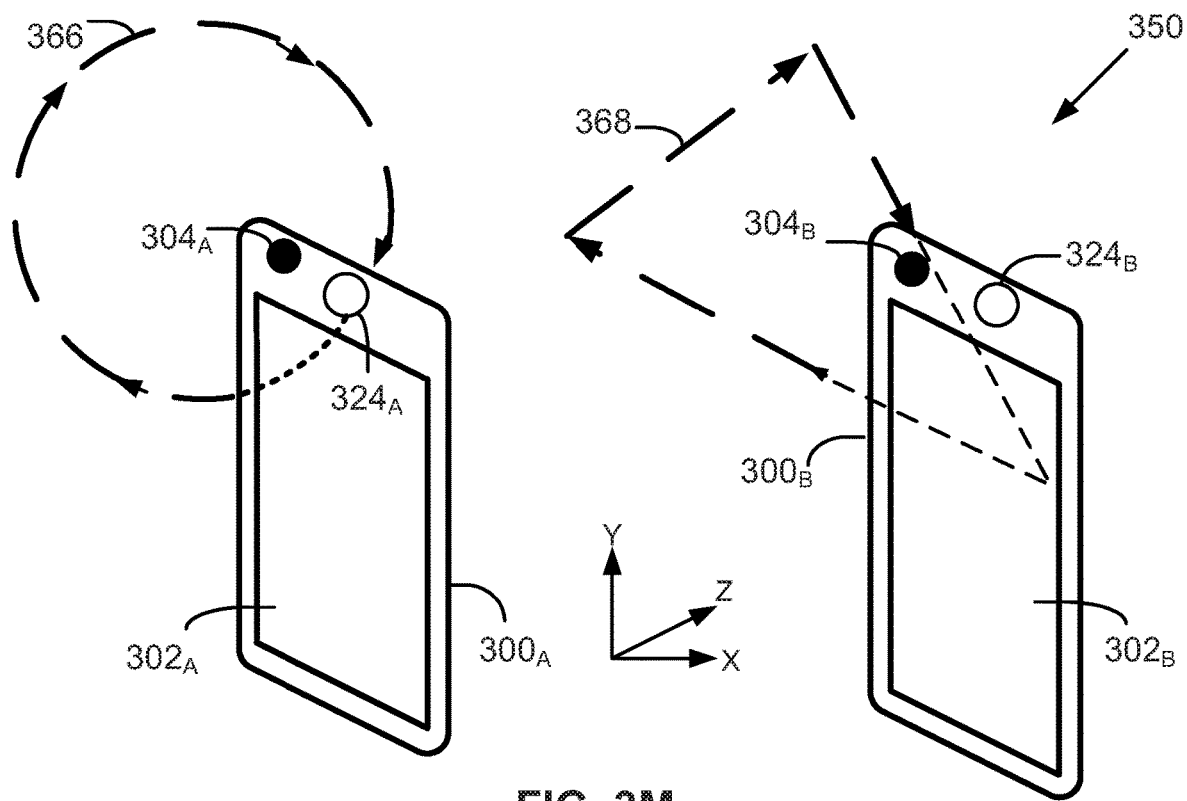
Figure 3N:
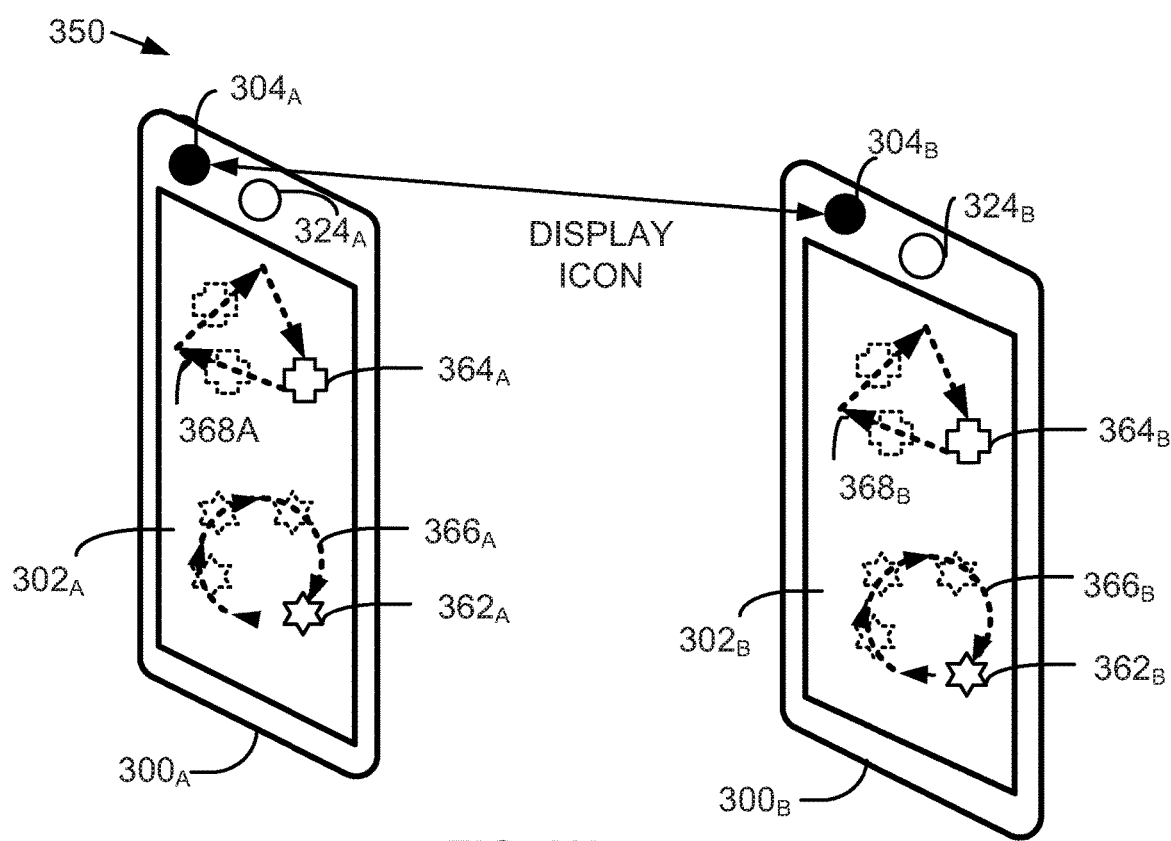
Figure 3O:
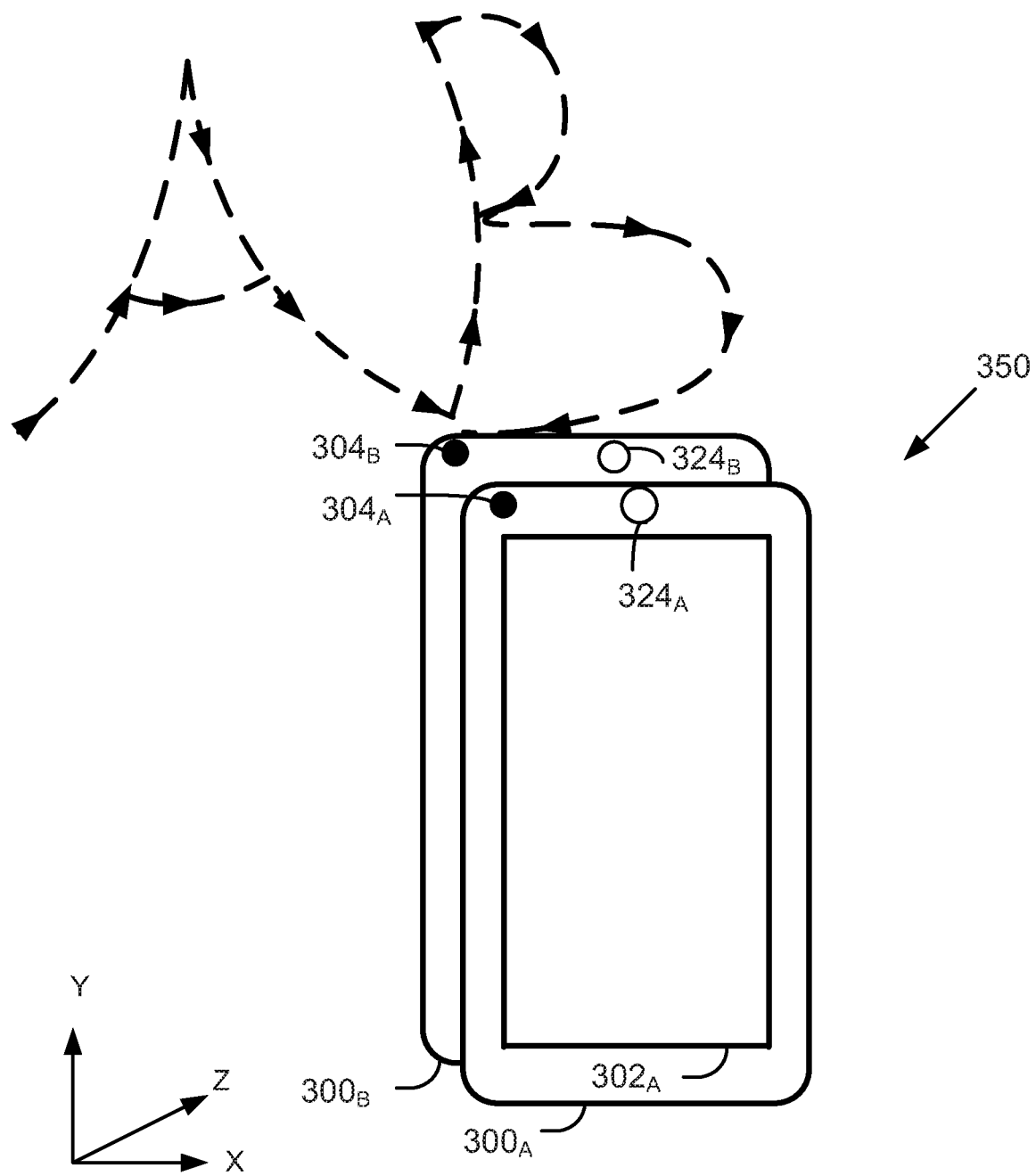
Figure 3P:
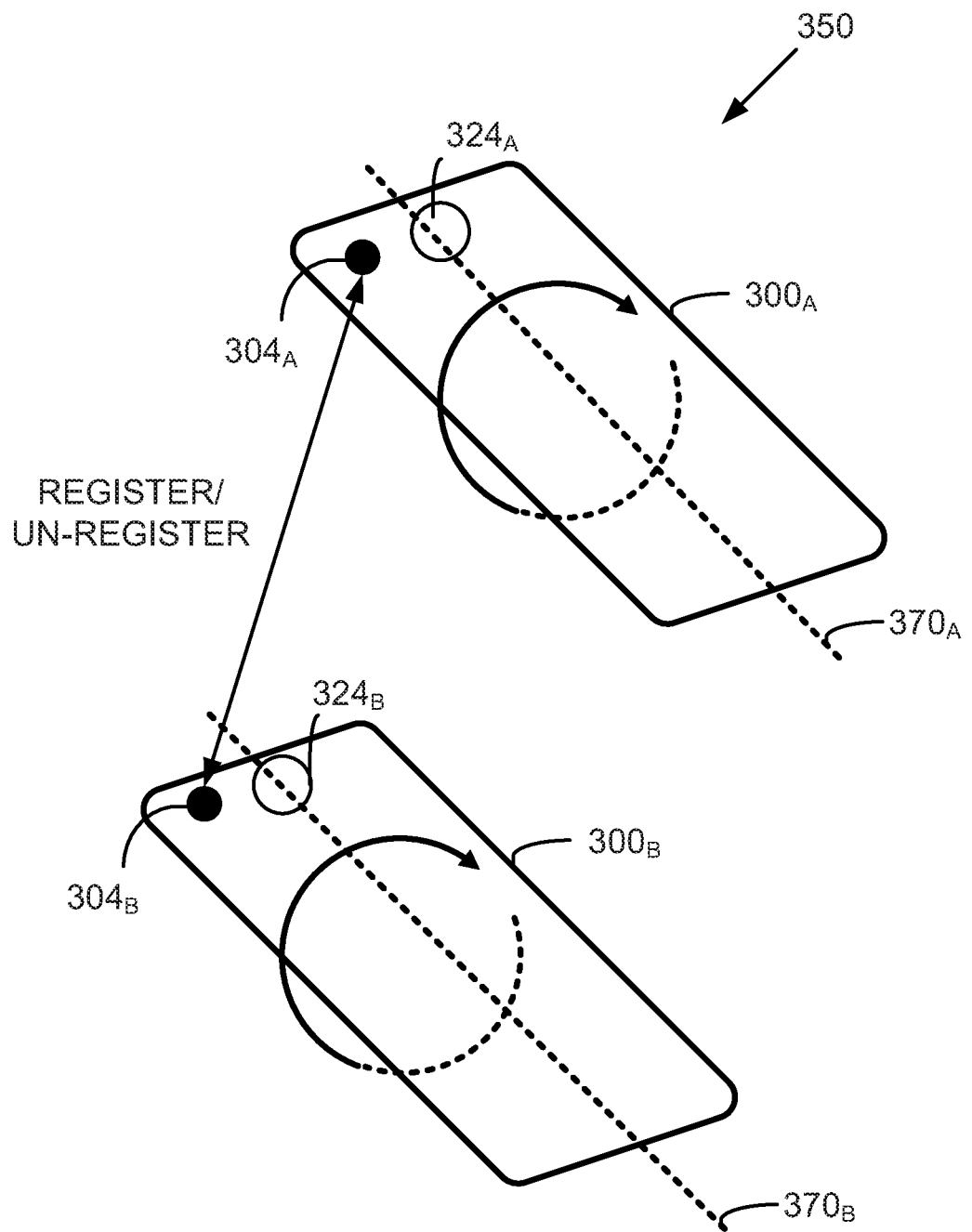
Figure 3Q:
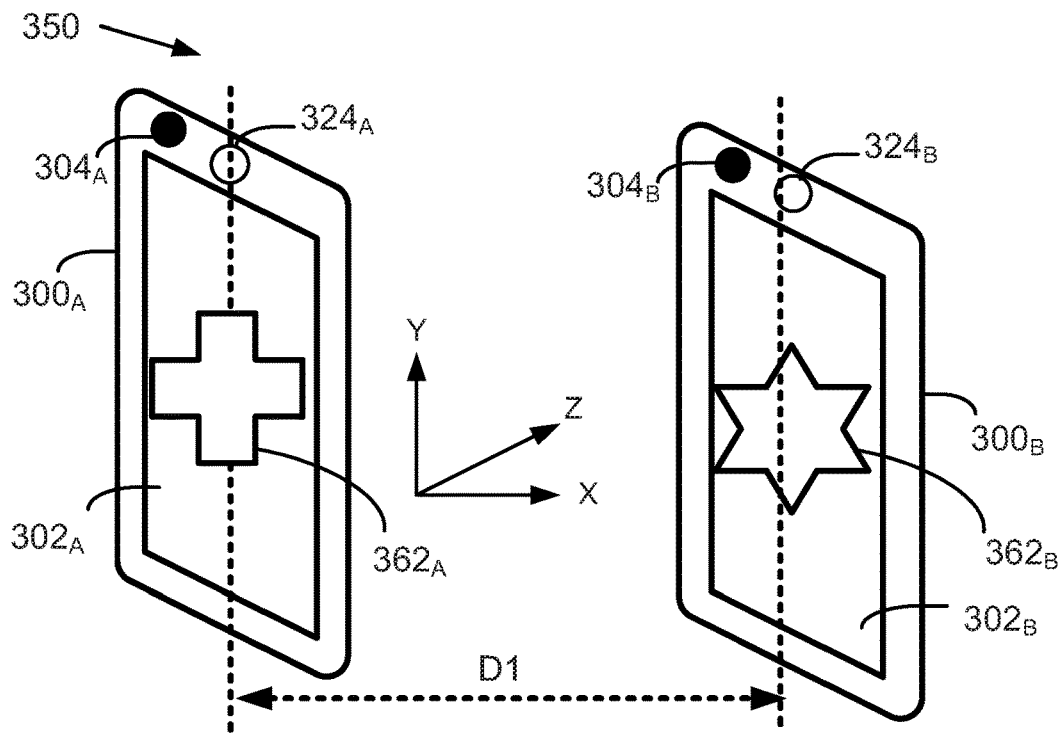
Figure 3R:
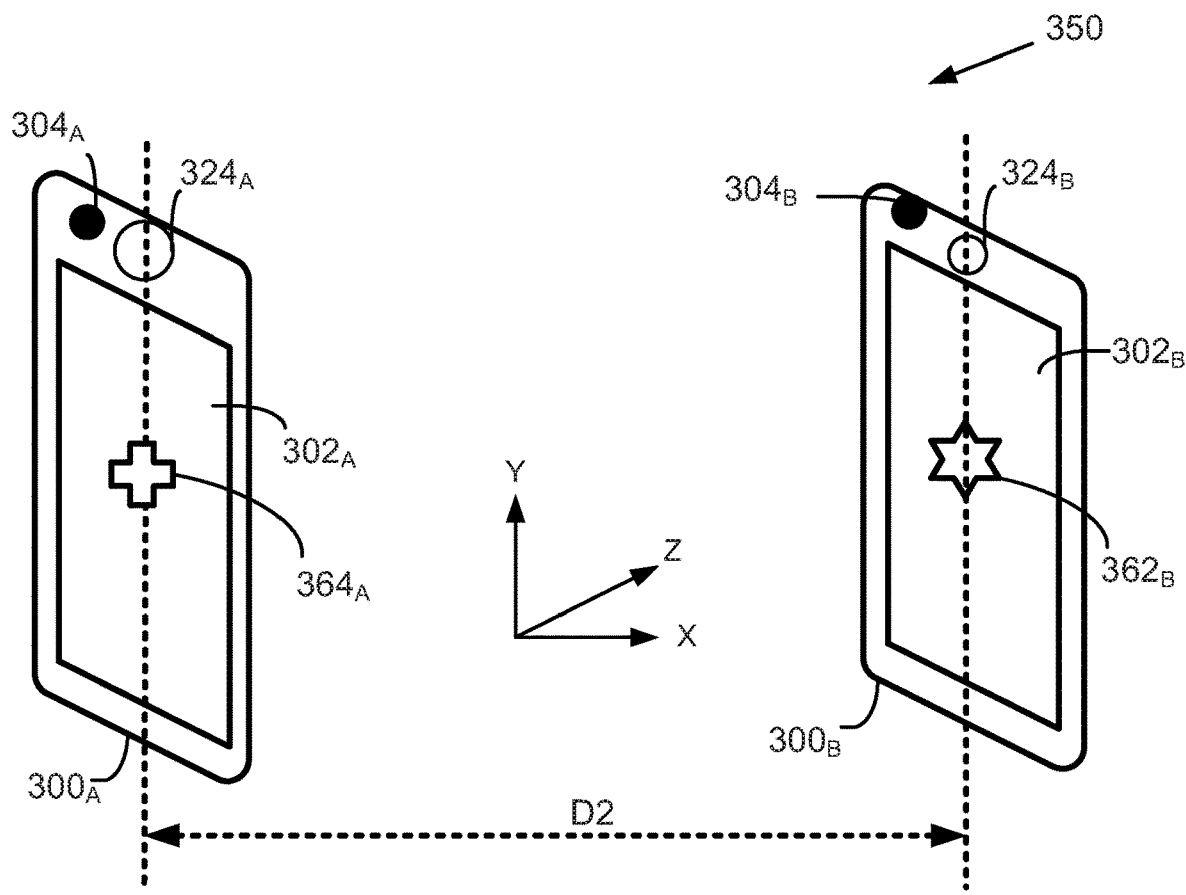
Figure 3S:
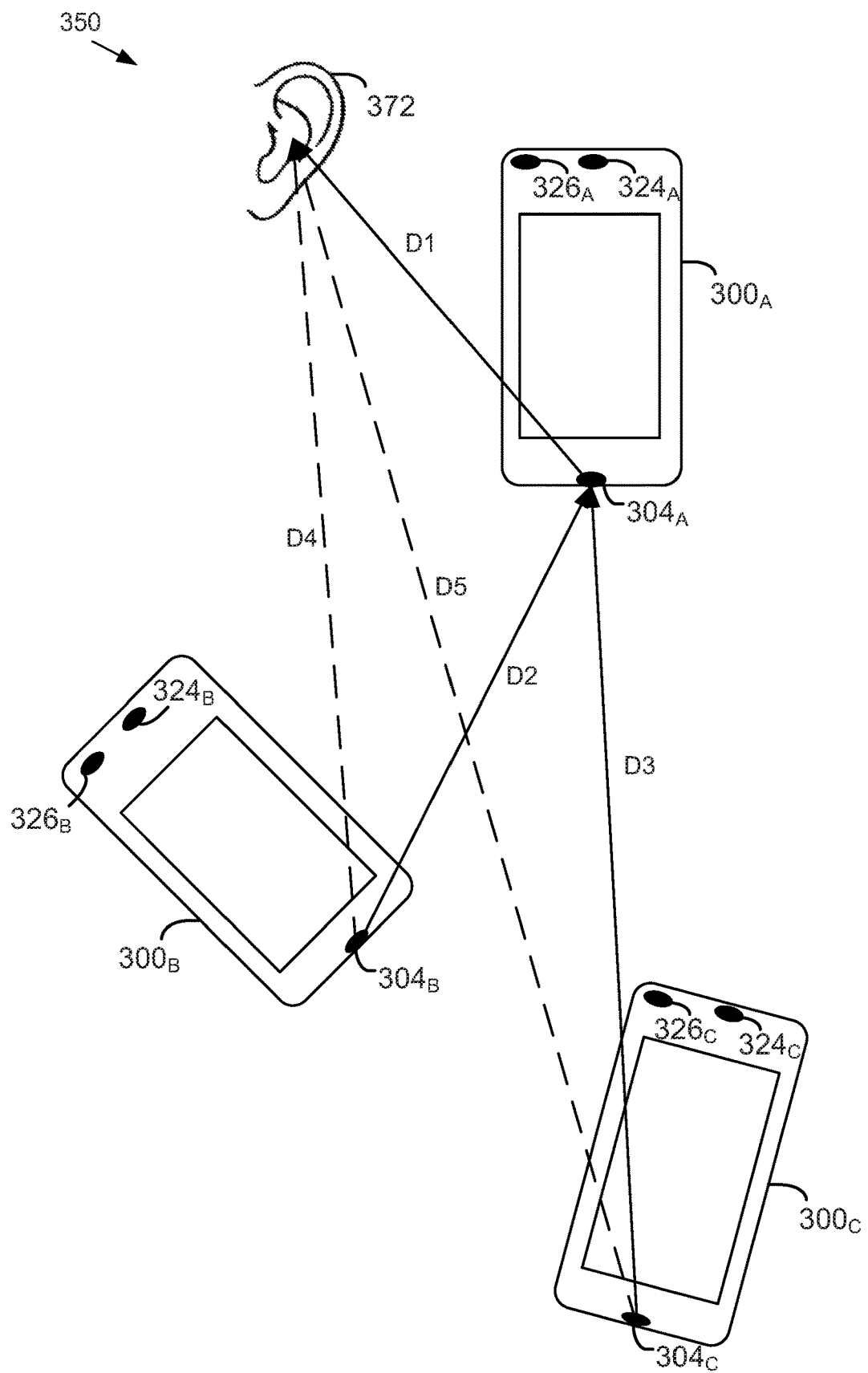
Figure 3T:
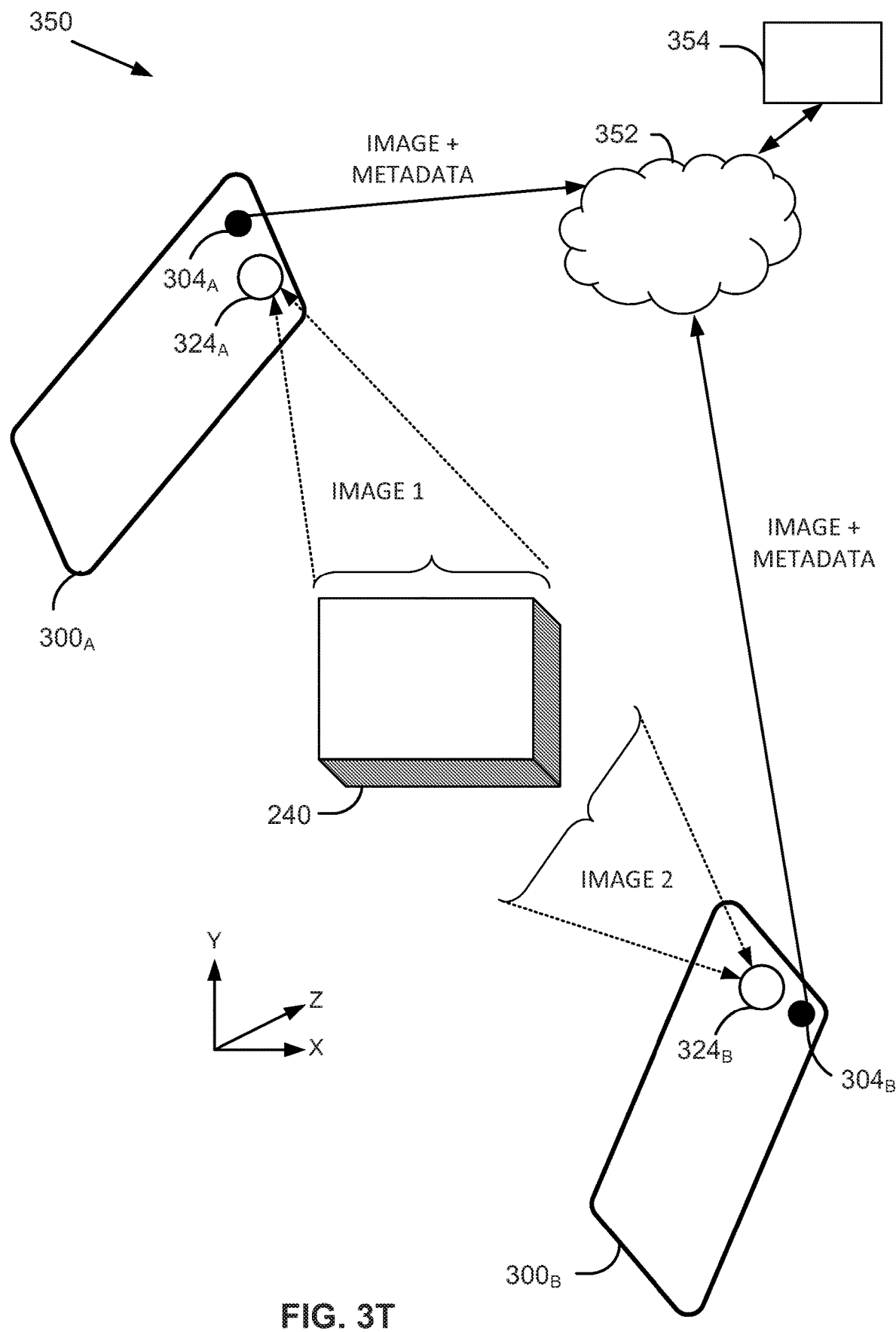

Reference is now made to FIGS. 3A-3T, which are schematic illustrations of a system, generally referenced 350, for implementing a mutual interaction scheme, constructed and operative in accordance with a further embodiment of the disclosed technique. In the description that follows, mobile devices 300A, 300B, and 300C are understood to be operable to perform any of the procedures and calculations described above with respect to FIGS. 2B-2F. Referring to FIG. 3A, system 350 includes mobile device 300A and at least mobile device 300B, represented by respective mobile devices 100A and 100B described above with reference to FIGS. 2A-2F. System 350 may additional include a third mobile device 300C or more mobile devices (not shown) represented by any of mobile devices 100A and 100B described above. In particular, mobile devices 300A, 100B, and 300C communicate with each other via any of: respective transceivers 304A, 304B, 304C corresponding to any of transceivers 104A and 104B; respective speakers 320A, 320B, 320C corresponding to any of speakers 120A and 1204B; respective microphones 322A, 322B, 322C corresponding to any of microphones 122A and 122B; respective cameras 324A, 324B, 324C corresponding to any of cameras 124A and 124B; and respective optical emitters 326A, 326B, 326C corresponding to any of optical emitters 126A and 126B, included therein. Mobile devices 300A, 300B, and 300C may additionally communicate via a network 352 interfacing with respective transceivers 304A, 304B, and 304C. System 350 may optionally include a server 354. Mobile devices 300A, 300B, and 300C may communicate with server 354 via respective transceivers 304A, 304B, and 304C and network 352.

Mobile devices 300A and 300B include respective IMUs 330A and 330B, corresponding to IMUs 130A and 130B described above with reference to mobile devices 100A and 100B of FIGS. 2B-2F. Each of IMUs 330A and 330B includes respective compasses 338A and 338B, respective accelerometers 326A and 326B, and respective gyroscopes 328A and 328B, corresponding to respective compasses 138A and 138B, respective accelerometers 126A and 126B, and respective gyroscopes 128A and 128B described above with reference to mobile devices 100A and 100B of FIGS. 2B-2F. Mobile devices 300A and 300B include respective GPSs 310A, 310B, and respective indoor GPSs 312A and 312B corresponding to respective GPSs 110A, 110B, and respective indoor GPSs 112A and 112B described above with reference to mobile devices 100A and 100B of FIGS. 2B-2F. Mobile devices 300A and 300B include respective memory devices 332A and 332B, respective user interfaces 302A and 302B, and respective processors 334A and 334B corresponding to respective memory devices 132A and 132B, respective user interfaces 102A and 102B, and respective processors 134A and 134B described above with reference to mobile devices 100A and 100B of FIGS. 2B-2F.

For the purpose of clarity, the description that follows with reference to FIGS. 3A-3T relates to the operation of mobile device 300A with respect to mobile device 300B. However, any of the procedures performed by mobile device 300A with respect to mobile device 300B may be additionally and simultaneously performed by mobile device 300B with respect to mobile device 300A. Similarly, any procedures performed by mobile device 300B with respect to mobile device 300A may be additionally and simultaneously be performed by mobile device 300A with respect to mobile device 300B. Furthermore, any of the procedures performed by mobile device 300A with respect to mobile device 300B, may be additionally and simultaneously performed by mobile device 300A with respect to mobile device 300C. Similarly, any procedures performed by mobile device 300B with respect to mobile device 300A may be additionally and simultaneously be performed by mobile device 300C with respect to any of mobile devices 300A or 300B, allowing the implementation of a fully mutually interactive scheme therebetween. It may further be noted that any of the procedures described hereinbelow may be implemented by server 354 in communication with any of mobile devices 300A and 300B.

Mobile device 300A discovers mobile device 300B via a mutual interaction application configured with each of mobile devices 300A and 300B using any of the discovery techniques described above with respect to FIGS. 2A-2F. The mutual interaction application may be received in advance at each of mobile devices 300A and 300B from server 354.

Once each of mobile devices 300A and 300B have mutually discovered and identified each other respective mobile device 300A and 300B, mobile devices 300A and 300B register to a mutually interactive application, which associates a mutual interaction scheme therebetween, the description of which now follows.

Reference is now made to FIG. 3B, which illustrates an exemplary mutual interaction scheme 360, in accordance with a further embodiment of the disclosed techniques. The mutual interaction application described above with reference to FIG. 3A provides each of mobile devices 300A and 300B with access to mutual interaction scheme 360. For example, mobile devices 300A and 300B may receive mutual interaction scheme 360 from a cloud-sharing platform configured with server 354 via respective transceivers 304A and 304B and network 352. Alternatively, mobile devices 300A and 300B may access mutual interaction scheme 360 via network 352 and respective transceivers 304A and 304B as a cloud-based resource stored at server 354. Alternatively, one of mobile devices 300A or 300B may provide the other respective device with mutual interaction scheme 360 via respective transceivers 304A and 304B, either directly (i.e. BlueTooth), or via network 352.

Referring back to FIG. 3B, mutual interaction scheme 360 associates at least one position scheme with at least one respective action, such as by defining one or more association rules. The associations between any of the position schemes and the respective actions may be one-to-one, one-to-many, many-to-one, or many-to-many. The positions schemes of mutual interaction scheme 360 relate to at least one of: an absolute orientation, a relative orientation, an absolute position, a relative position, an absolute trajectory, and a relative trajectory of any of mobile devices 300A and 300B.

One or more of the position schemes of mutual interaction scheme 360 may be static in that compliance with a static position scheme does not require detecting motion of mobile device 300A. For example, compliance with a static position scheme may require stabilizing mobile device 300A at a predefined orientation for a minimal time duration, or maintaining a predefined distance between two mobile devices. A static position scheme may specify an absolute orientation and position for mobile device 300A, or a relative orientation and position for mobile device 300A with respect to mobile device 300B or another object. The first position scheme of mutual interaction scheme 360 illustrates an exemplary static position scheme: i.e. mobile device 300A complies with the first position scheme when mobile device 300A is stabilized at an absolute vertical orientation for two seconds.

One or more of the position schemes of mutual interaction scheme 360 may be dynamic in that compliance with the dynamic position scheme requires detecting a motion by mobile device 300A. For example, compliance with a dynamic position scheme may require tracing a spatial trajectory with mobile device 300A. The spatial trajectories include one or more translations and/or rotations by the mobile device, such as but not limited to: a linear translation of the mobile device in any of 360° of freedom, twisting, turning, and tilting of the mobile device about an internal axis of rotation, drawing a shape in space or forming a gesture with the mobile device, combinations thereof.

One or more of the dynamic position schemes may be path-independent where compliance require moving mobile device 300A and terminating at a predefined orientation or position, regardless of the specific trajectory traced. The second position scheme of mutual interaction scheme 360 illustrates an exemplary path-independent dynamic position scheme, i.e. mobile device 300A complies with the second position scheme when mobile device 300A is moved in a trajectory that terminates in a relative orientation of 45° with respect to mobile device 300B, irregardless of the specific trajectory.

One or more of the dynamic position schemes may be path-dependent, in that compliance requires tracing a specific spatial trajectory with mobile device 300A. The third position scheme of mutual interaction scheme 360 illustrates an exemplary path-dependent dynamic position scheme, i.e. mobile device 300A complies with the third position scheme when mobile device 300A is moved in a "C"-shaped trajectory. Additionally, one of the position schemes of mutual interaction scheme 360 may be a combination of path-dependent and path-independent position schemes.

In one embodiment, mutual interaction scheme 360 is fully reciprocal. In a fully reciprocal scheme, every association rule applicable by mobile device 300A is also applicable by mobile device 300B, and thus each of mobile devices 300A and 300B are provided with the same set of association rules.

In another embodiment, mutual interaction scheme 360 is partially reciprocal in that one or more association rules applicable by mobile device 300A is also applicable by mobile device 300B, and one or more association rules are exclusively applicable only one of mobile device 300A or mobile device 300B. For example, mobile device 300A may be associated with a paid subscription having access to a full set of features, corresponding to a complete set of association rules, and mobile device 300B may be associated with a free subscription having access to only a partial set of features, corresponding to a subset of the association rules. Alternatively, each of mobile devices 300A and 300B subscribe to a different set of features, corresponding to one or more commonly shared, or reciprocated association rules, and one or more association rules exclusive to each of mobile devices 300A and 300B.

In a further embodiment, mutual interaction scheme 360 is exclusive in that mobile device 300A is provided with a first set of association rules, and mobile device 300B is provided with a second set of association rules, where the first and second sets of association rules are disjoint but complementary, resulting in a mutual interaction scheme formed by their combination. For example, mobile devices 300A and 300B may be configured in a master-slave framework.

The mutual interaction scheme 360 illustrated in FIG. 3B, defines multiple association rules numbered 1 through 10. Each association rule is applicable to each of mobile devices 300A and 300B, each association rule at least associating a position scheme of one of mobile devices 300A and 300B with a respective action to be executed by the other of mobile devices 300A and 300B.

In the exemplary mutual interaction scheme 360 shown in FIG. 3B, compliance of mobile device 300A with the first position scheme is associated with the action of sending a business card by mobile device 300B, in accordance with the first association rule. Compliance by mobile device 300A with the second position scheme is associated with the action of displaying an icon on user interface 302B of mobile device 300B, in accordance with the second association rule. Compliance of mobile device 300A with third position scheme is associated with the action of invoking on mobile device 300B an interactive chat session with mobile device 300A, in accordance with the third association rule, and so on.

Reference is now made to FIGS. 3C-3D, which illustrate an exemplary implementation of the first rule of mutual interactive scheme 360. Referring to FIG. 3C, a user (not shown) supports mobile device 300A vertically for at least 2 seconds. Mobile device 300A acquires one or more respective position properties relating to any of: an absolute position, a relative position, an absolute orientation, a relative orientation, an absolute motion or trajectory, and a relative motion or trajectory of mobile device 300A by applying at least one of the techniques described above with reference to FIGS. 2A-2F. In this case, mobile device 300A acquires the absolute vertical orientation of mobile device 300A, stabilized for at least 2 seconds.

With reference now additionally made to FIG. 3B, on acquiring at least one position property of mobile device 300A, mobile device 300A compares the acquired position property with the position schemes defined by mutual interaction scheme 360. Mobile device 300A determines that the acquired position property complies with the first rule of mutual interaction scheme 360, corresponding to a stabilized absolute vertical orientation of at least 2 seconds. Mobile device 300A identifies the first association rule corresponding to the first position scheme with which the acquired position properties complies.

Accordingly, mobile device 300A triggers on mobile device 300B the execution of the respective action according to the identified association rule of mutual interaction scheme 360. In this example, mobile device 300A triggers mobile device 300B to send mobile device 300A a business card in accordance with the first association rule. Mobile device 300A may perform the triggering by sending mobile device 300B a notification to execute the respective action via respective transceivers 304A and 304B of mobile devices 300A and 300B. Additionally or alternatively, mobile device 300A emits the notification as an optical signal via optical emitter 326A to trigger mobile device 300B, and mobile device 300B receives the optical notification via camera 324B. Additionally or alternatively, mobile device 300A emits the notification as an acoustic signal via speaker 320A to trigger mobile device 300B, and mobile device 300B receives the acoustic notification via microphone 322B.

Mobile device 300B executes the respective action triggered by mobile device 300A. Thus, in the example of FIG. 3C, mobile device 300B responds to the notification, and sends the business card to mobile device 300A, such as via respective transceivers 304A and 304B of mobile devices 300A and 300B.

In one implementation, mobile device 300A remotely controls mobile device 300B to execute the respective action via the notification. Alternatively, mobile device 300B maintains control of the execution of the respective action indicated by the notification, and locally imposes one or more criterion, such as the compliance of mobile device 300B with a position property of mutual interaction scheme 360. In such a case, mobile device 300B conditions the execution of the respective action on the fulfillment of the criterion.

According to another embodiment of the disclosed techniques, mobile device 300A additionally determines the compliance of an acquired position property of mobile device 300B with one of the position schemes of mutual interaction scheme 360. The position property of mobile device 300B relates to at least one of: an absolute orientation, a relative orientation, an absolute position, a relative position, an absolute trajectory, and a relative trajectory of mobile device 300B.

Reference is now made to FIGS. 3E-3F, which illustrate an exemplary implementation of the second rule of mutual interactive scheme 360 of FIG. 3B in accordance with this embodiment. The user (not shown) moves mobile device 300A in a trajectory, indicated by arcs 220. Mobile device 300A detects the motion, and acquires the position property of mobile device 300A, as described hereinabove with reference to FIGS. 2A-2F. In order to determine compliance with the second position scheme of mutual interactions scheme 360, mobile device 300A is required to determine the relative orientation of mobile device 300A with respect to mobile device 300B, and thus additionally requires one or more position properties of mobile device 200B. Mobile device 300A acquires the one or more position properties of mobile device 300B, using any of the techniques described hereinabove with reference to mobile devices 100A and 100B of FIGS. 2A-2F. Mobile device 300A applies the combination of the acquired position properties of mobile devices 300A and 300B to determine that the relative orientation therebetween is 45°.

With reference now made additionally to FIG. 3B, mobile device 300A compares the determined relative orientation between mobile devices 300A and 300B to the position schemes of mutual interaction scheme 360. Accordingly, mobile device 300A determines that the relative orientation of 45° between mobile devices 300A and 300B complies with the position scheme corresponding to the second rule of mutual interaction scheme 360. Mobile device 300A triggers the execution of the respective action accordingly, by sending of a notification via respective transceivers 304A and 304B. Additionally or alternatively, the notification may be sent via any of optical emitter 326A optically coupled with camera 324B, and speaker 320A acoustically coupled with microphone 322B. In this example, the respective action is to display an icon 362B identifying mobile device 300A on user interface 302B of mobile device 300B.

Referring to FIG. 3F, mobile device 300A sends the notification to mobile device 300B, thereby triggering the execution of the respective action. Mobile device 300B executes the triggered action and displays icon 362B (a star) identified with mobile device 300A, on display 302B of mobile device 300B, accordingly. In another implementation, mobile device 300B independently determines that the relative orientation between mobile device 300B and mobile device 300A complies with the second position scheme of mutual interaction scheme 360 before displaying icon 362B on display 302B of mobile device 300B.

Reference is now made to FIGS. 3G-3H, which together illustrate an exemplary implementation of the third rule of mutual interactive scheme 360, in accordance with a further embodiment of the disclosed techniques. The user (not shown) moves mobile device 300A in a "C" shaped trajectory 364, shown in FIG. 3G. IMU 330A of mobile device 300A acquires the traced namely the "C" shaped trajectory. With reference made additionally to FIG. 3B, mobile device 300A compares the trajectory to the position schemes of mutual interaction scheme 360. Mobile device 300A determines that the acquired "C" shaped trajectory complies with the third, dynamic, path-dependent position scheme of mutual interaction scheme 360. Accordingly, mobile device 300A triggers mobile device 300B to invoke an interactive chat session with mobile device 300A, as shown in FIG. 3H, by sending a notification using any of the techniques described hereinabove, such as the methods described with respect to FIGS. 3E-3F.

According to another embodiment of the disclosed techniques, mobile device 300A executes one or more of the respective actions in response to determining that the acquired position property of mobile device 300A complies with one of the position schemes of mutual interaction scheme 360.

Reference is now made to FIGS. 3I-3J together with FIG. 3B which show an implementation of a fourth rule of mutual interaction scheme 360, in accordance with this embodiment of the disclosed techniques. According to the fourth rule of mutual interaction scheme 360, compliance with the fourth position scheme by mobile device 300A causes each of mobile devices 300A and 300B to execute a respective action: one of the respective actions is triggered by device 300A objectively onto device 300B for execution by device 300B, and the other respective action is executed reflexively by device 300A.

The user (not shown) moves mobile device 300A in a circular shaped trajectory 366, shown in FIG. 3I, resulting in tracing a closed circular shape. IMU 330A of mobile device 300A acquires the position property of mobile device 300A, namely the closed-circle trajectory traced by mobile device 300A. Mobile device 300A compares the trajectory to the position schemes of mutual interaction scheme 360. Mobile device 300A determines that the acquired closed-circle trajectory complies with the fourth position scheme of mutual interaction scheme 360. Accordingly, referring to FIG. 3J, mobile device 300A applies the fourth rule of mutual interaction scheme 360 and executes the respective action to indicate the acquired trajectory of mobile device 300A reflexively, by displaying star icon 362A, identified with mobile device 300A, tracing a closed circular trajectory 366A at user interface 302A of mobile device 300A. Additionally, mobile device 300A triggers mobile device 300B to display the acquired trajectory of mobile device 300A at user interface 302B mobile device 300B by sending a notification using any of the techniques described above with respective to FIGS. 3E-3F. For example, the notification may be sent via respective transceivers 304A and 304B. Mobile device 300B responds to the notification and executes the respective action by displaying star icon 362B, identified with mobile device 300A, tracing a closed circular trajectory 366B at user interface 302B mobile device 300B. Thus, in response to tracing a circular shaped trajectory by mobile device 300A, respective star icons 362A and 362B, associated with mobile device 300A are displayed moving in a corresponding circular trajectory at each of the respective user interfaces 302A and 302B of mobile devices 300A and 300B.

The respective action for the fourth association rule of mutual interaction scheme 360 indicates the compliance of mobile device 300A with the fourth position scheme. In the example given above, the indication of the compliance is implemented by displaying the indication at respective user interfaces 302A and 302B of respective mobile devices 300A and 300B. However, the indication may be implemented by additional or alternative means. For example, the compliance of mobile device 300A may be indicated by sounding an audio indication at any of speakers 320A and 320B of mobile devices 300A and 300B, or by emitting an optical signal by any of optical emitters 326A and 326B of respective mobile devices 300A and 300B, shown in FIG. 3A.

As described above, mutual interaction scheme 360 may be any of: fully reciprocal, partially reciprocal, or exclusive. Thus, the association rules of mutual interaction scheme 360 that are used to determine compliance of the acquired position properties of mobile device 300B may be the same, partially the same, or different than the association rules of mutual interaction scheme 360 that are used to determine compliance of the acquired position properties of mobile device 300A.

According to another a further embodiment of the disclosed techniques, the execution by mobile device 300B of the respective action triggered by mobile device 300A, is conditioned on the determined compliance of the acquired position property of mobile device 300B with the position scheme of mutual interaction scheme 360. For example, mobile device 300B may execute the action triggered by mobile device 300A only if both mobile devices 300A and 300B trace the same gesture, or are both orientated at an absolute, predefined orientation, or if their respective acquired trajectories, relative orientation or position complies with a predefined position scheme. Turning to the example above with reference to FIGS. 3I-3J, mobile device 300B conditions displaying icon 362B on display 302B of mobile device 300B on determining that a distance between mobile device 300A and mobile device 300B is less than 2 meters.

According to a another embodiment of the disclosed technique, any of the techniques described above for mobile device 300A respective of mobile device 300B, may be applied by mobile device 300B respective of mobile device 300A. Accordingly, IMU 330B of mobile device 300B acquires a position property of mobile device 300B, and mobile device 300B determines that the acquired position property of mobile device 300B complies with at least one of the position schemes of mutual interaction scheme 360. Mobile device 300B identifies the respective action associated with the position scheme with which the acquired position property complies, and triggers the execution of the identified action on mobile device 300A using any of the techniques described hereinabove with respect to mobile device 300A. Mobile device 300A executes the respective action triggered by mobile device 300B, accordingly.

In one implementation of this embodiment, mobile device 300B remotely controls mobile device 300A to execute the respective action via the notification. Alternatively, mobile device 300A maintains control of the execution of the respective action indicated by the notification, by conditioning the execution of the respective action on the fulfillment of one or more criterion.

Reference is now made to FIGS. 3K-3L together with FIG. 3B, which illustrate another application of the fourth rule of mutual interaction scheme 360, in accordance with this embodiment of the disclosed techniques. The user (not shown) moves mobile device 300B in a triangular trajectory 368, shown in FIG. 3K, resulting in tracing a closed triangular shape. IMU 330B of mobile device 300B acquires the position property of mobile device 300B, namely the closed-triangular trajectory traced by mobile device 300B. Mobile device 300B compares the trajectory to the position schemes of mutual interaction scheme 360. Mobile device 300B determines that the acquired closed-triangular trajectory complies with the fourth position scheme of mutual interaction scheme 360. Accordingly, mobile device 300B applies the fourth rule of mutual interaction scheme 360.

Referring to FIG. 3L, mobile device 300B executes the respective action associated with the fourth position scheme reflexively, by indicating the acquired trajectory 368 of mobile device 300B at user interface 302B. Mobile device 300B indicates the trajectory by displaying a "+" icon 364B, identified with mobile device 300B, tracing a closed triangular trajectory 368B, corresponding to the acquired trajectory 368. Additionally, mobile device 300B triggers the execution of the respective action objectively onto mobile device 300A. Mobile device 300B triggers mobile device 300A using any of the techniques described hereinabove, with respect to FIGS. 3E-3F, such as by sending a notification via respective transceivers 304A and 304B. Mobile device 300A responds to the notification and executes the respective action by displaying a "+" icon 364A, identified with mobile device 300B, tracing a closed triangular trajectory 368A at user interface 302A mobile device 300A. Thus, in response to tracing a triangular shaped trajectory 368 by mobile device 300B, respective icons 368A and 368B, identified with mobile device 300B, are displayed moving in respective corresponding triangular trajectories 368A and 368B at each of the respective user interfaces 302A and 302B of respective mobile devices 300A and 300B.

As discussed above with respect to mobile device 300A, additionally or alternatively, the compliance of mobile device 300B may be indicated by sounding an audio indication at any of speakers 320A and 320B of mobile devices 300A and 300B, or by emitting a visual signal by any of optical emitters 326A and 326B of respective mobile devices 300A and 300B, shown in FIG. 3A.

Each of mobile devices 300A and 300B may display their respective position properties using a different, identifying icon, such as icons 362A and 362B (stars) associated with mobile device 300A and shown in FIGS. 3I-3J, and icons 364A and 364B ("+" signs) associated with mobile device 300B and shown in FIGS. 3K-3L. This may be useful for tracking the positions, orientations and trajectories for respective mobile devices 300A and 300B in real-time, such as when executing an interactive application of multiple interacting entities, each represented by a different icon. Alternatively, each of mobile devices 300A and 300B may display their respective position properties using the same icon, such as may be useful for playing an interactive soccer or ping-pong game.

Reference is now made to FIGS. 3M-3N together with FIG. 3B which illustrate an additional application of the fourth rule of mutual interactive scheme 360, in accordance with a further embodiment of the disclosed techniques. In this embodiment, each of mobile devices 300A and 300B triggers the execution of the respective action on the other one of devices 300A and 300B, in response to determining compliance with the fourth position scheme of mutual interaction scheme 360, as follows:

Mobile device 300A traces circular-shaped trajectory 366. IMU 330A of mobile device 300A acquires the traced circular trajectory 366. Processor 334A of mobile device 300A determines that the acquired trajectory of mobile device 300A complies with the fourth position scheme of mutual interaction scheme 360. Mobile device 300A triggers mobile device 300B to execute the respective action associated with the fourth position scheme, namely to display star icon 362B on display 302B of mobile device 300B moving in circular shaped trajectory 366B corresponding to acquired trajectory 366. Accordingly, mobile device 300B responds to the trigger, and displays star icon 362B on user interface 302B of mobile device 300B, moving in circular trajectory 366B.

Simultaneously, mobile device 300B traces triangular shaped trajectory 368. IMU 330B of mobile device 300B acquires traced triangular trajectory 230. Processor 334B of mobile device 300B determines that the acquired trajectory of mobile device 300B complies with the fourth position scheme of mutual interaction scheme 360. Mobile device 300B triggers, onto mobile device 300A, the execution of the respective action associated with the position scheme in accordance with the fourth rule, namely to display "+" icon 364A on display 302A of mobile device 300A moving in a triangular shaped trajectory 368A, corresponding to acquired trajectory 368. Accordingly, mobile device 300A responds to the trigger, and displays "+" icon 364A on user interface 302A of mobile device 300A, moving in triangular trajectory 368A.

In one implementation of the embodiment described above in conjunction with FIGS. 3A-3T, in response to determining compliance of each of mobile devices 300A and 300B with mutual interaction scheme 360, mobile devices 300A and 300B only trigger the respective indications of the compliance on the respective other one of mobile devices 300A and 300B. This implementation is illustrated in FIGS. 1A-1B.

Referring back to FIGS. 3M-3N together with FIG. 3B, in another implementation of the of the embodiment described above, in response to determining compliance of each of mobile devices 300A and 300B with mutual interaction scheme 360, mobile devices 300A and 300B, in addition to triggering the respective indications of the compliance on the respective other one of mobile devices 300A and 300B as described above, each of mobile devices 300A and 300B indicates the compliance reflexively. Thus mobile device 300A indicates compliance of the acquired position property of mobile device 300B with mutual interaction scheme 360, and additionally indicates compliance of the acquired position property of mobile device 300A with mutual interaction scheme 360. Accordingly, mobile device 300A displays at display 302A of mobile device 300A, "+" icon 364A identified with mobile device 300B, tracing triangular trajectory 368A, as well as star icon 362A, identified with mobile device 300A, tracing circular trajectory 366A.

Similarly, mobile device 300B indicates compliance of the acquired position property of mobile device 300A with mutual interaction scheme 360, and in addition, indicates compliance of the acquired position property of mobile device 300B with mutual interaction scheme 360. Accordingly, mobile device 300B displays at display 302B of mobile device 300B, star icon 362B, identified with mobile device 300A, tracing a circular trajectory 366B, as well as "+" icon 364B, identified with mobile device 300B, tracing a triangular trajectory 368B.

In accordance with another embodiment of the above techniques, mobile device 300A conditions the triggering of the execution of the respective action on any of mobile devices 300A and 300B on determining the compliance of both the acquired position property of mobile device 300A and the acquired position property of mobile device 300B with at least one position scheme of mutual interaction scheme 360. This embodiment is exemplified by the fifth rule of mutual interactive scheme 360.

Reference is now made to FIG. 3O, which together with FIG. 3B illustrate an implementation of an exemplary fifth rule of mutual interactive scheme 360, in accordance with this embodiment of the disclosed technique. According to the fifth rule of mutual interactive scheme 360, the fifth position scheme of holding both mobile devices 300A and 300B in proximity and tracing a common trajectory, such as a predefined shape as sensed by each of respective IMU 330A and IMU 330B, and corresponding to a predefined signature, is associated with the action of authentication. The authentication may enable money transfer, file transfer, data transfer, or joining a permission group associated with a social media application respective of a first account associated with mobile device 300A and a second account associated with mobile device 300B. Additionally or alternatively, the authentication may initiate the establishment of a communication link, or initiate audio or video recording respective of mobile devices 300A and 300B. For example, the money transfer may be enabled by transferring a credential from one of mobile devices 300A and 300B to the other respective one of mobile devices 300A and 300B. In this case, the predefined signature is "AB", where "A" corresponds to the initial of Alice, the user of mobile device 300A and owner of the first account, and '8' corresponds the initial of Bob, the user of mobile device 300B and owner of the second account. Additionally or alternatively, in some embodiments, authentication may be implemented using an audio fingerprint, as is known in the art.

Each of mobile devices 300A and 300B detect their respective proximities to each using any of the techniques described hereinabove with reference to mobile devices 100A and 100B of FIGS. 2A-2F. Additionally or alternatively, mobile devices 300A and 300B detect their respective proximities to each other via a touch sensitive sensor (not shown). While held in proximity, mobile devices 300A and 300B together trace a trajectory forming the letters "AB". Mobile device 300A determines that the trajectory traced by each of mobile devices 300A and 300B complies with the fifth position scheme of mutual interaction scheme 360, namely, the signature "AB" corresponding to the respective initials of the users of mobile devices 300A and 300B, Alice and Bob. Similarly, mobile device 300B determines that the trajectory traced by each of mobile devices 300A and 300B complies with the fifth position scheme of mutual interaction scheme 360, corresponding to the signature "AB". Mobile devices 300A and 300B mutually notify each respective other one of mobile devices 300A and 300B of the compliance of each respective trajectory of mobile devices 300A and 300A with the fifth position scheme of mutual interaction scheme 360. The mutual notification may be implemented using any of the techniques described hereinabove with respect to FIGS. 3E-3F, such as via respective transceivers 304A and 304B.

Accordingly, on determining that both of mobile devices 300A and 300B comply with the position scheme of tracing the trajectory "AB", at least one of mobile devices 300A and 300B triggers the respective action of enabling the money transfer between the respective accounts associated with devices 300A and 300B.

Mutual interaction scheme 360 may be incorporated into any suitable application, such as a communication platform (email or chat), an interactive game, a navigation platform, a platform for performing a medical procedure, a platform for performing a mechanical construction or repair, a file sharing application, a data merging application, and the like. Each such application may have integrated therein a different respective mutual interaction scheme, having different sets of rules associating different position properties with different respective actions.

Thus, to prevent the unintentional triggering of respective actions, invoking and exiting an application may require registering and un-registering any of mobile devices 300A and 300B with the desired application. In one implementation, the registration and un-registration of mobile devices 300A and 300B with the application is triggered responsive to acquiring a position property of mobile devices 300A and 300B, such as illustrated by a sixth rule of mutual interaction scheme 360. Triggering of any of the respective actions described herein may be conditional on first registering mobile device 300A and 300B with the application in accordance with the sixth rule, as follows.

Reference is now made to FIG. 3P, which together with FIG. 3B, illustrate an application of an exemplary sixth rule of mutual interactive scheme 360, in accordance with another embodiment of the disclosed technique. The sixth rule of mutual interactive scheme 360 associates a rotation about a longitudinal axis of a mobile device with registering to the mutual interaction application. Accordingly, mobile device 300A is rotated about the longitudinal axis 370A of mobile device 300A. Mobile device 300A acquires the rotation using any of the techniques described above with respect to mobile devices 100A and 100B of FIGS. 2A-2F. Processor 334A of mobile device 300A determines that the acquired rotation complies with the sixth position scheme of mutual interaction scheme 360. Accordingly, mobile device 300A registers to a mutual interaction application, and notifies mobile device 300B of the registration using the notification techniques described above with reference to FIGS. 3E-3F, such as via respective transceivers 304A and 304B.

Similarly, mobile device 300B is rotated about the longitudinal axis 370B of mobile device 300B. Mobile device 300B acquires the rotation using any of the techniques described above with respect to mobile devices 100A and 100B of FIGS. 2A-2F. Processor 334B of mobile device 300B determines that the acquired position property complies with the sixth position scheme of mutual interaction scheme. Accordingly, mobile device 300B registers to the mutual interaction application, and notifies mobile device 300A of the registration using the notification techniques described above with reference to FIGS. 3E-3F, such as via respective transceivers 304A and 304B.

When each of mobile devices 300A and 300B receive from each respective other one of mobile devices 300A and 300B, the respective notification, mobile devices 300A and 300B proceed to mutually interact in response to the acquisition of one or more respective position properties, as described herein with respect to the other rules of mutual interaction scheme 360. Similarly, in accordance with the sixth rule, mobile devices 300A and 300B un-register from the application by rotating about the respective longitudinal axes of mobile devices 300A and 300B. Although the description discloses the same position scheme for both registering and un-registering from an application, it may be noted that this is for exemplary purposes only, and the actions of registering and un-registering from an application may each be associated with a different position scheme.

Reference is now made to FIGS. 3Q-3R, which together with FIG. 3B illustrate an implementation of an exemplary seventh rule of mutual interactive scheme 360, in accordance with a further embodiment of the disclosed techniques. According to the seventh rule, maintaining a distance between mobile devices 300A and 300B to within a predefined range is associated with indicating the distance at any of mobile devices 300A and 300B. Alternatively, the maintained distance may be between mobile devices 300A, 300B and one or more external sensors (not shown).

Mobile device 300A acquires the distance between mobile device 300A and mobile device 300B using any of the techniques described hereinabove with reference to mobile devices 100A and 100B of FIGS. 2A-2F. Processor 334A of mobile device 300A determines that the acquired distance complies with the seventh position scheme of mutual interaction scheme 360, by determining that the acquired distance is within the predefined range. Mobile device 300A triggers mobile device 300B to indicate the distance, accordingly. In response to the trigger, mobile device 300B indicates the acquired distance.

Mobile device 300B indicates the acquired distance by modifying the size of displayed icon 362B in reverse proportion to the acquired distances. Thus, with reference to FIG. 3Q, at time T1, mobile device 300A acquired the distance D1 between mobile devices 300A and 300B, and determines that D1 complies with the range of the seventh position scheme of mutual interaction scheme 360. Accordingly, mobile device 300A triggers the display of star icon 362B on user interface 302B of mobile device 300B sized with respect to D1. In FIG. 3R, at time T2, mobile device 300A acquired distance D2 between mobile devices 300A and 300B, and determines that D2 complies with the range of the seventh position scheme of mutual interaction scheme 360. Accordingly, mobile device 300A triggers the display of star icon 362B on user interface 302B of mobile device 300B sized with respect to D2. In response to each of the triggers, mobile 300B adjusts the size of star icon 362B displayed at user interface 302B, accordingly. Since D2>D1, The size of star icon 362B displayed to indicate D1 (FIG. 3Q) is larger than the size of star icon 362B displayed to indicate distance D2 (FIG. 3R).

In a similar manner, mobile device 300B triggers the display of "+" icon 364A on user interface 302A of mobile device 300A sized with respect to D1 and D2, respectively. In response to each of the triggers, mobile 300A adjusts the size of "+" icon 362A displayed at user interface 302A, accordingly. Additionally or alternatively, any of the absolute or relative acquired orientations of mobile devices 300A and 300B may be indicated by displaying icons 362B and 364A in a manner that indicates the respective acquired orientations.

Additionally or alternatively, the respective action associated with the seventh scheme of mutual interaction scheme 360 may be to indicate an alert via any of respective speakers 320A and 320B and respective optical emitters 326A and 326B of mobile devices 300A and 300B, shown in FIG. 3AC. For example, the alert may indicate that the acquired distance does not comply with the predefined range.

Additionally or alternatively, on complying with the predefined range, an application may be invoked, such as a loudspeaker application, or a multi-perspective imaging application, illustrated in FIGS. 3S-3T and described in greater detail hereinbelow.

Reference is now made to FIG. 3S which together with FIG. 3B, illustrates system 350 operative as a loudspeaker system 350, in accordance with another embodiment of the disclosed techniques. In this embodiment, which is exemplified by the eighth rule of mutual interaction scheme 360, mobile devices 300A, 300B and 300C are used in unison to emulate a loudspeaker at an audio receiver 372. Audio receiver 372 is shown as a user's ear, but may alternatively be a microphone (not shown).

With reference FIG. 3B, the eighth rule of mutual interaction scheme 360 initiates loudspeaker application 350, in response to an indication by the user of mobile device 300A. Responsive to the indication, processor 334A of mobile device 300A determines that a distance D1 between speaker 320A and audio receiver 372 complies with the eighth rule of mutual interaction scheme 360 indicating that speaker 320A is within audio range of audio receiver 372. For example, processor 334A may determine distance D1 using one or more images of audio receiver 372 acquired by camera 324A, together with the position and orientation of mobile device 300A acquired by IMU 330A, and the relative position of speaker 320A respective of mobile device 300A. As the position and orientation of mobile device 300A, changes over time, D1 is adjusted accordingly, in real-time, thereby synchronizing speaker 320A to audio receiver 372.

Mobile device 300A detects one or more mobile devices 300B and 300C that are within audio range of mobile device 300A and audio receiver 372, and determines the respective distances D2 and D3 between mobile device 300A and each of mobile devices 300B and 300C using any of the techniques describes herein. Mobile device 300A applies the determined distances D2 and D3 to determine the respective distances D4 and D5, indicated as dashed lines, between each of mobile devices 300B and 300C and audio receiver 372. Mobile device 300A determines that distances D2, D3, D4 and D5 comply with the eighth rule of mutual interaction scheme, indicating that speakers 320B and 320C are within audio range of audio receiver 372, thereby synchronizing respective speakers 320B and 320C to audio receiver 372. As the relative positions and orientations of mobile devices 300A, 300B, and 300C change over time, changing respective distances D1, D2, and D3, mobile device 300A recalculates respective distances D4 and D5 in real-time, and determines compliance with the eight rule of mutual interaction scheme 360, thereby synchronizing speakers 320B and 320C to audio receiver 360.

Mobile device 300A synchronizes an internal clock of processor 334A with an internal clock of respective processors 334B and 334C of mobile devices 300B and 300C, as follows. At time $t_0$ respective of the internal clock of processor 334A, mobile device 300A emits a predefined optical signal, such as a timed series of flashes, via optical emitter 326A. Additionally, mobile device 300A transmits the start time $t_0$ via transceiver 304A. At time $t_1$ respective of the internal clock of processor 334B, mobile device 300B detects the emitted optical signal via camera 324B, and start time $t_0$ via transceiver 304B. Processor 334B of mobile device 300B determines the time shift $t_0-t_1$ representing the relative time shift between the respective internal clocks of mobile device 300A and mobile device 300B. Similarly, at time $t_2$ respective of the internal clock of processor 334C, processor 334C of mobile device 300C detects the emitted optical signal via camera 324C, and start time $t_0$ via transceiver 304C. Mobile device 300C determines the time shift $t_0-t_2$ describing the relative time shift between the respective internal clocks of mobile device 300A and mobile device 300C. Subsequently, a process initiated by mobile device 300A at time $t+t_0$ respective of the internal clock of processor 334A, is synchronized with a second process initiated by mobile device 300B at time $t+(t_0-t_1)$ respective of the internal clock of processor 334B, and further synchronized with a third process initiated by mobile device 300C at time $t+(t_0-t_2)$ respective of the internal clock of processor 334C.

To achieve constructive interference at audio receiver 372 of an audio file emitted by each of speakers 320A, 320B, and 320C, and thereby implement the loudspeaker application, mobile devices 300A, 300B, and 300C calibrate the respective times for emitting the audio file by each of speakers 320A, 320B, and 320C such that the respective emitted audio files are in phase on arrival at audio receiver 372 and thus constructively interfere. The phase shift realized at audio receiver 372 resulting from simultaneously emitting the audio file by speaker 320A and by speaker 320B is expressed by $dt_1$, and computed according to:

$$dt_1^2 = (|D1| - |D4|)/v$$

where v is the velocity of the acoustic wave. Similarly, the phase shift realized at audio receiver 372 resulting from simultaneously emitting the audio file by speaker 320A by speaker 320C is expressed by $dt_2$, and determined according to:

$$dt_2^2 = (|D1| - |D5|)/v.$$

Mobile device 300A computes the phase shift $dt_1$ and sends $dt_1$ together with a start time $T_{START}$, representing a start time to initiate a rendering of an audio file by speaker 320A, to mobile device 300B. Similarly, mobile device 300A computes the phase shift $dt_2$ and sends $dt_2$ together with start time $T_{START}$ to mobile device 300C. At time $T_{START}$, speaker 320A begins rendering the audio signal; at time $T_{START}+(t_0-t_1)+dt_1$, speaker 320B begins rendering the audio file; at time $T_{START}+(t_0-t_2)+dt_2$, speaker 320C begins rendering the audio file. The three audio files rendered by respective speakers 320A, 320B, and 320C are thus synchronized in time and phase on arrival at audio receiver 372, to realize a loudspeaker application at audio receiver 372.

The above technique, i.e. synchronizing the internal clocks, and computing a respective phase shift, may be applied to as few as two mobile devices, or alternatively to more than three mobile devices. In such a case, mobile device 300A may create a "left speaker" cluster of mobile devices to operate collectively as a left speaker for audio application 350, an a "right speaker" cluster of mobile devices to operate collectively as a right speaker for the audio application 350. Mobile device 300A detects one or more mobile devices (not shown) in proximity to mobile device 300B. Mobile device 300A groups mobile device 300B with the one or more mobile devices in proximity thereof as the "left speaker" cluster. Similarly, mobile device 300A detects one or more mobile devices (not shown) in proximity to mobile device 300C. Mobile device 300A groups mobile device 300C with the one or more mobile devices in proximity thereof as the "right speaker" cluster.

Mobile device 300A determines the respective distances between each of the plurality of mobile devices included in each of the left speaker cluster and the right speaker cluster and audio receiver 372 using the techniques described hereinabove with respect to mobile devices 300B and 300C. Similarly, mobile device 300A synchronizes the respective internal clock for each mobile device in each of the right speaker cluster and the left speaker cluster using the techniques described hereinabove with respect to mobile devices 300B and 300C. Mobile device 300A computes the respective phase difference $dt_{i(left)}$ for each mobile device of the left speaker cluster, as well as the respective phase difference $dt_{i(right)}$ for each mobile device of the right speaker cluster and transmits the respective phase differences to each respective mobile device together with a start time for rendering an audio file. Subsequently, each mobile device of each of the left speaker cluster renders the audio file in accordance with the respective phase difference $dt_{i(left)}$ at the start time synchronized with the internal clock of mobile device 300A to emulate a left speaker at audio receiver 372. Similarly, each mobile device of each of the right speaker cluster renders the audio file in accordance with the respective phase difference $dt_{i(right)}$ at the start time synchronized with the internal clock of mobile device 300A to emulate a right speaker at audio receiver 372. As a result, the multiple audio files rendered by each mobile device of the left speaker cluster constructively interfere to emulate a left speaker at audio receiver 372, and the multiple audio files rendered by each mobile device of the right speaker cluster constructively interfere to emulate a right speaker at audio receiver 372, thereby emulating a loudspeaker in stereo.

In another embodiment of the disclosed technique, system 350 is operative as a multi-perspective imaging system, and which is exemplified by the ninth rule of mutual interaction scheme 360. The multiple mobile devices are used in unison to create a multi-dimensional, or panoramic image of an object. Alternatively, the multiple mobile devices are used in unison to track the object.

The multiple mobile devices are positioned around the object to allow capturing different perspectives of the object. Once the multiple mobile devices are focused, or 'locked' onto the object, described in greater detail below with respect to FIG. 3T, each mobile device captures a different image of the object, accordingly. Simultaneous with capturing the image, each mobile device acquires metadata associated with the captured image, such as the respective position and orientation of the mobile device at the instant of capturing the image, as well as a time stamp corresponding to the instant of capturing the image. Each mobile device provides the captured image with the associated metadata to an image processor. In this manner, the image processor receives multiple images corresponding to multiple different perspectives of the object. The image processor processes the images by applying the associated metadata to merge the images into any of a panoramic or multi-perspective image of the object. Similarly, the image processor may apply the associated metadata with the images to track the object.

Reference is now made to FIG. 3T which together with FIG. 3B, illustrate an implementation of system 350 operative as a multi-perspective imaging system, in accordance with a further embodiment of the disclosed techniques. In this embodiment, which corresponds to the ninth position scheme of mutual interaction scheme 360, respective cameras 326A and 326B of mobile devices 300A and 300B are positioned within viewing range of an object 240. Mobile device 300A acquires the position property $\{P_A,O_A\}$ of mobile device 300A respective of an object 240, and mobile device 300B acquires the position property $\{P_B,O_B\}$ of mobile device 300B respective of object 240, using any of the techniques described above with respect to mobile devices 100A and 100B of FIGS. 2A-2F. Each of mobile devices 300A and 300B determines that the respective acquired position property of each of mobile devices 300A and 300B complies with the ninth position scheme of mutual interaction scheme 360. The ninth position scheme includes one or more optical range requirements respective of object 240, such as a distance and orientation, or a range of distances and orientations that allow for capturing images of object 240 with a predefine resolution. The distances and orientations defined by the ninth position scheme may additionally account for different camera types, such as if cameras 324A and 324 have a different field of view capabilities, focus capabilities, resolutions or other qualitative attributes.

Mobile device 300A determines that the acquired position property $\{P_A,O_A\}$ complies with the ninth position scheme of mutual interaction scheme 360. Similarly, mobile device 300B determines that the acquired position property $\{P_B, O_B\}$ complies with the ninth position scheme of mutual interaction scheme 360. Mobile devices 300A and 300B mutually notify each respective other one of mobile devices 300A and 300B of the compliance with the ninth position scheme of mutual interaction scheme 360 using any of the notification techniques described hereinabove with respect to FIGS. 3E-3F.

When both mobile devices 300A and 300B have determined mutual compliance with the ninth position scheme of mutual interaction scheme 360, each of mobile devices 300A and 300B executes an instance of a multi-perspective imaging application. This has the effect of 'locking' each of cameras 324A and 324B of mobile devices 300A and 300B onto object 240. In one implementation of the locking procedure, mobile device 300B notifies mobile device 300A of the compliance of mobile device 300B with the ninth position scheme of mutual interaction scheme 360. On determining compliance of both mobile devices 300A and 300B, mobile device triggers the execution of the multi-perspective imaging application on mobile device 300B, and executes the multi-perspective imaging application at mobile device 300A. In another implementation, each of mobile devices 300A and 300B conditions the execution of the multi-perspective imaging application at each respective mobile device 300A and 300B on both: a) determining compliance of each respective mobile device 300A and 300B with mutual interaction scheme 360, as well as b) receiving a trigger to execute the multi-perspective imaging application from each other respective mobile device 300A and 300B. Thus, in this case mobile device 300A triggers mobile device 300B to execute the multi-perspective imaging application, and mobile device 300B triggers mobile device 300A to execute the multi-perspective imaging application, thereby mutually validating that each respective mobile device 300A and 300B complies with mutual interaction scheme 360. It may be noted that this is but one exemplary implementation for locking cameras 324A and 325B onto object 240, and other suitable techniques may be used as well.

Once cameras 324A and 325B are locked onto object 240, each of mobile devices 300A and 300B executes the multi-perspective imaging application by performing the following steps:

1) Capturing at least one image of object 240 via respective cameras 324A and 324B of respective mobile devices 300A and 300B.
2) Simultaneous with capturing each image, acquiring metadata associated with the captured image. The metadata includes at least: the position and orientation of each of cameras 324A and 324B with respect to object 240 at the instant of capturing each image, and additionally a time stamp associated with the instant of capturing each image. The metadata may additionally include one or more optic properties of cameras 324A and 324B.

3) Providing each captured image and the associated metadata to server 354 via respective transceivers 304A and 304B of respective mobile devices 300A and 300B, and network 352.

Server 354 receives the multiple captured images with the associated metadata from each of mobile devices 300A and 300B via network 352. Server 354 is configured with an image processor, and processes the multiple captured images using the associated metadata to create any of: a panoramic image of object 240, a multi-perspective image of object 240, or to track object 240 in real-time. Alternatively, any of mobile devices 300A and 300B may operate as the image processor, and process the images accordingly.

In another embodiment of the disclosed technique, the multiple mobile devices are used in unison to implement a virtual pen, which is exemplified by the tenth rule of mutual interaction scheme 360.

Figure 3U:
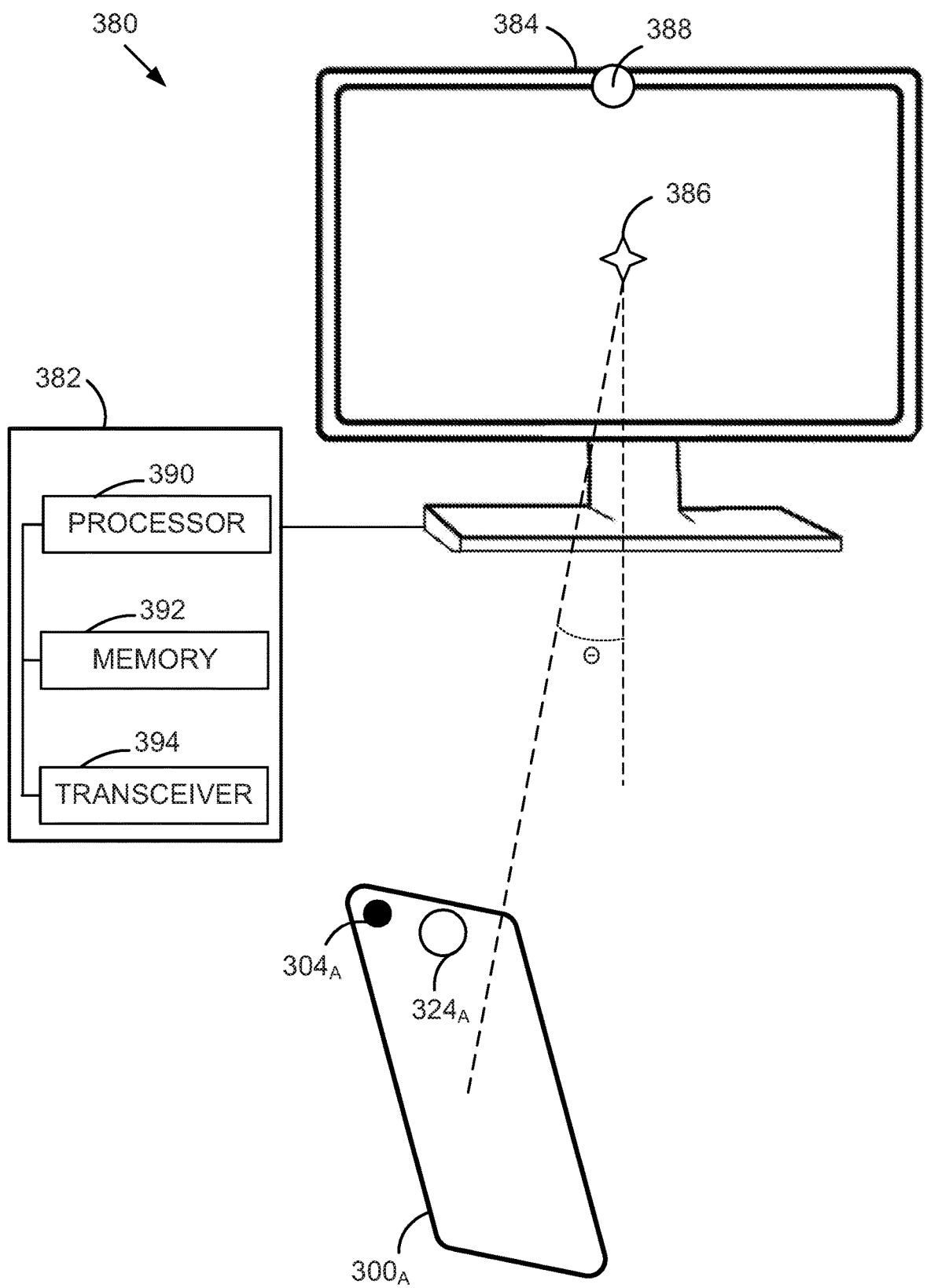

Reference is now made to FIG. 3U, which together with FIG. 3B, illustrate an implementation of system 380 operative to interface a mobile device to control an application running on a host device. This embodiment corresponds to an additional position scheme (not shown) of mutual interaction scheme 360. System 380 includes mobile device 300A and additionally a computer 382, and a display 384. Computer 382 includes at least a processor 390, a memory unit 392, and a transceiver 394. Display 384 is provided with a camera 388 configured to acquire images and provide the images to computer 382.

Processor 390 is coupled to each of memory unit 392 and transceiver 394. Computer 382 is coupled to display 384. Transceiver 304A of mobile device 300A and transceiver 394 of computer 382 are coupled using any suitable wireless means, such as via WiFi, BlueTooth and the like. Mobile device 300A is within optical range of display 384.

Processor 390 is operative to execute instructions stored in memory unit 392, and to control the rendering of graphical content on display 384. Processor 390 is operative to receive images acquired by camera 388 and store the images in memory 392, and process the images accordingly. Mobile device 300A is operative to continually communicate respective relative and absolute position and orientation information acquired by at least one of IMU 330A, indoor GPS 310A, and GPS 312A, and camera 324A to computer 382 via respective receivers 304A and 394. On receiving the position and orientation information of mobile device 300A, computer 382 is operative to apply the relative and absolute position and orientation information to control an application running thereon, such as to control the rendering of graphical content on display 384. Additionally, or alternatively, one or more images acquired by any of camera 324A of mobile device 300A and camera 388 may be used by computer 382 to determine the position and orientation information of mobile device 300A respective of display 384.

In one embodiment, mobile device 300A is operative to emulate a wireless 2D or 3D mouse, and interface with computer 382 to control the display of graphic content on display 384, such as a cursor 386. Computer 382 receives an initializing notification from mobile device 300A to invoke a graphic display application respective of display 384, such as wireless mouse application. The initializing notification additionally includes a starting position and orientation for mobile device 300A, which includes the relative and absolute position and orientation of mobile device 300A that were most recently acquired by IMU 330A, indoor GPS 310A, and GPS 312A, and camera 324A. Computer 382 applies the starting position and orientation of mobile device 300A to calibrate subsequent motion by mobile device 300A to a corresponding change in position of cursor 386 on display 384. In one implementation, computer 382 associates the starting position and orientation of mobile device 300A with a pre-determined starting position on display 384, such as the center of display 384. In an alternative implementation computer 382 determines the starting position on display 384 for associating with the starting position and orientation of mobile device 300A in a manner to provide a wide range of motion for the user, such as when the current position and orientation of mobile device 300A is not aligned with the center of display 384.

For example, if mobile device 300A is positioned at an angle θ that is offset to a central vertical or horizontal axis of display 384, computer 382 associates the starting position and orientation of mobile device 300A with a starting position on display 384 that is proportional to the offset. Alternatively, computer 382 may prompt the user of mobile device 300A to select a starting position on display 384 that is different than the center of display 384, to allow for a wider range of motion by the user. Alternatively, computer 382 may alert the user that the current position and orientation of mobile device 300A is not aligned with the center of display 384, thereby limiting the range of the cursor functionality. Computer 382 may prompt and guide the user to align the position and orientation of mobile device 300A with the center of display 384, and at a distance from display 384 that allows for a comfortable range of motion for the user.

Once the starting position on display 384 has been associated with the starting position and orientation of mobile device 300A, computer 382 invokes a calibration phase to scale an allowable range of motion granted to mobile device 300A to the dimensions of display 384. For example, computer 382 may prompt the user to move mobile device 300A horizontally and vertically to reach the edges of display 384, and thereby scale the trajectory of mobile device 300A to the respective horizontal and vertical dimensions of display 384. Additionally or alternatively, computer 382 may use an image of display 384 acquired by camera 324A to scale a trajectory of mobile device 300A to a corresponding position on display 384. Once calibrated, computer 382 applies a subsequently detected change in the position and orientation of mobile device 300A to change the position of cursor 386 on display 384, accordingly. Computer 382 implements one or more of the following functionalities respective of mobile device 300A and display 384:

1) On determining that the elevation of mobile device 300A has changed relative to display 384, computer 382 adjusts the vertical position of cursor 386 on display 384 by a proportional distance scaled to the respective height of display 384.

2) On determining that the horizontal position of mobile device 300A has changed relative to display 384, computer 382 adjusts the horizontal position of cursor 386 on display 384 by a proportional distance scaled to the respective width of display 384.

3) On determining that a rotational parameter, such as the "roll" parameter of mobile device 300A has changed in accordance with position and orientation data acquired by IMU 330A, computer 382 may invoke the user to control the execution of the graphic display application by computer 382. For example, computer 382 may prompt the user of mobile device 100A to select between a plurality of applications running on computer 382, in a manner similar to pressing a "tab" button.

4) On determining that mobile device 300A has been moved close to display 384, computer 382 magnifies at least a portion of the content displayed on display 384 to implement a "zoom-in" functionality.

5) On determining that mobile device 300A has been moved further from display 384, computer 382 miniaturizes at least a portion of the content displayed on display 384 to implement a "zoom-out" functionality.

In another implementation, mobile device 300A is virtually coupled to a rendition of a three dimensional object (not shown) on display 384, such as a computer aided design or manufacturing (CAD/CAM) software application. As the user manipulates the position and orientation of mobile device 300A, the rendition of the three dimensional object is manipulated accordingly on display 384, allowing the user the control the position and orientation of the three dimensional object by manipulating mobile device 300A. Throughout, mobile device 300A continually transmits relative and absolute position and orientation information acquired via any of IMU 330A, indoor GPS 310A, and GPS 312A, and camera 324A, such that changes in the relative and absolute position and orientation of mobile device 300A translate to corresponding changes in the position and orientation of the three dimensional object rendered on display 384. Computer 382 may additionally apply one or more images of mobile device 300A acquired by camera 388 to determine respective changes in the relative and absolute position and orientation of mobile device 300A. For example, rotating mobile device 300A along any of the respective X, Y, or Z axes of mobile device 300A results in a corresponding rotation along the respective X, Y, and Z axes of the 3D object on display 384. Translating mobile device 300A along any of the respective vertical and horizontal axes respective of display 384 causes a corresponding vertical and horizontal translation of the 3D object on display 384. Similarly, moving mobile device 300A closer to display 384 results in a zoomed-in view of the three dimensional object on display 384, and moving mobile device 300A further away from display 384 results in a zoomed-out view of the three dimensional object on display 384. As with the calibration phase described above, computer 382 may prompt the user to adjust the position and orientation of mobile device 300A when mobile device 300A is initially coupled to the three dimensional object such as to allow for a wide range of motion by the user to manipulate the rendition of the three dimensional object. For example, if at initialization, the orientation of mobile device 300A is not neutrally oriented with respect to any of the respective X, Y, and Z axes of mobile device 300A, computer 382 may alert to user to align mobile device 300A into a neutral position, to subsequently allow for a maximal range of motion by the user manipulating mobile device 300A.

Figure 4A:
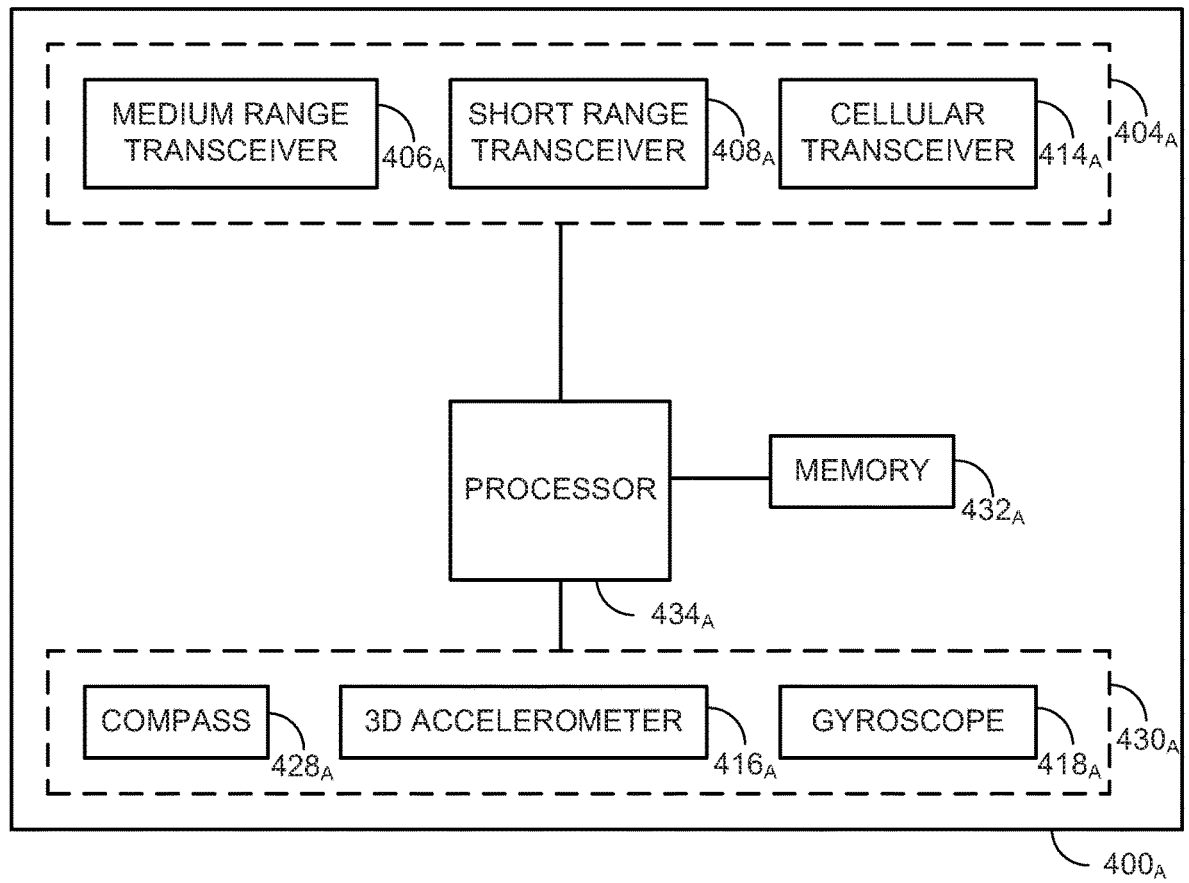
FIG. 4A illustrates an exemplary implementation of another mobile device for interacting via a mutual interaction scheme, constructed and operative in accordance with an embodiment of the disclosed techniques.
Figure 4B:
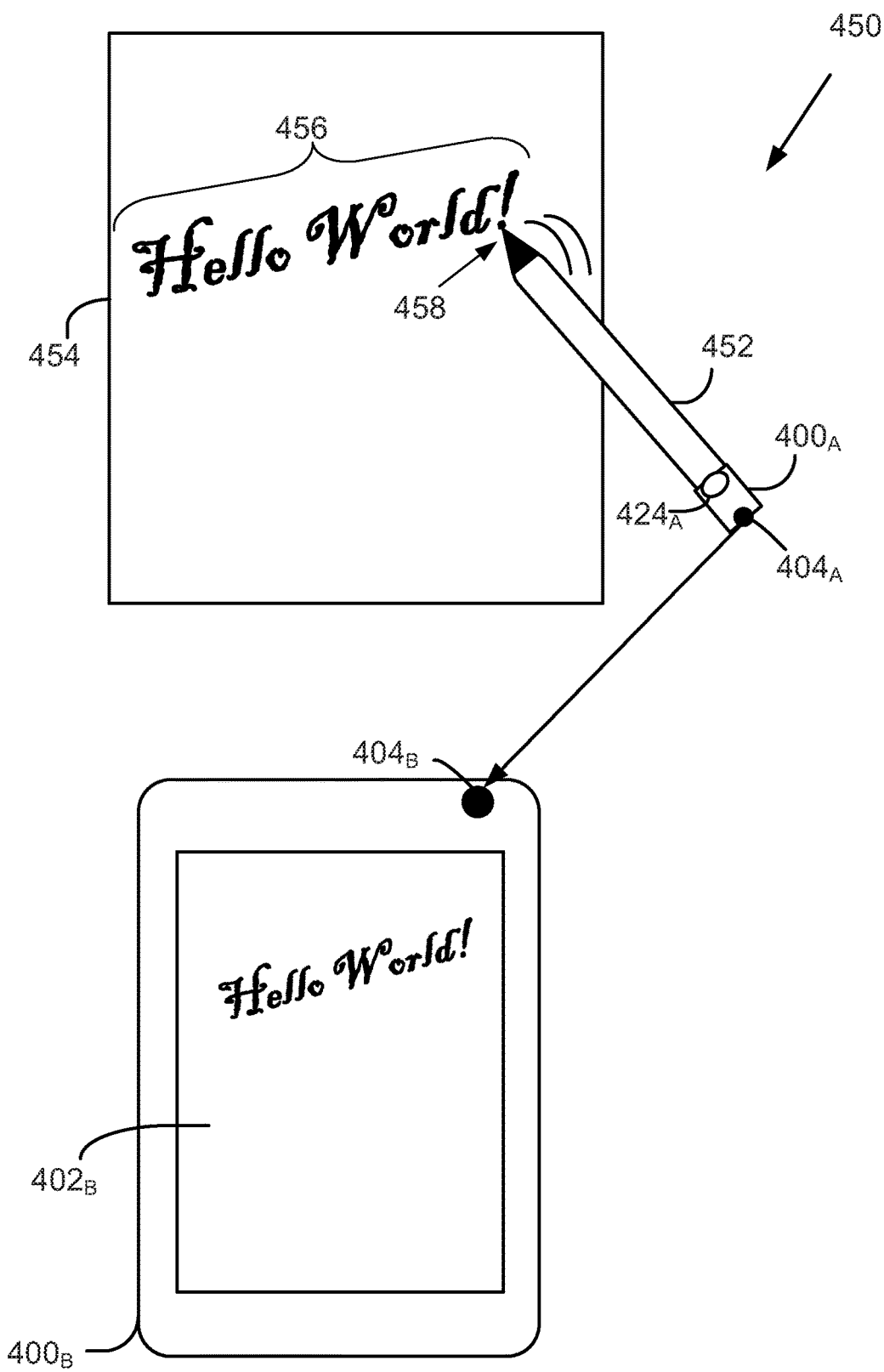
FIG. 4B illustrates another schematic illustration of a system for implementing a mutual interaction scheme between the mobile device of FIG. 4A and a mobile device operative according to the mobile device of FIG. 2B, constructed and operative in accordance with additional embodiments of the disclosed techniques.

Reference is now made to FIGS. 4A-4B which together with FIG. 3B illustrates a virtual pen system 450, in accordance with another embodiment of the disclosed technique.

With reference to FIG. 4A, a schematic illustration of a mobile device 400A is shown. Mobile device 400A includes at least a processor 434A, a memory unit 432A, a transceiver 404A, and an IMU 430A. Transceiver 404A includes at least medium range transceiver 406A, short range transceiver 408A, and cellular transceiver 414A. IMU 430A includes compass 428A, 3D accelerometer 416A, and gyroscope 418A. Transceiver 404A, memory unit 432A, and IMU 430A are coupled to processor 434A. Each of transceiver 404A, memory unit 432A, IMU 430A and processor 434A are operative to correspond to transceiver 104A, memory unit 132A, IMU 130A and processor 134A of FIG. 2A. Mobile device 400A may include additional components not shown in FIG. 4A, such as any of: indoor GPS 412A, GPS 410A, speaker 420A, microphone 422A, user interface 402A, optical emitter 426A, and camera 424A, each coupled to processor 434A, and each operative to correspond to indoor GPS 112A, GPS 110A, speaker 120A, microphone 122A, user interface 102A, optical emitter 126A, and camera 124A of FIG. 2A.

With reference to FIG. 4B, system 450 includes two mobile devices: mobile device 400A and a mobile device 400B. Mobile device 400B is represented by mobile device 100B described above with reference to FIG. 4B. In particular, mobile device 400B includes at least a processor 434B, a transceiver 404B and a user interface 402B, corresponding respectively to processor 134B, transceiver 104B and user interface 102B of mobile device 100B, Mobile devices 400A and 400B are operative to perform one or more of the techniques described above with reference to mobile devices 100A and 100B of FIGS. 2A-2F. In particular, mobile device 400B is operative to receive data from mobile device 400A via respective transceivers 404A and 404B. Each of mobile devices 400A and 400B are associated with mutual interaction scheme 360.

Mobile device 400A is coupled to a writing utensil 452 provided with a tip 458 configured to deposit a visible substance, such as ink, graphite, and the like, on a surface 454. In one implementation, mobile device 400A is integrated within writing utensil 452. In another implementation (not shown), mobile device 400A is implemented as a wearable mobile device, such as a ring, thimble, bracelet and the like, operative to be worn by a user while the user writes with writing utensil 452. In both implementations, mobile device 400A is operative to acquire a trajectory traced by writing utensil 452, as writing utensil 452 is maneuvered to write on surface 454.

As shown in FIG. 4B, writing utensil 452 is maneuvered over surface 454 to deposit a visible trace 456 via tip 458, corresponding to the phrase 'Hello World!" in script. Simultaneously, IMU 430A of mobile device 400A acquires a trajectory corresponding to 'Hello World!" in script. Mobile device 400A determines that the acquired trajectory corresponds to visible trace 456. For example, camera 424A of mobile device 400A captures an image of visible trace 456, and processor 434A of mobile device 400A matches the captured image with the trajectory acquired by IMU 430A. Alternatively, additional sensors (not shown) include in mobile device 400A detect the deposition of the visible substance on surface 454, or detect that tip 458 is in contact with surface 454, and the like.

Processor 434A of mobile device 400A determines that the acquired position property complies with the tenth position scheme of mutual interaction scheme 360. Accordingly, mobile device 400A triggers mobile device 400B to execute the respective action associated with the tenth position scheme, namely to display on user interface 402B of mobile device 400B, a bit map corresponding to acquired trajectory, in real-time. In one implementation, mobile device 400A transforms the trajectory to a bit map and transmit the bit map to mobile device 400B via respective transceivers 404A and 404D. Alternatively, mobile device 400A transmits the acquired trajectory to mobile device 100B via respective transceivers 404A and 404D, and mobile device 400B transforms the trajectory to the bit map.

Mobile device 400B displays the bit map on user interface 402B of mobile device 400B, accordingly. Additionally, mobile device 400B may store the bit map at memory store 432B of mobile device 400B.

Figure 5A:
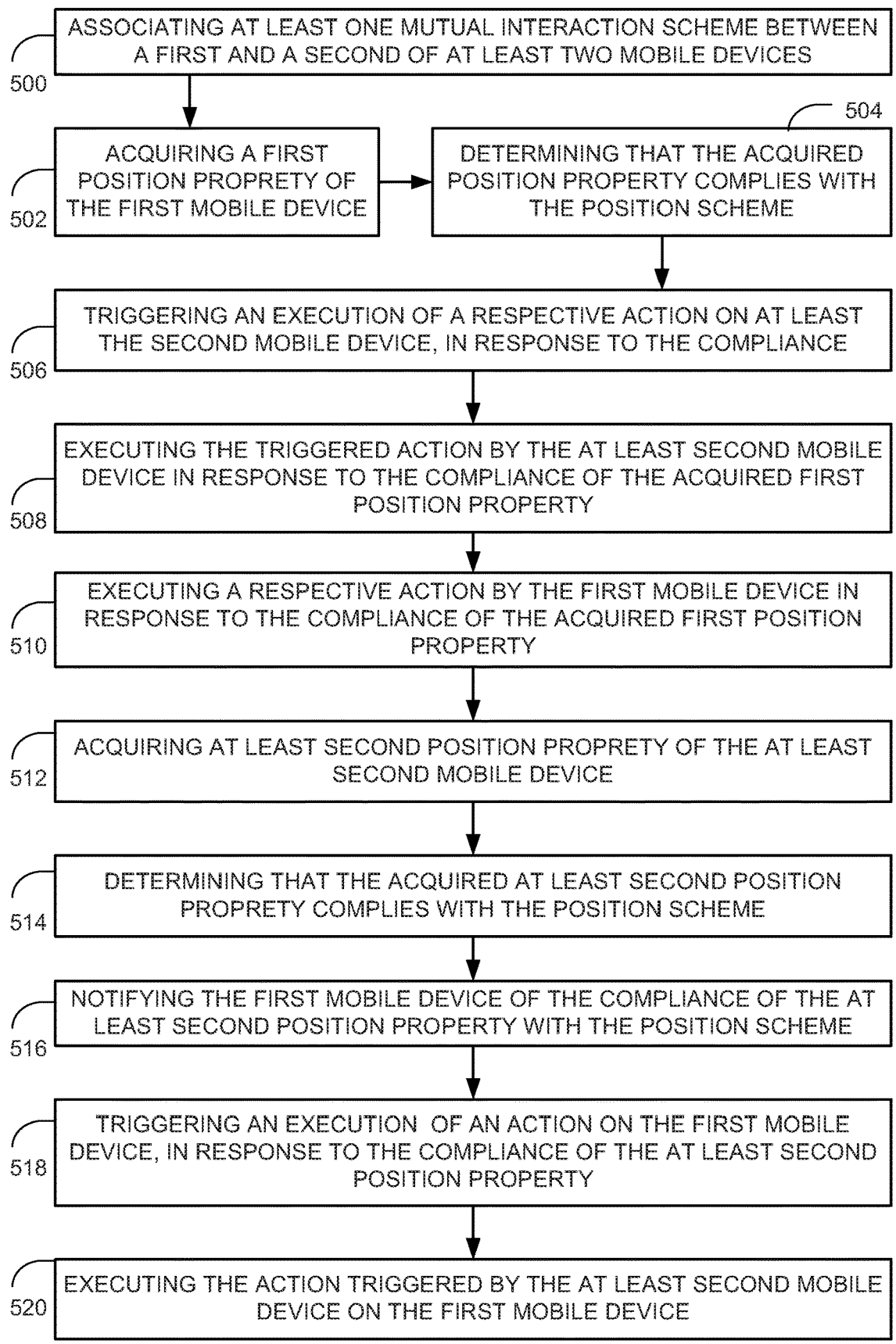
FIG. 5A is a schematic illustration of a method for implementing a mutual interaction scheme with the system of FIGS. 2A-2F and the system of FIGS. 3A-3R, in accordance with another embodiment of the disclosed technique.

Reference is now made to FIG. 5A, which is a schematic illustration of a method for initiating at least one mutual interaction scheme between a first mobile device and at least a second mobile device, in accordance with another embodiment of the disclosed technique.

In procedure 500, at least one mutual interaction scheme is associated between a first mobile device and at least a second mobile device. The mutual interaction scheme may be provided, or otherwise made accessible, to each of the first mobile device and at least a second mobile device via a network from a cloud service. The mutual interaction scheme associates at least one position scheme with at least one respective action, where the at least one position scheme relates to at least one of: an absolute orientation, a relative orientation, an absolute position, a relative position, an absolute trajectory, and a relative trajectory of any of the first and at least second mobile devices. With reference to the system of FIGS. 2A-2F, and the system of FIGS. 3A-3B, each of mobile devices 300A and 300B are provided with access to mutual interaction scheme 360, via respective transceivers 304A and 304B of each of mobile devices 300A and 300B and network 352.

In procedure 502, a position property of the first mobile device is acquired. The acquired position property of the first mobile device relates to at least one of: an absolute orientation, a relative orientation, an absolute position, a relative position, an absolute trajectory, and a relative trajectory of the first mobile device. With reference to the system of FIGS. 2A-2F, and the system of FIGS. 3A-3B, IMU 130A of mobile device 100A acquires the position property of mobile device 100A using the methods described above. Additionally or alternatively, camera 124A of mobile device 100A captures an image, such as of a reference object, and the position property of mobile device 100A is acquired from the image captured by camera 124A of mobile device 100A. Additionally or alternatively, camera 124B of mobile device 100B captures an image of mobile device 100A. Mobile device 100A receives the captured image from mobile device 100B, via respective transceivers 104A and 104B of mobile devices 100A and 100B. Mobile device 100A determines the position property of mobile device 100A from the image captured by mobile device 100B.

In procedure 504, compliance of the acquired position property of the first mobile device with at least one of the at least one position schemes of the mutual interaction scheme is determined. In one implementation, acquiring the position property of the first mobile device, and determining that the acquired position property of the first mobile device complies with one of the at least one position scheme of the mutual interaction scheme, is performed by the first mobile device. With reference to the system of FIGS. 2A-2F, and the system of FIGS. 3A-3B, mobile device 300A determines that the acquired position property of mobile device 300A complies with at least one of the position schemes of mutual interaction scheme 360.

In procedure 506, in response to the compliance, an execution of one of the at least one respective actions is triggered on the at least second mobile device. The respective triggered action is associated with the at least one position scheme with which the position property of the first mobile device complies, in accordance with the mutual interaction scheme. With reference to the system of FIGS. 2A-2F, and the system of FIGS. 3A-3B, mobile device 300A triggers mobile device 300B to execute the respective action associated with the position scheme with which the position property of mobile device 300A complies, in accordance with mutual interaction scheme 360. Thus, if the acquired position property of mobile device 300A complies with the absolute vertical orientation corresponding to the first position scheme of mutual interaction scheme 360, mobile device 300A triggers mobile device 300B to execute the respective action associated with the first position scheme, namely to send a business card to mobile device 300A.

In procedure 508, the respective triggered action is executed by the at least second mobile device in response to the compliance of the acquired position property of the first mobile device. With reference to the system of FIGS. 2A-2F, and the system of FIGS. 3A-3B, mobile device 300B sends the business card to mobile device 300A via respective transceivers 304A and 304B of mobile devices 300A and 300B.

In procedure 510, one of the one or more respective actions is additionally executed by the first mobile device, in response to the determined compliance of the acquired position property of the first mobile device. With reference to the system of FIGS. 2A-2F, and the system of FIGS. 3A-3B and FIGS. 3I-3J, each of mobile devices 300A and 300B execute the respective action by each displaying a icon on respective user interface 302A and 302B of each of mobile devices 300A and 300B.

In procedure 512, a position property of the at least second mobile device is acquired. The acquired position property of the at least second mobile device relates to at least one of: an absolute orientation, a relative orientation, an absolute position, a relative position, an absolute trajectory, and a relative trajectory of the at least second mobile device.

In procedure 514, compliance of the acquired position property of the at least second mobile device with at least one of the at least one position schemes of the mutual interaction scheme is determined.

In one implementation, acquiring the position property of the at least second mobile device, and determining that the acquired position property of the at least second mobile device complies with one of the at least one position scheme of the mutual interaction scheme, is performed by the at least second mobile device. With reference to the system of FIGS. 2A-2F, and the system of FIGS. 3A-3B and FIGS. 3K-3L, IMU 330B of mobile device 300B acquires the position property of mobile device 300B using the methods described above. Additionally or alternatively, camera 324B of mobile device 300B captures an image, such as of a reference object, and the position property of mobile device 300B is acquired from the image captured by camera 324B of mobile device 300B. Additionally or alternatively, with additional reference to FIG. 2F, camera 324A of mobile device 300A captures an image of mobile device 300B. Mobile device 300B receives the captured image from mobile device 300A via respective transceivers 300A and 300B, and determines the position property of mobile device 300B from the received image.

In another implementation, acquiring the position property of the at least second mobile device, and determining the compliance of the position property of the at least second mobile device is performed by the first mobile device. With reference to the system of FIGS. 2A-2F, and the system of FIGS. 3A-3B and FIGS. 3E-3F, camera 324A of mobile device 300A captures an image of mobile device 300B. Processor 334A of mobile device 300A analyzes the captured image and determines the position property of mobile device 300B. Processor 334A of mobile device 300A determines that the position property of mobile device 300B complies with mutual interaction scheme 360. Mobile device 300A may provide any of the position property of mobile device 300B and an indication of the compliance to mobile device 300B via respective transceivers 304A and 304B of respective mobile devices 300A and 300B.

In another implementation, the execution, by the at least second mobile device of the one or more respective actions triggered by the first mobile device, is conditioned on the determined compliance of the position property of the at least second mobile device.

In procedure 516, the first mobile device is notified of the compliance of the position property of the at least second mobile device with at least one of the at least one position schemes of the mutual interaction scheme. With reference to the system of FIGS. 2A-2F, and the system of FIGS. 3A-3B and Figures and 3K-3L, mobile device 300B notifies mobile device 300A of the compliance of the acquired position property of mobile device 300B with one of the position schemes of mutual interaction scheme 360, via respective transceivers 304A and 304B of mobile devices 300A and 300B.

In procedure 518, an execution of one of the one or more respective actions is triggered on the first mobile device in response to the determined compliance of the acquired position property of the at least second mobile device. The respective action triggered on the first mobile device is associated with the position scheme with which the position property of the at least one second mobile device complies, in accordance with the mutual interaction scheme. With reference to the system of FIGS. 2A-2F, and the system of FIGS. 3A-3B and FIGS. 3K-3L, mobile device 300B triggers mobile device 300A to display an icon in response to the determined compliance of the trajectory of mobile device 300B with the fourth position scheme of mutual interaction scheme 360.

In procedure 520, the respective action triggered by the at least second mobile device is executed on the first mobile device. With reference to the system of FIGS. 2A-2F, and the system of FIGS. 3A-3B and FIGS. 3K-3L, mobile device 300A displays icon 364A on user interface 302A of mobile device 300A, in accordance with the action triggered by mobile device 300B.

In one implementation, the respective action comprises indicating the determined compliance of the acquired position property of the first mobile device. In another implementation, the respective action comprises indicating the determined compliance of the acquired position property of the at least second mobile device.

In another implementation, the respective action triggered and executed in response to the determined compliance of the acquired position property of the first mobile device comprises any of: registering and unregistering any of the first mobile device and the at least second mobile device to the mutual interaction scheme.

In another implementation, the respective action triggered and executed in response to the determined compliance of the acquired position property of the at least second mobile device comprises any of: registering and unregistering any of the first mobile device and the at least second mobile device to the mutual interaction scheme.

In another implementation, the acquired position property of the first mobile device corresponds to the distance between the first mobile device and the at least second mobile device. At least one of the position schemes of the mutual interaction scheme corresponds to the acquired distance. In this implementation, determining the compliance of the acquired position property with the position scheme comprises determining that the acquired distance complies with the position scheme corresponding to the acquired distance. The respective action associated with the position scheme corresponding to the acquired distance comprises indicating the acquired distance at any of the first mobile device and the at least second mobile device. With reference to the system of FIGS. 2A-2F, and the system of FIGS. 3A-3B and FIGS. 3Q-3R, each of mobile device 300A and 300B displays icons 364A and 362B, respectively, on respective user interfaces 302A and 302B of mobile devices 300A and 300B, where the size of icons 364A and 362B are scaled to correspond to the respective distances D1 and D2 between mobile devices 300A and 300B.

Figure 5B:
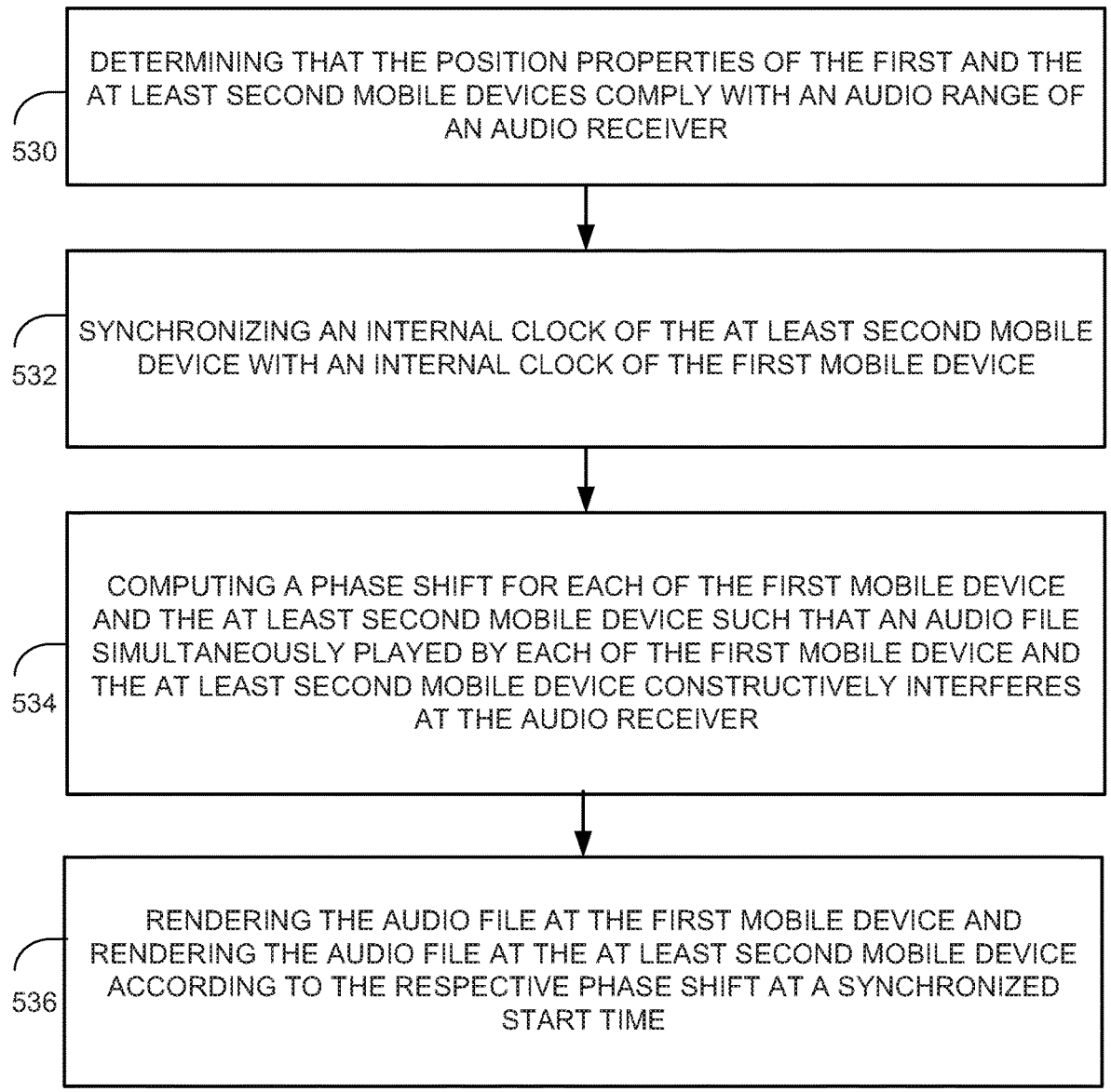
FIG. 5B is a schematic illustration of a method for implementing a mutually interactive loudspeaker application with the system of FIGS. 2A-2F, and the system of FIGS. 3A-3B, and 3S, in accordance with another embodiment of the disclosed technique.

Reference is now made to FIG. 5B, which is a schematic illustration of a method for implementing a mutually interactive loudspeaker application with a first mobile device and at least a second mobile device, in accordance with another embodiment of the disclosed technique. The method of FIG. 5B is a continuation of the method described above with respect to FIG. 5A.

In procedure 530, the position properties of the first mobile device and the at least second mobile device are all determined to comply with an audio range of an audio receiver. In this implementation, the position property acquired from the first mobile device corresponds to a distance and orientation of the first mobile device with respect to the audio receiver, and the position property acquired from the at least second mobile device corresponds to a distance and orientation of the at least second mobile device with respect to the audio receiver. The position scheme of the mutual interaction scheme corresponds to the audio range of the audio receiver. With reference to the system of FIGS. 2A-2F, and the system of FIGS. 3A-3B and FIG. 3S, mobile device 300A determines that the distances D1, D4, and D5 corresponding to the distances between respective mobile devices 300A, 300B, and 300C, and audio receiver 372 comply with the audio range of audio receiver 372, comprising eighth rule of mutual interaction scheme 360.

In procedure 532, an internal clock of the at least second mobile device is synchronized with an internal clock of the first mobile device. With reference to the system of FIGS. 2A-2F, and the system of FIGS. 3A-3B and FIG. 3S, at time $t_0$ mobile device 300A emits an optical signal and time $t_0$ to mobile devices 300B and 300C. Each of mobile devices 300B and 300C detect the optical signal and determines the respective time shift between $t_0$ and the time that the optical signal was detected, respective of the internal clocks of mobile devices 300B and 300C.

In procedure 534, a phase shift for each of the at least second mobile device is computed such that an audio file simultaneously played by each of the first mobile device and each of the at least second mobile device constructively interferes at the audio receiver. With reference to the system of FIGS. 2A-2F, and the system of FIGS. 3A-3B and FIG. 3S, mobile device 300A computes a phase shift respective of each of mobile devices 300B and 300C as a function of the position and orientation of each of mobile devices 300B and 300C, and transmits each computed phase shift, accordingly.

In procedure 536, the audio file is rendered by the first mobile device, and the audio file is rendered by the at least second mobile device according to the respective phase shift at a synchronized start time. With reference to the system of FIGS. 2A-2F, and the system of FIGS. 3A-3B and FIG. 3S, mobile device 300A renders the audio file via speaker 320A, and mobile devices 300B and 300C render the audio file according to the respective phase shifts.

Figure 5C:
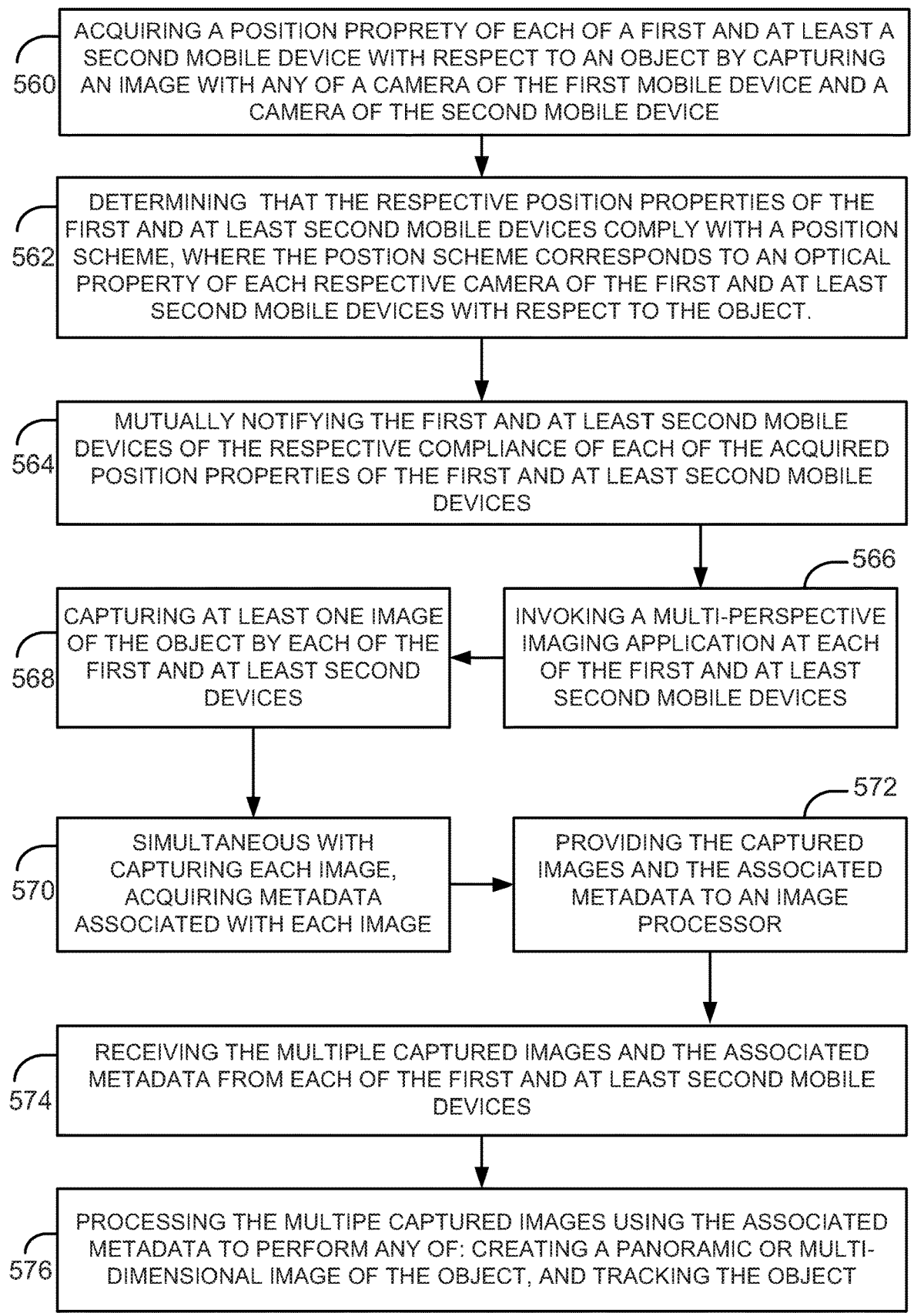
FIG. 5C is a schematic illustration of a method for implementing a mutually interactive multi-perspective imaging application with the system of FIGS. 2A-2F, and the system of FIGS. 3A-3B, and 3T, in accordance with another embodiment of the disclosed technique.

In some embodiments, synchronizing step of procedure 532, the computing step of procedure 534, and the rendering step of procedure 536 are performed with respect to a plurality of mobile devices. A first portion of the plurality of mobile device is grouped as a left speaker cluster, and a second portion of the plurality of mobile devices as a right speaker cluster. The audio file is rendered by the mobiles devices grouped as the left speaker cluster to emulate a left speaker, and the audio file is rendered by the mobiles devices grouped as the right speaker cluster to emulate a right speaker, thereby emulating a stereo loudspeaker at the audio receiver Reference is now made to FIG. 5C, which is a schematic illustration of a method for implementing a mutually interactive multi-perspective imaging application with a first mobile device and at least a second mobile device, in accordance with another embodiment of the disclosed technique. The method of FIG. 5C is a continuation of the method described above with respect to FIG. 5A.

In procedure 560, the position property of the first mobile device, and the position property of the at least second mobile device are acquired by capturing an image of an object with at least one of: a camera of the first mobile device and a camera of the at least second mobile device, where the respective acquired position properties of the first and at least second mobile devices are with respect to the object. Additionally, the position scheme of the mutual interaction scheme with which the position property of the first mobile device complies, corresponds to an optical range of the camera configured with the first mobile device. Similarly, the position scheme of the mutual interaction scheme with which the position property of the second mobile device complies, corresponds to an optical range of the camera configured with the second mobile device. For example, the respective optical ranges may relate to a focal range, a field of view, and an optical resolution of any of the cameras with respect to the object.

With reference to the system of FIGS. 2A-2F, and the system of FIGS. 3A-3B and FIG. 3T, camera 324A of mobile device 300A captures an image of object 240. Processor 334A of mobile device 300A uses the image captured by camera 324A to acquire a position property corresponding to the position and orientation of mobile devices 300A with respect to object 240. Additionally, camera 324B of mobile device 300B captures another image of object 240. Processor 334B of mobile device 300B uses the image captured by camera 324B to acquire a position property corresponding to the position and orientation of mobile devices 300B with respect to object 240.

In procedure 562, compliance of each of the acquired position properties with the position scheme of the mutual interaction scheme is determined, as described above with reference to Procedures 504 and 514 of FIG. 5A. With reference to the system of FIGS. 2A-2F, and the system of FIGS. 3A-3B and FIG. 3T, processor 334A of mobile device 300A determines that the acquired position property of mobile device 300A complies with the ninth position scheme of mutual interaction scheme 360. Similarly, processor 334B of mobile device 300B determines that the acquired position property of mobile device 300B complies with the ninth position scheme of mutual interaction scheme 360. With reference to FIG. 3B, the ninth position scheme of mutual interaction scheme corresponds to one or more optical properties of respective cameras 324A and 324B with respect to object 240, such as a field of view or a focal range, or an optical resolution requirement, and the like. Additionally or alternatively to the technique described above, mobile devices 300A and 300B may acquire the position and orientation of respective mobile devices 300A and 300B using at least one of the techniques described above with reference to FIGS. 2A-2F.

In procedure 564, each of the first mobile device and the at least second mobile device is mutually notified of the respective compliance of each of the respective acquired position properties of the first mobile device and at least second mobile device. With reference to the system of FIGS. 2A-2F, and the system of FIGS. 3A-3B and FIG. 3T, mobile device 300A notifies mobile device 300B of the compliance of the acquired position of mobile device 300A with the ninth position scheme of mutual interaction scheme 360. Similarly, mobile device 300B notifies mobile device 300A of the compliance of the acquired position property of mobile device 300B with the ninth position scheme of mutual interaction scheme 360. The mutual notification may be implemented via any of respective transceivers 304A and 304B, respective cameras 324A and 324B, respective emitters 326A and 326B, respective speakers 320A and 320B, and respective microphones 322A and 322B of respective mobile devices 300A and 300B.

In procedure 566, responsive to the mutual notification, a multi-perspective imaging application is invoked at each of the first and at least second mobile devices in accordance with the mutual interaction scheme. With reference to the system of FIGS. 2A-2F, and the system of FIG. 3A-3B and FIG. 3T, responsive to determining that the respective acquired position properties each of mobile devices 300A and 300B comply with the ninth position scheme of mutual interaction scheme 360, mobile device 300A invokes a multi-perspective imaging application. Similarly, responsive to determining that the respective acquired position properties each of mobile devices 300A and 300B comply with the ninth position scheme of mutual interaction scheme 360, mobile device 300B invokes the multi-perspective imaging application.

In procedure 568, the invoking of the multi-perspective imaging application at each of the first and at least second mobile devices causes at least one image of the object to be captured by each of the first and at least second mobile devices. With reference to the system of FIGS. 2A-2F, and the system of FIGS. 3A-3B and FIG. 3T, mobile device 300A captures an image of object 240 from a perspective P1 at time T1, and mobile device 300B captures an image of object 240 from a perspective P2 at time T2. In one embodiment, the images captured by mobile devices 300A and 300B are captured within a predefined time-limit ε, i.e. $|T1-T2|<\varepsilon$. In another embodiment the images are captured simultaneously, or almost simultaneously.

In procedure 570, simultaneous with capturing each image, metadata associated with each image is acquired. The associated metadata includes position and orientation properties associated with the captured image, and a time stamp associated with the captured image. With reference to the system of FIGS. 2A-2F, and the system of FIGS. 3A-3B and FIG. 3T, while capturing the image of object 240, mobile device 300A acquires metadata comprising: position and orientation properties corresponding to P1 and a time-stamp corresponding to T1. Mobile device 300A stores the captured image with the metadata at memory store 332A of mobile device 300A. Similarly, while capturing the image of object 240, mobile device 300B acquires metadata comprising: position and orientation properties corresponding to P2 and a time-stamp corresponding to T2. Mobile device 300B stores the captured image with the metadata at memory store 332B of mobile device 300B.

In procedure 572, the images captured by each of the first and at least second mobile devices and the associated metadata are processed. With reference to the system of FIGS. 2A-2F, and the system of FIGS. 3A-3B and FIG. 3T, mobile devices 300A and 300B each provide the respective captured images with the associated metadata to image processor 354 via respective transceivers 304A and 304B of mobile devices 300A and 300B, and network 352.

In procedure 574, the multiple captured images with the associated metadata are received from the first and at least second mobile devices by a processor. With reference to the system of FIGS. 2A-2F, and the system of FIGS. 3A-3B and FIG. 3T, image processor 354 receives the images and associated metadata from mobile devices 300A and 300B via network 352 and respective transceivers 304A and 304B.

In procedure 576, the multiple captured images are processed using the associated metadata to perform any of: creating a panoramic image of the object, creating a multi-perspective image of the object, and tracking the object. The results of the imaging processing step of procedure 576 may be provided. With reference to the system of FIGS. 2A-2F, and the system of FIGS. 3A-3B and FIG. 3T, image processor 354 processes the received images and metadata to create any of: a panoramic image of object 240, and a multi-perspective image of object 240. Additionally, or alternatively, image processor 354 processes the received images and metadata to track object 240 in real-time. Additionally, image processor 354 may provide the resulting image created from the received images and metadata to mobile devices 300A and 300B.

Figure 5D:
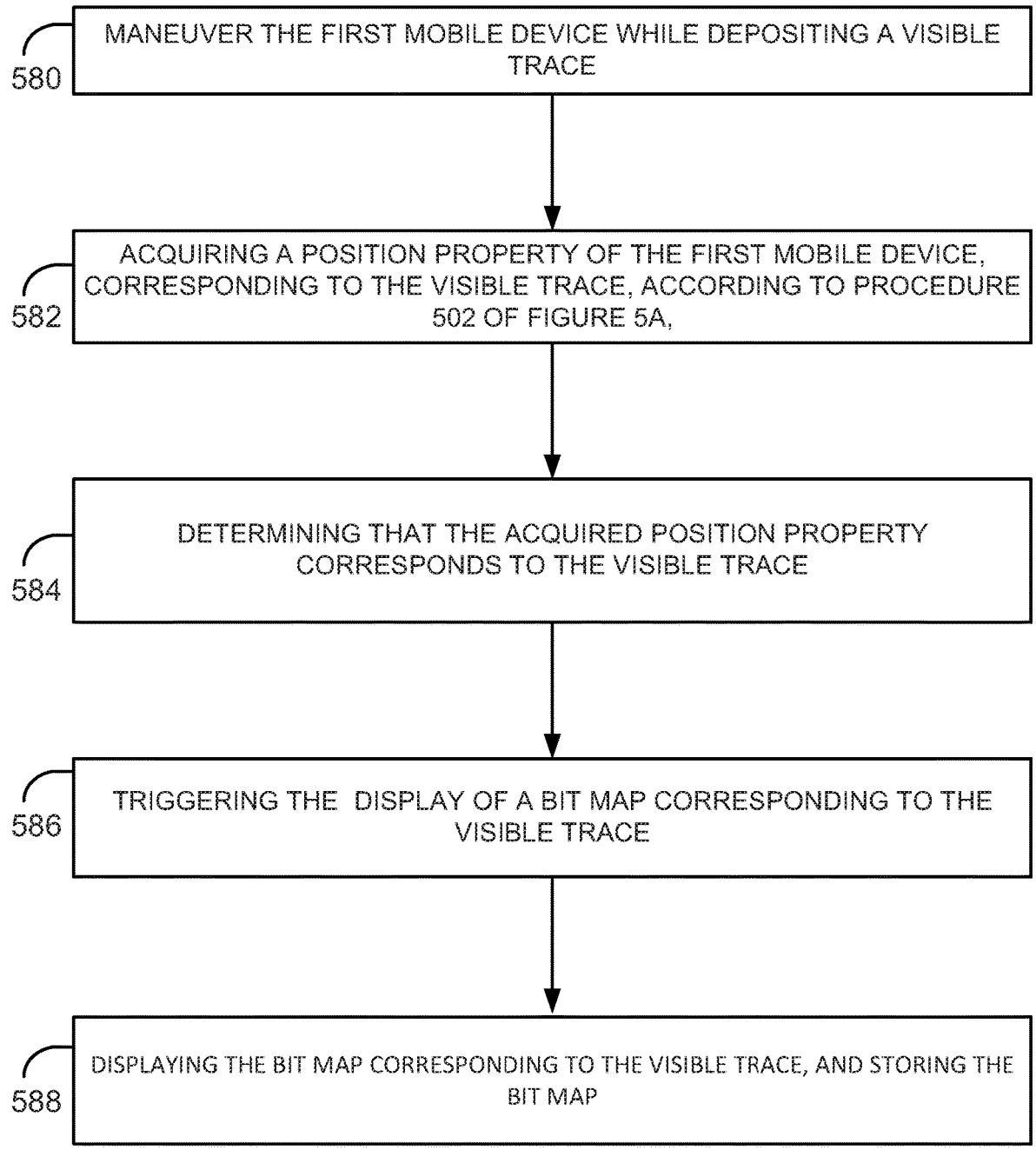
FIG. 5D is a schematic illustration of a method for implementing a mutually interactive virtual pen application with the system of FIGS. 2A-2B, and FIG. 4, in accordance with another embodiment of the disclosed technique.

Reference is now made to FIG. 5D, which is a schematic illustration of a method for implementing a mutually interactive virtual pen application, in accordance with another embodiment of the disclosed technique. The method of FIG. 5D is a continuation of the method described above with respect to FIG. 5A.

In procedure 580, the first mobile device is maneuvered to trace a trajectory while a visible trace, corresponding to the trajectory, is deposited. With reference to the systems of FIGS. 2A-2G, FIGS. 3A-3B, and FIGS. 4A-4B, mobile device 400A is provided with a writing utensil 452 having a tip 458. Writing utensil 452, together with mobile device 400A, are maneuvered in a trajectory that causes tip 458 to deposit a visible trace 456 on a sheet of paper 454 corresponding to the trajectory.

In procedure 582, the position property of the first mobile device is acquired, corresponding to the acquisition of the first position property of procedure 502 of FIG. 5A. With reference to the systems of FIGS. 2A-2G, FIGS. 3A-3B, and FIGS. 4A-4B, IMU 430A of mobile device 400A acquires the trajectory resulting from maneuvering writing utensil 452 to write visible trace 456. Additionally of alternatively, camera 424A of mobile device 400A acquires the trajectory resulting from maneuvering writing utensil 452 to write visible trace 456.

In procedure 584, the acquired position property is determined to comply with one of the position schemes of the mutual interaction scheme by determining that the acquired position property corresponds to the deposited visible trace. With reference to the systems of FIGS. 2A-2G, FIGS. 3A-3B, and FIGS. 4A-4B, mobile device 400A determines that the acquired trajectory complies with the tenth position scheme of mutual interaction scheme 360 by determining that the acquired trajectory corresponds to visible trace 456. For example, camera 424A of mobile device 400A captures an image of visible trace 456, and the captured image is matched to the trajectory acquired by IMU 430A of mobile device 400A.

In procedure 586, the at least second mobile device is triggered to display a bit map corresponding to the visible trace. With reference to the systems of FIGS. 2A-2G, FIGS. 3A-3B, and FIGS. 4A-4B, mobile device 400A triggers mobile device 400B to display a bit map corresponding to visible trace 456, via respective transceivers 404A and 404B. Any of mobile devices 400A and 400B may derive the bit map, such as from the image of visible trace 456 captured by camera 424A of mobile device 400A, or alternatively, from the trajectory of mobile device 452 acquired by IMU 430A of mobile device 400A.

In procedure 588, the bit map corresponding to the visible trace is displayed. Additionally, the bit map is stored at a memory of the at least second mobile device With reference to the systems of FIGS. 2A-2G, FIGS. 3A-3B, and FIGS. 4A-4B, mobile device 400B displays the bit map at user interface 402B of mobile device 400B. Additionally, mobile device 400B stores the bit map a memory store 432B of mobile device 400B.

Figure 6:
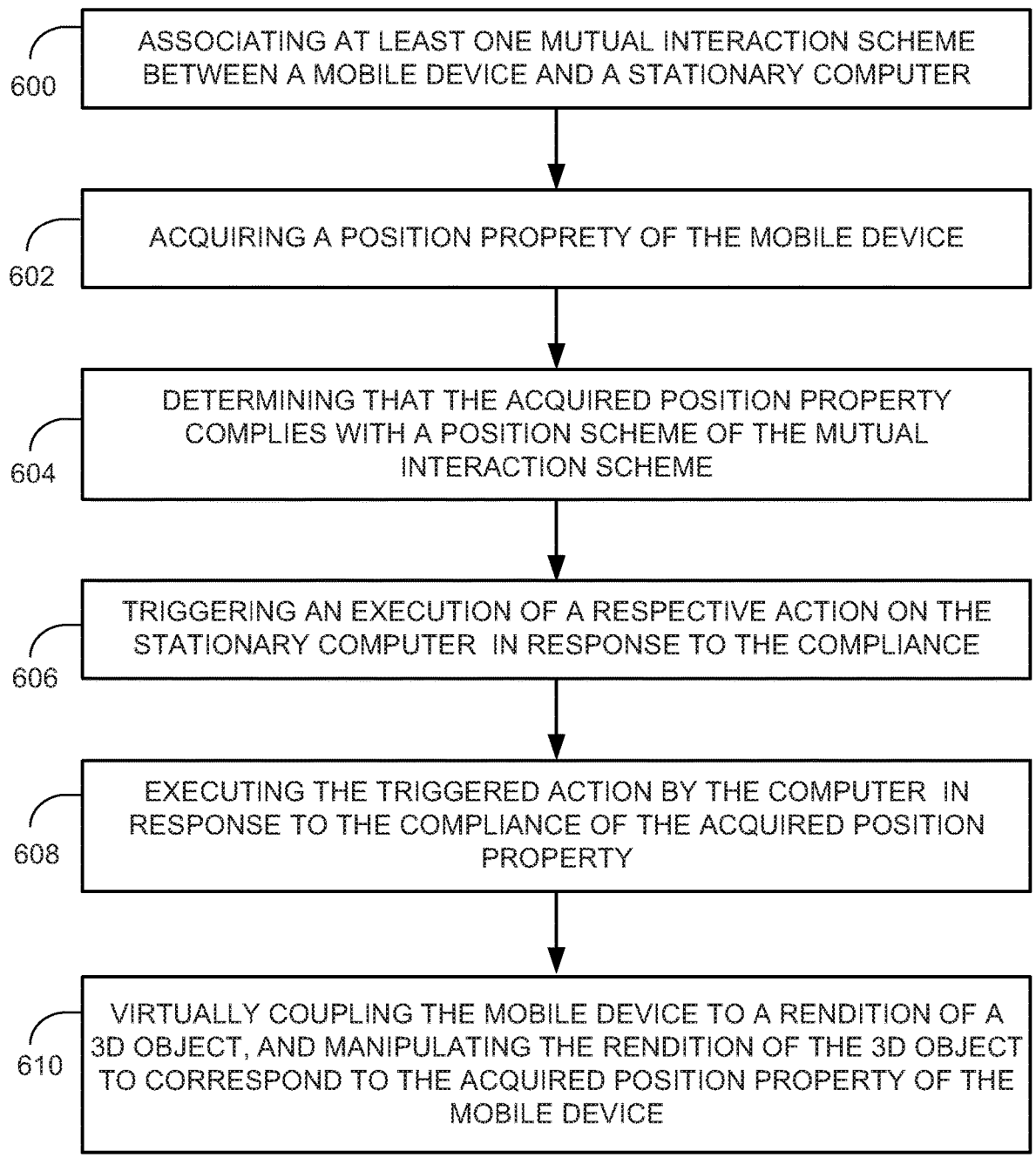
FIG. 6 is a schematic illustration of a method for implementing a mutually interactive wireless 2D or 3D mouse application with the system of FIG. 2A and FIG. 3U.

Reference is now made to FIG. 6, which is a schematic illustration of a method for initiating at least one mutual interaction scheme between a mobile device and a stationary computer, in accordance with another embodiment of the disclosed technique.

In procedure 600, at least one mutual interaction scheme is associated between a mobile device and a stationary computer. The mutual interaction scheme may be provided, or otherwise made accessible, to each of the mobile device and computer via a network from a cloud service. The mutual interaction scheme associates at least one position scheme with at least one respective action, where the at least one position scheme relates to at least one of: an absolute orientation, a relative orientation, an absolute position, a relative position, an absolute trajectory, and a relative trajectory of the mobile device. With reference to the system of FIGS. 2A-2F, and the system of FIG. 3U, each of mobile device 300A and computer 382 are provided with access to mutual interaction scheme 360, via transceiver 304A of mobile device 300A and transceiver 392 of computer 382.

In procedure 602, a position property of the mobile device is acquired. The acquired position property of the mobile device relates to at least one of: an absolute orientation, a relative orientation, an absolute position, a relative position, an absolute trajectory, and a relative trajectory of the mobile device. With reference to the system of FIGS. 2A-2F, and the system of FIG. 3U, IMU 330A of mobile device 300A acquires the position property of mobile device 300A using the methods described above. Additionally or alternatively, camera 324A of mobile device 300A captures an image, such as of a reference object, and the position property of mobile device 300A is acquired from the image captured by camera 324A. Additionally or alternatively, a camera 388 of display 384 captures an image of mobile device 300A, and computer 382 determines the position property of mobile device 300A using the acquired image.

In procedure 604, compliance of the acquired position property of the mobile device with at least one of the at least one position schemes of the mutual interaction scheme is determined. With reference to the system of FIGS. 2A-2F, and the system of FIG. 3U, mobile device 300A determines that the respective acquired position property complies with at least one of the position schemes of the mutual interaction scheme.

In procedure 606, in response to the compliance, an execution of one of the at least one respective actions is triggered on the computer. The respective triggered action is associated with the at least one position scheme with which the position property of the mobile device complies, in accordance with the mutual interaction scheme. With reference to the system of FIGS. 2A-2F, and the system of FIG. 3U, computer 382 is triggered to execute the respective action associated with the position scheme with which the position property of mobile device 300A complies.

In procedure 608, the respective triggered action is executed by the computer in response to the compliance of the acquired position property of the mobile device.

In procedure 610, the triggered action causes the computer to virtually couple the mobile device to a rendition of a three-dimensional object, and manipulating the rendition of the three dimensional object to correspond to the acquired position property of the mobile device. With reference to the system of FIGS. 2A-2F, and the system of FIG. 3U, mobile device 300A is virtually coupled with a three dimensional object (not shown) displayed on display 384. Subsequently, computer 382 manipulates a rendition of the three dimensional object on display 384 to correspond to the acquired position property of mobile device 300A.

With reference to FIG. 2A, memory store 132 can be a tangible device that can retain and store instructions for use by processor 134. Memory store 132 may be, for example, but is not limited to, an electronic storage device, a magnetic storage device, an optical storage device, an electromagnetic storage device, a semiconductor storage device, or any suitable combination of the foregoing. A non-exhaustive list of more specific examples of memory store 132 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. Memory store 132 as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The present invention relates to a system, a method, or a computer program product. The computer program product may comprise memory store 132 having computer readable program instructions thereon for causing processor 134 to carry out aspects of the present invention.

Computer readable program instructions related to herein can be downloaded to mobile device 100 from a computer readable storage medium via a network, for example, the Internet, a local area network, a wide area network and/or a wireless network and transceiver 104. The network may comprise copper transmission cables, optical transmission fibers, wireless transmission, routers, firewalls, switches, gateway computers and/or edge servers. A network adapter card or network interface in each mobile device 100 receives computer readable program instructions from the network and forwards the computer readable program instructions for storage in memory store 132 within mobile device 100.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in one or more programming languages. The computer readable program instructions may execute entirely on mobile device 100, or alternatively, partly on mobile device 100 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to processor 134 of mobile device 100 to produce a machine, such that the instructions, which execute via processor 134 of mobile device 100, create means for implementing the procedures specified in the flowcharts. These computer readable program instructions may also be stored in memory store 132 that can direct mobile device 100 to function in a particular manner, such that memory store 132 having instructions stored therein comprises an article of manufacture including instructions which implement aspects of the procedures specified in the flowcharts. The computer readable program instructions may also be loaded onto mobile device 100 to cause a series of operational steps to be performed on mobile device 100 to produce a computer implemented process, such that the instructions which execute on mobile device 100 implement the procedures specified in the flowcharts.

The flowcharts in the Figures illustrate the architecture, functionality, and operation of possible implementations of systems, methods, and computer program products according to various embodiments of the present invention. In this regard, each procedure in the flowchart may represent a module, segment, or portion of instructions, which comprises one or more executable instructions for implementing the specified logical function(s). In some alternative implementations, the procedures may occur out of the order noted in the Figures. For example, two procedures shown in succession may, in fact, be executed substantially concurrently, or the procedures may sometimes be executed in the reverse order, depending upon the functionality involved. It will also be noted that each procedure, and combinations thereof, of the flowchart illustrations can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for initiating at least one gesture-based mutual interaction scheme between a first mobile device and at least a second mobile device, said method comprising the procedures of:
   associating at least one gesture-based mutual interaction scheme between said first mobile device and said at least second mobile device, said gesture-based mutual interaction scheme associating at least one position scheme with at least one respective action,
   said at least one position scheme relating to at least one of: an absolute orientation, a relative orientation, an absolute trajectory, and a relative trajectory;
   acquiring a first position property of said first mobile device and a second position property of said at least second mobile device;
   determining that each of said first acquired position property and said second acquired position property comply with at least one of said at least one position scheme of said mutual interaction scheme;
   triggering an execution of one of said at least one respective action on said at least second mobile device, said respective action triggered on said second mobile device associated with said at least one position scheme with which said position property of said first mobile device complies, in accordance with said gesture-based mutual interaction scheme; and
   conditioning by said at least second mobile device said execution of said one of said at least one respective actions triggered by said first mobile device on said determined compliance of said second position property of said at least second mobile device with said gesture-based mutual interaction scheme.

2. The method according to claim 1, further comprising executing on said first mobile device, one of said one or more respective actions in response to said determined compliance of said acquired position property of said first mobile device.

3. The method according to claim 1, wherein said acquired position property of said first mobile device relates to at least one of: an absolute orientation, a relative orientation, an absolute trajectory, and a relative trajectory of said first mobile device.

4. The method according to claim 1, wherein said acquiring said position property of said first mobile device, and said determining that said acquired position property of said first mobile device complies with one of said at least one position scheme of said gesture-based mutual interaction scheme is performed by said first mobile device.

5. The method according to claim 1, said acquisition of said position property of said at least second mobile device, and said determining of said compliance of said position property of said at least second mobile device is further performed by said first mobile device.

6. The method according to claim 1, further comprising:
   triggering an execution of one of said one or more respective actions on said first mobile device, said respective action triggered on said first mobile device associated with said at least one position scheme with which said position property of said at least second mobile device complies, in accordance with said gesture-based mutual interaction scheme.

7. The method according to claim 1, wherein one of said one or more respective actions comprises indicating said determined compliance of said acquired position property of said first mobile device.

8. The method according to claim 1,
   wherein said position scheme further relates to at least one of an absolute position and a relative position, and
   wherein said acquired first position property of said first mobile device and said acquired second position property of said at least second mobile device correspond to a distance between said first mobile device and said at least second mobile device,
   wherein said at least one position scheme of said gesture-based mutual interaction scheme correspond to said acquired distance,
   wherein determining further comprises determining that said acquired distance complies with said position scheme of said mutual interaction scheme corresponding to said acquired distance.

9. The method according to claim 1,
   wherein said first position property of said first mobile device corresponds to a distance and orientation of said first mobile device with respect to an audio receiver, and
   wherein said second position property of said at least second mobile device corresponds to a distance and orientation of said at least second mobile device with respect to said audio receiver,
   wherein said at least one position scheme of said gesture-based mutual interaction scheme corresponds to an audio range with respect to said audio receiver,
   wherein determining further comprises determining that said position property of said first mobile device and said position property of said at least second mobile device all comply with said audio range,
   the method further comprising:
      synchronizing an internal clock of said at least second mobile device with an internal clock of said first mobile device,
      computing a phase shift for each of said at least second mobile device such that an audio file simultaneously transmitted by said first mobile device and each of said at least second mobile device constructively interferes at said audio receiver, and
      rendering said audio file by said first device, and rendering said audio file by each of said at least second mobile device according to each respective phase shift.

10. The method according to claim 1, further comprising mutually notifying each of said first mobile device and said at least second mobile device of said respective compliances of said acquired position properties of said first mobile device and said at least second mobile device with said at least one position scheme of said gesture-based mutual interaction scheme,
   wherein executing said respective action comprises invoking a multi-perspective imaging application at each of said first mobile device and said at least second mobile device,
   wherein acquiring said respective position properties of said first mobile device and said at least second mobile device comprises capturing an image of an object with any of: a camera configured with said first mobile device and a camera configured with said at least second mobile device, wherein said acquired position properties of said first mobile device and said at least second acquired position property are with respect to said object, wherein said at least one position scheme of said gesture-based mutual interaction scheme with which said position property of said first mobile device complies, corresponds to an optical range of said camera configured with said first mobile device with respect to said object, and wherein said at least one position scheme of said gesture-based mutual interaction scheme with which said position property of said at least second mobile device complies, corresponds to an optical range of said camera configured with said at least second mobile device with respect to said object.

11. The method according to claim 1, further comprising: depositing a visible trace, wherein acquiring said first position property comprises acquiring a trajectory corresponding to said visible trace, wherein determining that said acquired first position property complies with at least one of said at least one position scheme of said gesture- based mutual interaction scheme comprises determining that said acquired trajectory corresponds to said deposited visible trace, and wherein triggering said at least second mobile device to execute said associated action comprises triggering said at least second mobile device to display a bit map corresponding to said visible trace.

12. The method according to claim 1, wherein said triggered one of said at least one respective action on said at least second mobile device comprises exchanging a security credential between said first mobile device and said at least second mobile device.

13. A mutually interactive system, comprising:
a first mobile device comprising:
an inertial measurement unit configured to acquire a first position property of said first mobile device,
a transceiver; and
at least a second mobile device, each comprising:
an inertial measurement unit configured to acquire a second position property of each said at least second mobile device,
a transceiver configured to communicate with said transceiver of said first mobile device,
said first and said at least a second mobile devices associated with at least one gesture-based mutual interaction scheme associating at least one position scheme with at least one respective action,
said at least one position scheme relating to at least one of: an absolute orientation, a relative orientation, an absolute trajectory, and a relative trajectory,
wherein said first mobile device is configured to:
determine that said acquired position property of said first mobile device complies with one of said at least one position schemes of said gesture-based mutual interaction scheme,
trigger, via said respective transceivers of first mobile device and said at least second mobile device, said processor of said at least second mobile device to execute one of said at least one respective action, said triggered action associated with said one of said at least one position schemes with which said first acquired position property complies, and
wherein said at least second mobile device is configured to:
determine that said second acquired position property of said second mobile device complies with one of said at least one position schemes of said gesture-based mutual interaction scheme, and
condition an execution of said triggered action by said at least second mobile device of said at one of said at least one respective actions triggered by said first mobile device on said determined compliance of said second position property of said at least second mobile device with said gesture-based mutual interaction scheme.

14. The system according to claim 13, wherein said respective acquired position property of said first mobile device and said at least second mobile device relates to at least one of: an absolute orientation, a relative orientation, an absolute trajectory, and a relative trajectory of said respective first mobile device and said at least second mobile device.

15. The system according to claim 13, wherein any of said first mobile device and said second mobile device further comprise a camera configured to acquire any of: said first position property of said first mobile device, and said second position property of said at least second mobile device, and wherein said first mobile device is further configured to determine that said acquired position property of said at least second mobile device complies with at least one of said at least one position schemes of said gesture-based mutual interaction scheme, and wherein said at least second mobile device is further configured to determine that said acquired position property of said first mobile device complies with at least one of said at least one position schemes of said gesture-based mutual interaction scheme.

16. The system according to claim 13, wherein said at least second mobile device is further configured to trigger an execution of one of said one or more respective actions on said first mobile device, said respective action triggered on said first mobile device associated with said at least one position scheme with which said second position property of said least second mobile device complies, in accordance with said gesture-based mutual interaction scheme.

17. The system according to claim 13, wherein one of said one or more respective actions comprises indicating said determined compliance of said acquired first position property of said first mobile device.

18. The system according to claim 13,
wherein said first mobile device is operative as an audio transmitter and further comprises a speaker, and
wherein said at least second mobile device is operative as an audio receiver and further comprises a speaker,
wherein said at least one position scheme of said gesture-based mutual interaction scheme corresponds to an audio range with respect to an audio receiver,
wherein said first acquired position property of said first mobile device corresponds to a distance and orientation of said first mobile device with respect to said audio receiver, and
wherein said first mobile device is further configured to:
receive at least said second position property corresponding to a distance and orientation of said at least second mobile device with respect to said first mobile device, determine that said acquired first position property and said at least second position property both comply with said audio range respective of said audio receiver, synchronizing an internal clock of said at least second mobile device with an internal clock of said first mobile device, computing a phase shift for each of said at least second mobile device such that an audio file simultaneously transmitted by said first mobile device and each of said at least second mobile device constructively interferes at said audio receiver, and rendering said audio file by said first device, and rendering said audio file by each of said at least second mobile device according to each respective phase shift.

19. The system according to claim 13, wherein said acquired position properties of said first mobile device and said at least second mobile device are with respect to an object, wherein said at least one position scheme of said gesture-based mutual interaction scheme with which said first position property of said first mobile device complies, corresponds to an optical range of a camera configured with said first mobile device with respect to said object, and wherein said at least one position scheme of said gesture-based mutual interaction scheme with which said second position property of said at least second mobile device complies, corresponds to an optical range of said camera configured with said at least second mobile device with respect to said object, wherein said at least one respective action configured to be executed by said at least second mobile device is a multi-perspective imaging application, and wherein said first mobile device is configured to execute said multi-perspective imaging application.

20. The system of claim 19, further comprising:

an image processor, wherein executing said multi-perspective imaging application comprises:
  capturing at least one image of said object,
  simultaneous with capturing said image, acquiring associated metadata, said associated metadata comprising position and orientation properties associated with said captured image, and a time stamp associated with said captured image, and
  providing said captured image and said associated metadata to said image processor, wherein said image processor is configured to:
  receive from said first mobile device and said at least second mobile device, said multiple captured images with said associated metadata, and
  process said multiple captured images using said associated metadata to perform any of: creating a panoramic image of said object, creating a multi-perspective image of said object, and tracking said object, and
  provide said result of said processing step to any of said first and said at least second mobile device.

21. The system according to claim 13, wherein said first mobile device is configured deposit a visible trace, and wherein said at least second mobile device is configured to: display a bit map corresponding to said visible trace at a user interface of said at least second mobile device, and store said bit map at a memory of said at least second mobile device, wherein determining that said acquired first position property of said first mobile device complies with at least one of said at least one position scheme of said gesture-based mutual interaction scheme comprises determining that said acquired first position property of said first mobile device corresponds to said deposited visible trace, and wherein triggering said at least second mobile device to execute said associated action comprises triggering said at least second mobile device to display said bit map corresponding to said visible trace.

22. The system according to claim 13, wherein said triggered one of said at least one respective action on said at least second mobile device comprises exchanging a security credential between said first mobile device and said at least second mobile device.

23. A method for initiating at least one gesture-based mutual interaction scheme between a mobile device and a computer, said method comprising the procedures of:

associating at least one gesture-based mutual interaction scheme between said mobile device and said computer, said gesture-based mutual interaction scheme associating at least one position scheme with at least one respective action, said at least one position scheme relating to at least one of: an absolute orientation, a relative orientation, an absolute position, a relative position, an absolute trajectory, and a relative trajectory of said mobile device;

acquiring a position property of said mobile device;

determining that said acquired position property of said mobile device complies with at least one of said at least one position scheme of said gesture-based mutual interaction scheme; and triggering an execution of one of said at least one respective action on a display of said computer, said respective action triggered on said display associated with said at least one position scheme with which said position property of said mobile device complies, in accordance with said gesture-based mutual interaction scheme, wherein said at least one respective action comprises virtually coupling said mobile device with a three dimensional object displayed on said display, and manipulating a rendition of said three dimensional object on said display to correspond to said acquired position property of said mobile device.

* * * * *